May 13, 1952 B. C. PALMER 2,596,164

TAXIMETER

Filed Oct. 27, 1947 14 Sheets-Sheet 1

INVENTOR.
Brian C. Palmer
BY Strauch & Hoffman
Attorneys

INVENTOR.
Brian C. Palmer
BY Strauch & Hoffman
Attorneys

May 13, 1952 B. C. PALMER 2,596,164

TAXIMETER

Filed Oct. 27, 1947 14 Sheets-Sheet 3

INVENTOR.
Brian C. Palmer
BY
Strauch & Hoffman
Attorneys

May 13, 1952 B. C. PALMER 2,596,164

TAXIMETER

Filed Oct. 27, 1947 14 Sheets-Sheet 4

INVENTOR.

Brian C. Palmer

BY

Strauch + Hoffman

Attorneys

May 13, 1952 B. C. PALMER 2,596,164

TAXIMETER

Filed Oct. 27, 1947 14 Sheets-Sheet 5

INVENTOR.
Brian C. Palmer
BY
Strauch & Hoffman
Attorneys

May 13, 1952 B. C. PALMER 2,596,164

TAXIMETER

Filed Oct. 27, 1947 14 Sheets-Sheet 6

INVENTOR.
Brian C. Palmer
BY
Strauch & Hoffman
Attorneys

INVENTOR.
Brian C. Palmer
BY
Strauch & Hoffman
Attorneys

May 13, 1952 B. C. PALMER 2,596,164

TAXIMETER

Filed Oct. 27, 1947 14 Sheets-Sheet 8

INVENTOR.
Brian C. Palmer
BY Strauch & Hoffman
Attorneys

May 13, 1952 B. C. PALMER 2,596,164

TAXIMETER

Filed Oct. 27, 1947 14 Sheets-Sheet 9

INVENTOR.
Brian C. Palmer
BY
Strauch & Hoffman
Attorneys

May 13, 1952 B. C. PALMER 2,596,164

TAXIMETER

Filed Oct. 27, 1947 14 Sheets-Sheet 10

INVENTOR.
Brian C. Palmer
BY
Strauch + Hoffman
Attorneys

May 13, 1952 B. C. PALMER 2,596,164

TAXIMETER

Filed Oct. 27, 1947 14 Sheets-Sheet 11

INVENTOR.
Brian C. Palmer
BY
Strauch & Hoffman
Attorneys

INVENTOR.
Brian C. Palmer
BY
Strauch & Hoffman
Attorneys

INVENTOR.
Brian C. Palmer
BY
Strauch & Hoffman
Attorneys

INVENTOR.
Brian C. Palmer
BY
Strauch + Hoffman
Attorneys

Patented May 13, 1952

2,596,164

UNITED STATES PATENT OFFICE 2,596,164

TAXIMETER

Brian C. Palmer, Riverside, Ill., assignor to Rockwell Register Corporation, a corporation of New York Application October 27, 1947, Serial No. 782,438

34 Claims. (Cl. 235—30)

The present invention relates to a novel taximeter and more particularly to a compact meter composed of novel subassembly units and adapted for mounting in the usual glove compartment of a taxicab, or on the dash, or division partition between the front and rear seats, in a manner to afford maximum passenger carry space in the vehicle.

Due to the exhaustive information required to be displayed or recorded by present day taximeters and the complexity of existing mechanisms, taximeters giving the desired information are bulky, complicated, and require considerable space in the vehicle with the result that valuable passenger carry space is taken up by the meter. Furthermore, present taximeters, due to the complex construction and resulting necessary arrangement of the various mechanisms, display certain information through one face of the meter and other information through another face which also carries the operator actuated control mechanism. As a consequence, such meters are not adapted for mounting in a glove compartment, or on the dash or against the dividing partition of a taxicab since certain of the displayed information would be obscured and rendered useless by such mountings.

It, accordingly, is a primary object of this invention to provide a compact taximeter composed of simplified operating mechanism arranged to display all desired information through a single face which also carries the operator actuated control mechanism.

The construction of the prior taximeters has in the past been such that their quantity or mass assembly line production has been impossible. As a result each meter has been more or less hand made, fits have been selective and production and repairs have been comparatively slow and costly. Accordingly another object of the present invention is the provision of a taximeter in which the various operating parts are arranged for interchangeable mass production, and in subassembly units for modern assembly line manufacture.

A further important object of the present invention is to provide taximeter operating mechanism in the form of unitary subassemblies that may be readily assembled to produce a complete taximeter, and stocked for rapid replacement of broken or worn parts.

Another object of this invention resides in providing a taximeter with novel readily inspectable seals adapted to prevent unauthorized tampering with the operating mechanism or the registering drums and counters of a taximeter installed in a vehicle.

A further object of the present invention resides in the provision of a novel side frame and extras drum and counter plunger operated lever motion subassembly.

A further object of this invention resides in the provision of a novel side frame and mileage drive gear and lever mechanism subassembly.

Another object is the provision of a novel drum shaft subassembly.

Still another object of this invention is the provision of a novel fare drum transfer pinion and clock stop finger shaft subassembly.

A still further object of this invention resides in the provision of a novel fare drum stop finger and tariff drum drive gear shaft subassembly.

A further object of this invention resides in the provision of a novel cam shaft subassembly.

A still further object of this invention is in the provision of a novel drive shaft subassembly.

Another object of the invention is the provision of a novel fare and trips counter lever shaft subassembly.

A further object of this invention is the provision of a novel meter reset mechanism.

Still another object is the provision of novel manual setting mechanisms for setting the fare drums for the initial charge.

A further object is the provision of a novel drive tube and coupling subassembly for connecting a taximeter to a drive gear box disposed on the vehicle transmission.

A still further object is the provision of a novel simplified fare drum and units counter operating lever assembly.

Another object of this invention is the provision of a novel simplified trips counter operating lever and actuating cam structure.

Still another object of the present invention is the provision of a novel transmission connected meter drive shaft assembly adapted to eliminate binding of the bears in the transmission supported drive gear box.

A further object resides in the provision of a novel tamperproof dial front assembly.

Astill further object of the present invention is the provision of a novel fare drum transfer pinion drive arrangement.

Another object is the provision of a novel tariff drum and tariff drum driving mechanism.

Still another object of this invention resides in the provision of novel telltale light controls responsive to the operation of the flag shaft.

Other objects will appear from the appended claims and the following description when read in conjunction with the appended drawings wherein:

Figures 1, 2, 27:
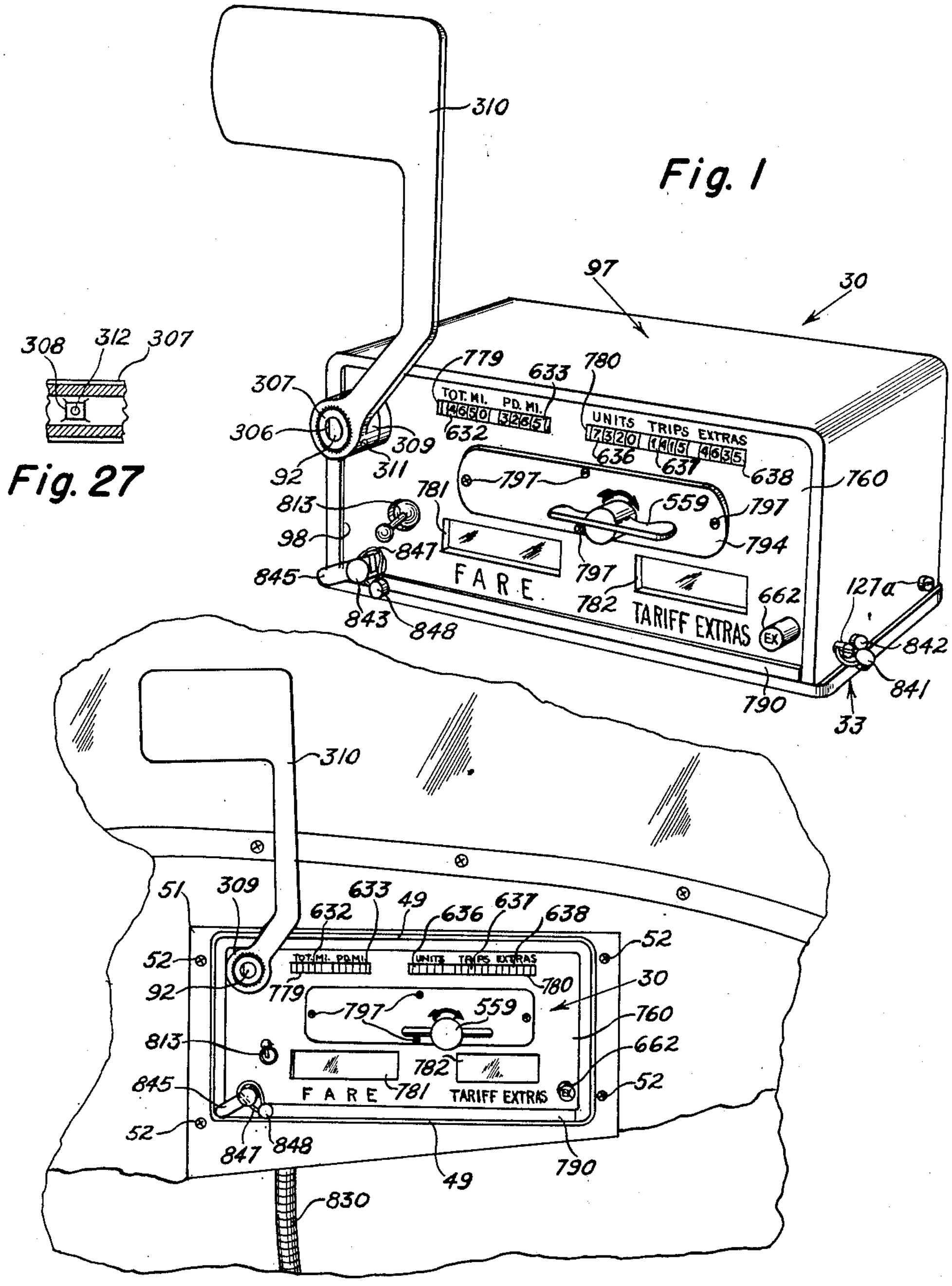
Figure 1 is a pictorial view of a taximeter made in accordance with the present invention.
Figure 2 is a pictorial view showing the meter of Figure 1 mounted in the conventional glove compartment of a taxicab.
Figure 27 is a detailed sectional view of the bushing interposed between the flag and flag shaft.

With continued reference to the drawings, wherein like reference numerals are used throughout to indicate the same parts, the taximeter 30 (Figure 1) of the present invention is made up of a plurality of sub-assembly units which are assembled in operative relation to each other in assembly line fashion to form the complete meter.

Referring to Figure 1, it will be seen that the completed meter 30 is of rectangular, box-like configuration, elongated from side to side, and of a height approximately one-half of its width. In its preferred form, the over-all height is 4⅛ inches, the over-all width is 8⅝ inches, and the over-all length from front to back is 6½ inches. These dimensions have been found particularly appropriate for a universal taximeter adapted to be mounted in the glove box compartment, as shown in Figure 2, on a mounting bracket 31 (Figure 3), or on a dashboard mounting bracket 32 (Figure 4), or the partition of a custom built taxicab having the conventional partition and sliding window construction dividing the front and rear seats (not shown). While any desired manner of securing meter 30 to brackets 31 or 32 may be employed, the present invention embodies a base plate unit 33 of light-weight, cast metal having upstanding, transversely aligned apertured bosses 34 (Figures 7 and 15) adapted to have suitable securing bolts (not shown) associated therewith. While any suitable material may be utilized for the manufacture of base plate unit 33, a light-weight S. A. E. standard #33 type 1 aluminum alloy is preferably used. To assure an adequate securing means for attaching the meter to bracket members 31 and 32, brass inserts 36 having enlarged heads are preferably inserted in bosses 34 and provide tapped openings 35 for receiving the securing bolts.

Figure 3:
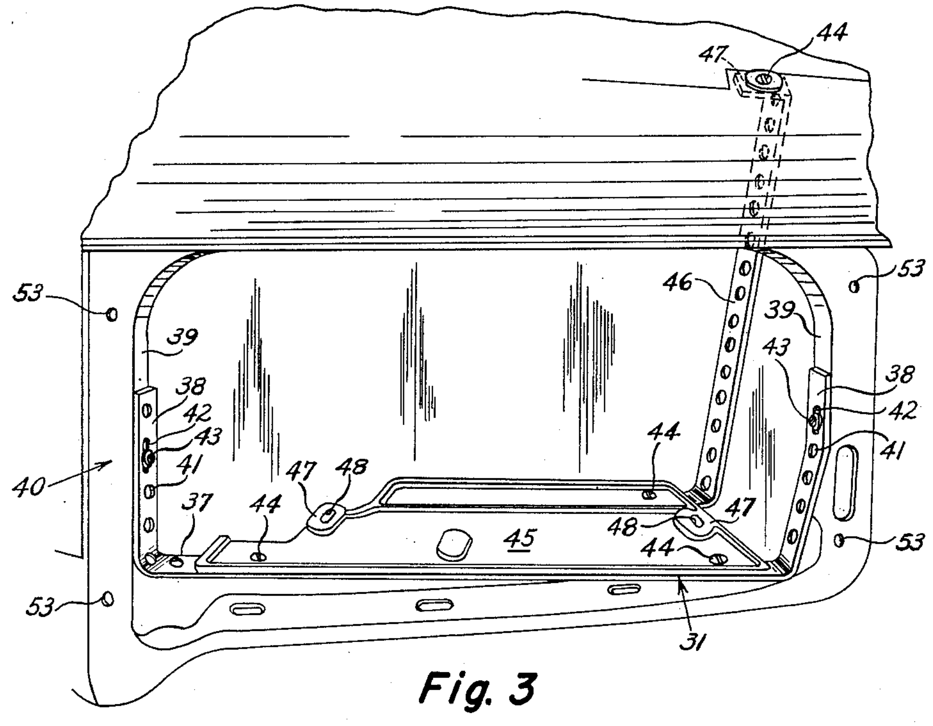
Figure 3 is a pictorial view of the interior of the conventional glove compartment showing the levelling supporting bracket employed in mounting the meter of Figure 1 in the glove box compartment.

Referring for the moment to Figure 3, it will be seen that bracket 31 is composed of a main supporting strap 37 of substantially U-shaped form, disposed with its upstanding legs 38 in abutting relation with the side walls 39 of the front opening 40 of the glove compartment and provided with apertures 41 and slots 42 adapted to freely receive securing screws 43 provided to secure strap 37 in place within the glove compartment opening 40. Suitably attached to strap 37 preferably by bolt and nut assemblies 44 is one end of a mounting plate 45, the other end of which is secured to a second U-shaped mounting strap 46, the legs 47 of which are relatively short and respectively bolted to the rear end of plate 45 and an interior glove compartment frame member (not shown) by means of additional bolt and nut assemblies 44. Along its opposite side edges, mounting plate 45 is provided with elongated lands 47 having longitudinally extending, aligning slots 48 adapted to receive the securing bolts associated with brass inserts 36. A peripherally extending land structure 49 machined to present a planar surface in the plane of lands 47 is also provided on plate 45 to assure a rigid bearing engagement between the bottom face of base plate unit 33 and plate 45. Slots 42 and 48 are provided for vertical and horizontal adjustment of meter 30 within the glove compartment so as to properly align the meter with respect to the glove box opening to dispose its front face substantially in the plane of opening 40.

To avoid the mounting difficulties that would result if meter 30 were to completely fill opening 40, the present invention contemplates that meter 30 will be slightly smaller in its peripheral dimensions than opening 40 and that the resulting peripheral space will be closed by a rectangular grommet 49 (Figure 2) of suitable deformable or resilient material formed to snugly fit the sides, top and bottom of meter 30 adjacent its front face and to be secured in place by a rectangular face plate 51 secured to the front face of wall 39 of the glove box compartment by means of suitable screws 52 cooperating with tapped apertures 53 provided in the front face wall 39.

From the foregoing description, it will be appreciated that meter 30 may readily be mounted in the conventional glove compartment with a minimum of effort and may be adequately trimmed around its front face to create the impression of a built in meter construction.

Figure 4:
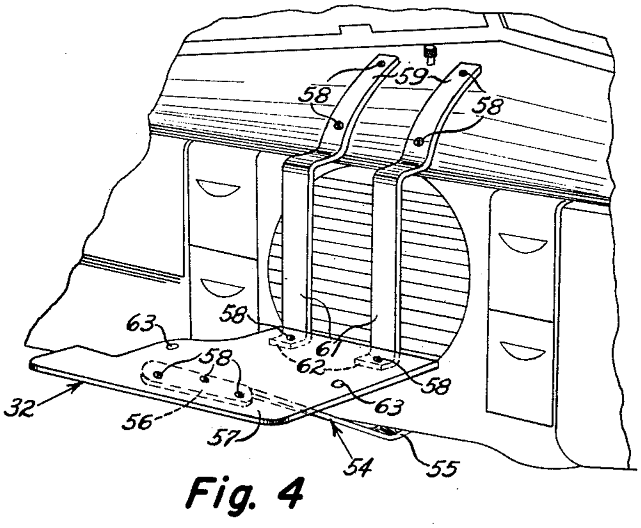
Figure 4 is a pictorial view of the vehicle dashboard showing the supporting bracket used in mounting the meter of Figure 1 on the dashboard.

Referring to Figure 4, the dashboard mounting bracket 32 is adapted to be disposed adjacent the transverse center of the dashboard, and comprises a substantially T-shaped bracket 54 having the free end 55 of the T stem bent to cooperate with the underside of the dash board structure and be secured thereto by a bolt and nut assembly (not shown). The cross arm 56 of bracket 54 is bent to present a substantially horizontally disposed mounting surface adapted to cooperate with the underside of the front edge of a mounting plate 57, which is secured to cross arm 56 by means of countersunk screws 58. The opposite end of plate 57 is supported by a pair of upwardly extending, parallel bracket members 59 secured to the upper surface of the conventional dashboard by screws 58 and having vertically extending legs 61 terminating at their lower ends in right angularly disposed supporting portions 62 secured to the rear end of plate 57 by additional screws 58. Plate 57 adjacent its opposite side edges, is provided with screw openings 63 which are transversely aligned and adapted to receive the securing bolts (not shown) which cooperate with brass inserts 36 of meter base plate unit 33. From the foregoing description, it will be appreciated that meter 30 is readily adapted for connection to the dashboard by the meter bracket structure just described.

In event it is desired to secure meter 30 to the partition member of a custom-built taxicab, it will be appreciated that the only mounting means necessary would be a suitable relatively wide L-shaped bracket secured to the partition member with one leg projecting at right angles to the partition and provided with bolt receiving apertures for the securing bolts adapted to be associated with brass inserts 36. It will also be appreciated that the mounting brackets heretofore described might take any desired form suitable for mounting the meter in the various locations specified and that the specific structure of these mounting brackets and arrangements form no part of the present invention but are shown and described for the purpose of demonstrating a suitable manner of mounting the meter of the present invention.

Figure 5:
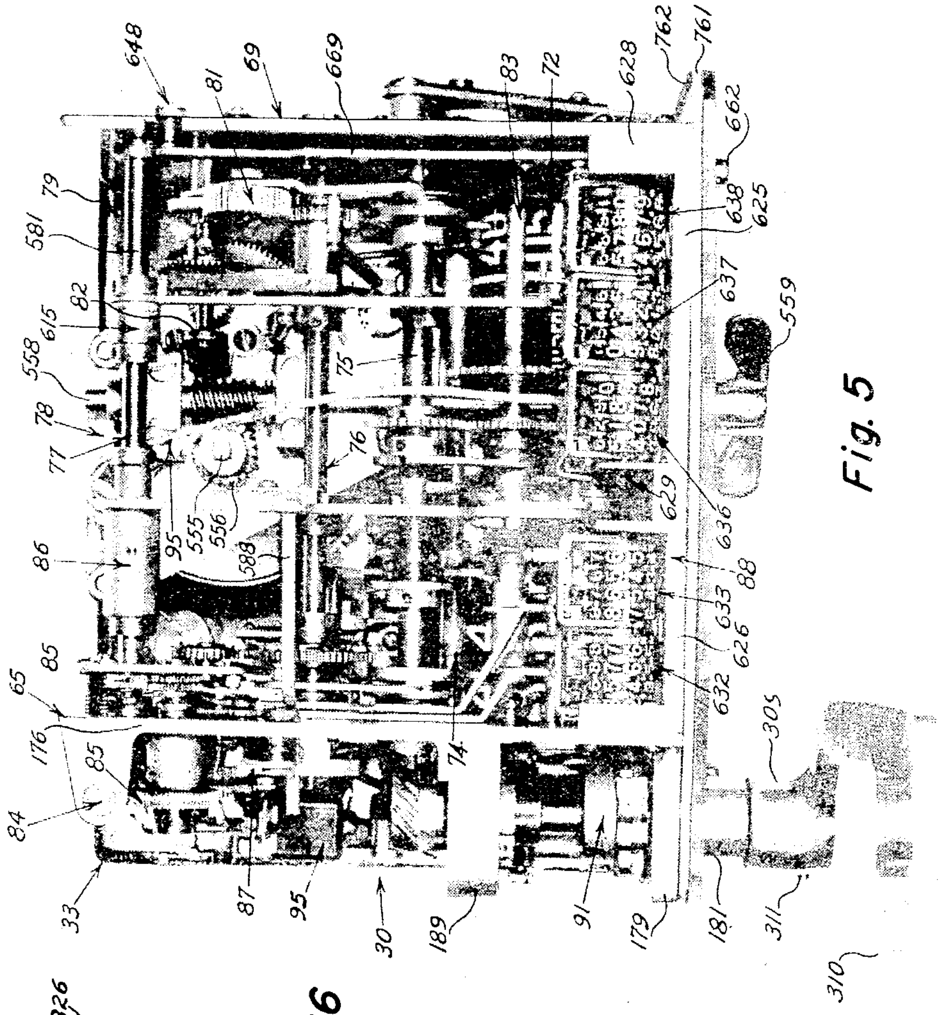
Figure 5 is a pictorial plan view of the meter of Figure 1 with the cabinet removed.
Figures 6, 9:
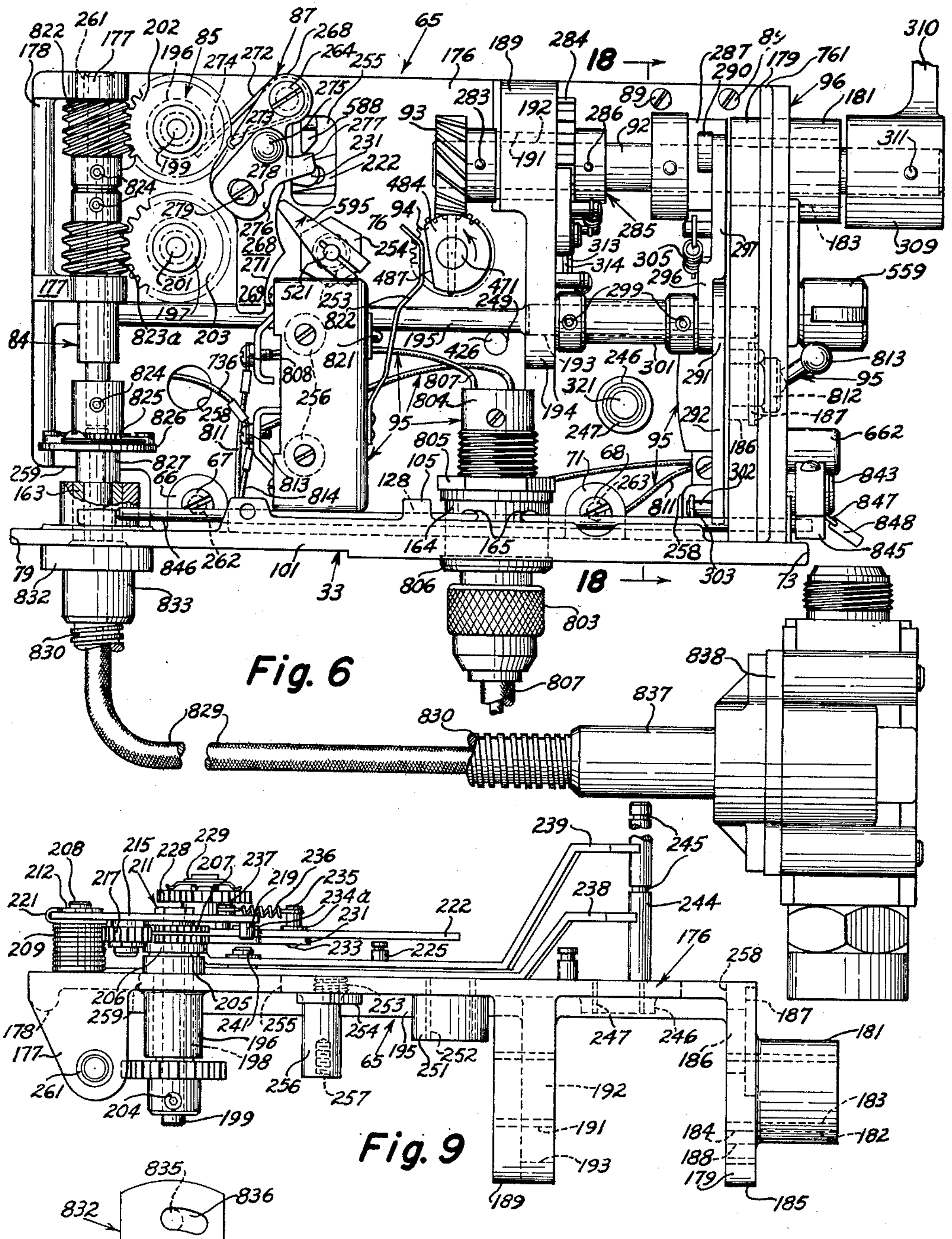
Figure 6 is a left side view of the meter as it appears when view from the left of Figure 5 with the flexible drive cable connected to the meter and including the transmission supported drive gear box.
Figure 9 is a plan view of the left side frame and mileage drive gear lever mechanism subassembly.
Figure 19:
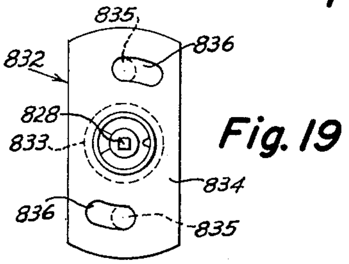
Figure 19 is a detailed plan view of the coupling carried at the meter end of the flexible drive shaft and adapted to connect the flexible drive shaft subassembly to the meter base plate.
Figures 7, 38:
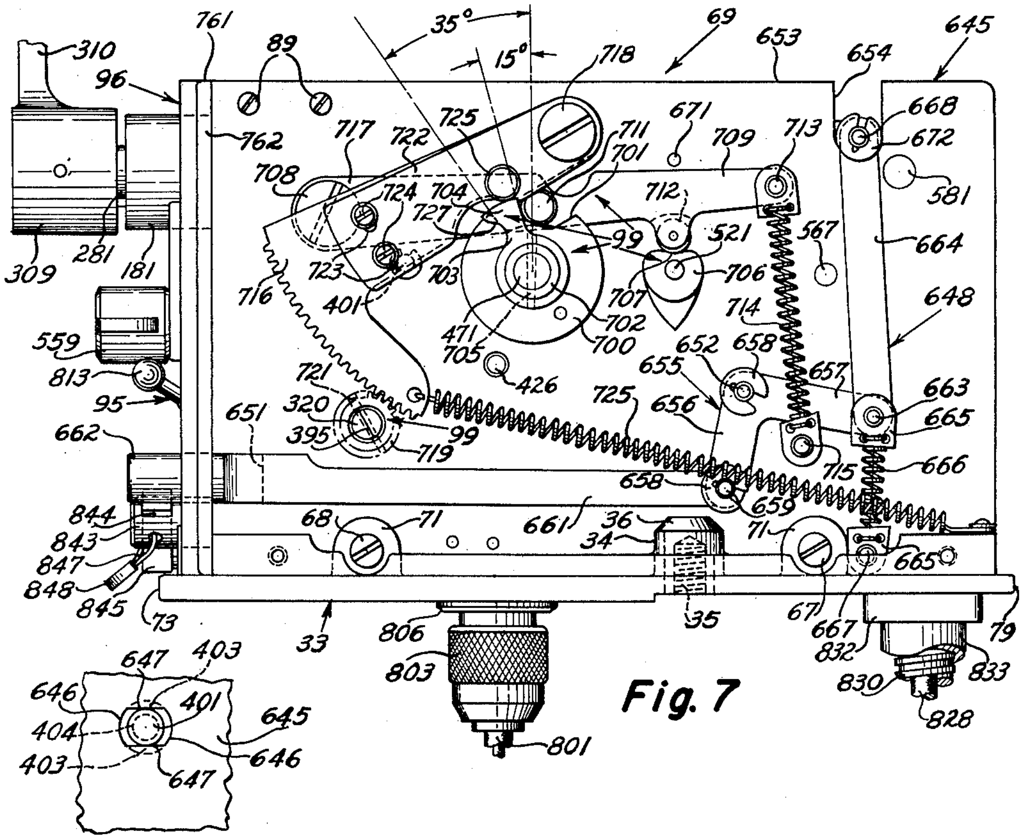
Figure 7 is a right side view of the meter as it appears when viewed from the right of Figure 5.
Figure 38 is a fragmental elevational view illustrating the details of the non-rotatable support for the fare drum stop finger and tariff drum drive gear shaft assembly provided by the right side frame and extras drum and counter operating assembly.
Figure 10:
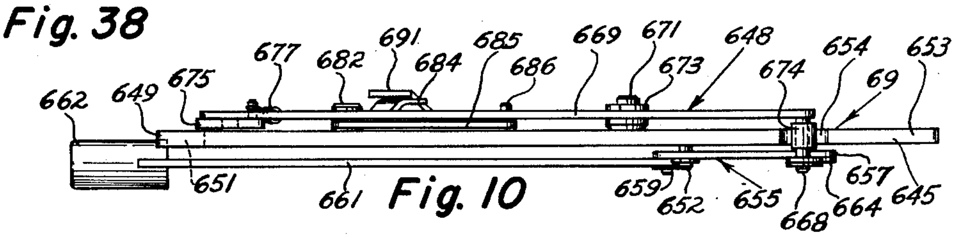
Figure 10 is a plan view of the right side frame and extras drum and counter operating lever mechanism subassembly.
Figures 8, 21, 22, 23:
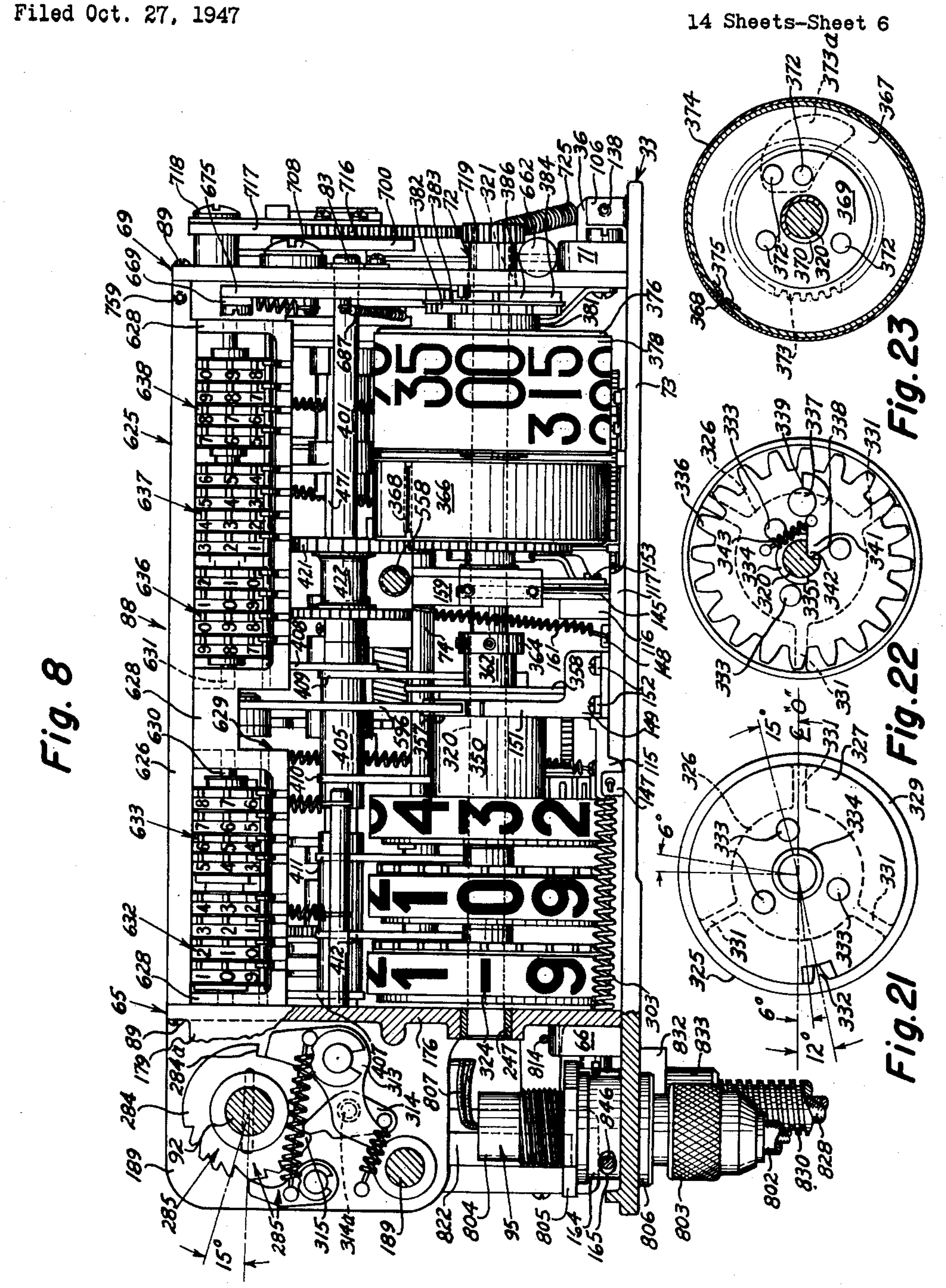
Figure 8 is a front view of the meter as it appears when viewed from the front of Figure 5 with the dial front assembly removed and the left side frame partially broken away and showing the flag shaft locking and release mechanism.
Figure 21 is an end view of the $1.00 fare drum used in the register drum shaft assembly of Figure 20.
Figure 22 is an opposite end view of the $1.00 fare drum of Figure 21.
Figure 23 is a transverse sectional view of the tariff drum used in the meter of Figures 1 to 19 taken on line 23—23 of Figure 20.
Figure 11:
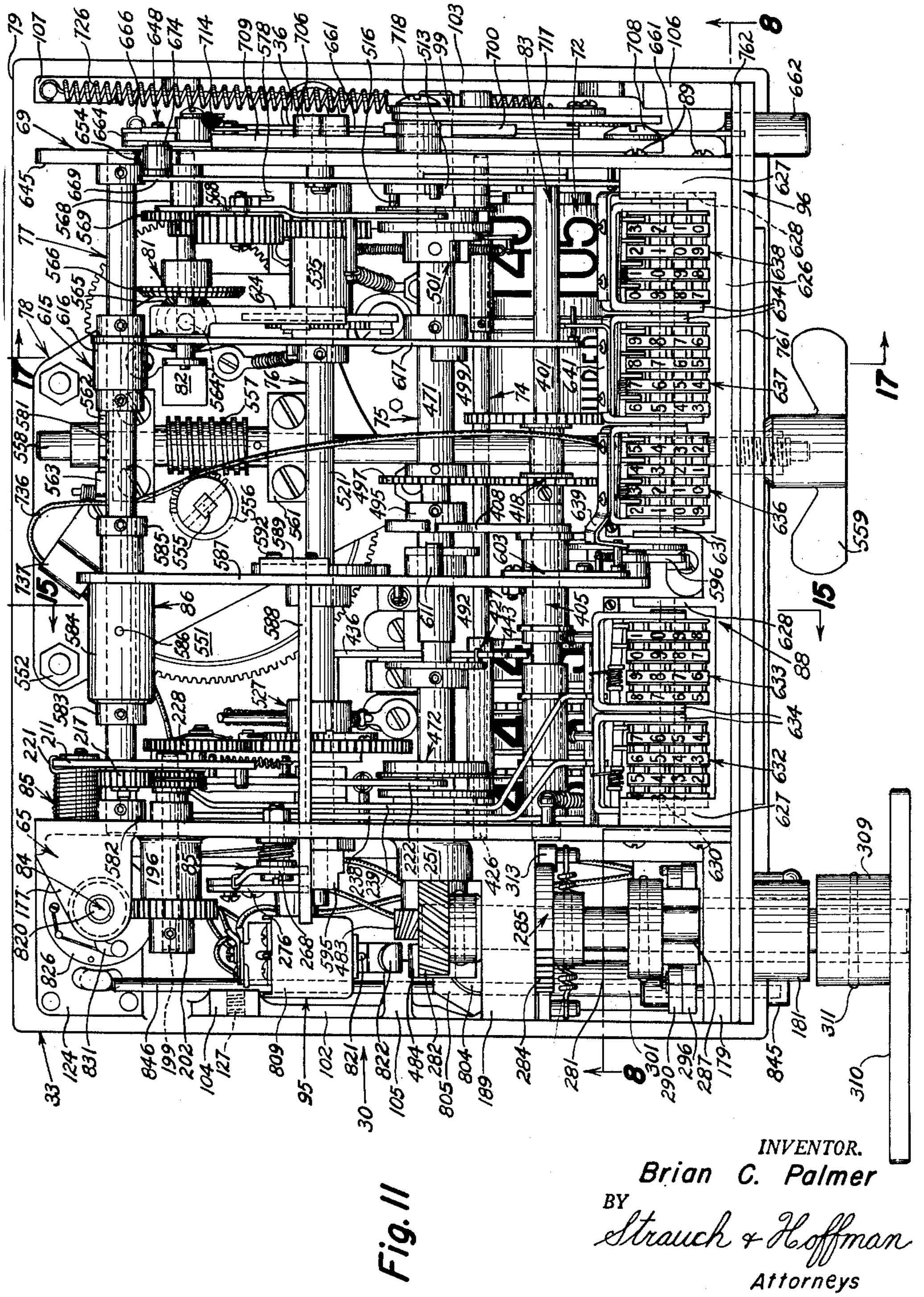
Figure 11 is a plan view of the novel meter of Figure 1.

Turning now to the meter construction constituting the present invention, meter 30, in addition to base plate unit 33, is composed of a left side frame member and mileage drive gear and lever mechanism subassembly unit 65 (Figures 5, 6, and 9) secured to upstanding ears 66 and 71 of base plate unit 33 by means of bolt and nut assembly 67 and screw 68; a right side frame member and extras drum and counter operating lever mechanism sub-assembly unit 69 (Figures 5, 7 and 10) secured to upstanding ears 66 and 71 of base plate unit 33 by an additional bolt and nut assembly 67 and additional screw 68; a register drum shaft assembly unit 72 journalled for rotation in units 65 and 69 adjacent the forward edge 73 of base plate unit 33 with its axis extending transversely of base plate unit 33 (Figure 8); a combined fare drum transfer pinion frame and clock stop finger shaft assembly unit 74 (Figure 13) journalled in units 65 and 69 slightly to the rear of and above the plane of the axis of register drum shaft assembly unit 72 (Figures 5, 6 and 7); a cam shaft assembly unit 75 (Figure 13) journalled in units 65 and 69 with its axis to the rear of and slightly above the plane of the axis of fare drum transfer pinion frame and clock stop finger shaft assembly unit 74 (Figures 5, 6, 7, 15, 16 and 17); a drive shaft assembly unit 76 (Figure 12) journalled in said units 65 and 69 to the rear of and in the horizontal plane of said cam shaft assembly unit 75 (Figures 5, 6, 15, 16 and 17); a fare and trip counter levers shaft assembly unit 77 (Figure 11) journalled in units 65 and 69 adjacent the rear vertical edges of units 65 and 69 in a plane above the plane of the axis of drive shaft assembly unit 76 (Figures 5, 6, 7, 15, 16 and 17); a clock assembly unit 78 secured on its back to base plate unit 33 adjacent the rear edge 79 and beneath units 75, 76 and 77 (Figure 16); a clock drive gear and shear assembly shaft unit 81 journalled at one end in unit 69 and at its other end in a journal bracket 82 carried by clock assembly unit 78 so as to dispose its axis to the rear of and in the plane of the axis of units 75 and 76; a fare drum stop finger and tariff drum drive gear shaft assembly unit 83 (Figure 14) journalled in units 65 and 69 in the plane of shafts 75 and 76 and slightly to the rear of the axis of register drum shaft assembly unit 72; drive means 84 (Figures 5 and 6) journalled on unit 65 adjacent its rear edges for rotation about a vertical axis and adapted to drivingly connect the mileage gear and lever mechanism 85 (Figures 5, 6 and 9) of unit 65 to the transmission of the vehicle upon which the meter is mounted; a time delay mechanism 87 pivotally mounted on unit 65 forwardly of drive means 84 (Figure 6) so as to cooperate with a portion of a fare and trips counter lever shaft assembly unit 76 to prevent movement of the registering lever of unit 77 to its operating position until the initial fare registered on the meter has been consumed; counter assembly unit 88 secured to units 65 and 69 by screws 89 and disposed at the upper forward edge of units 65 and 69 (Figures 5, 6, 7, 8, 15, 16 and 17); a flag shaft assembly 91 carried by unit 65 with a flag shaft 92 disposed above the plane of and extending at right angles to cam shaft assembly unit 75 and provided with a worm gear 93 in meshing engagement with a worm gear 94 on cam shaft assembly unit 75; electrical control circuit 95 (Figures 5, 6, 7, 8 and 24); a meter front assembly 96 (Figures 6, 7, 15, 16 and 17); a cover 97 having an open front face 98 (Figure 1), and a reset mechanism 99 (Figures 7, 8 and 11). These sub-assembly units are first individually assembled and then in turn put together and connected in operative relation in any suitable sequence to produce the complete meter 30. To illustrate a preferred manner of construction the sub-assembly units and a preferred sequence of assembling the various subassembly units, the following description has been subdivided into appropriate subassembly headings arranged in the sequence in which the subassembly units are preferably finally assembled to produce meter 30. To this end, the description that follows will start with details of the base plate unit 33.

*Base plate unit*

Figure 25:
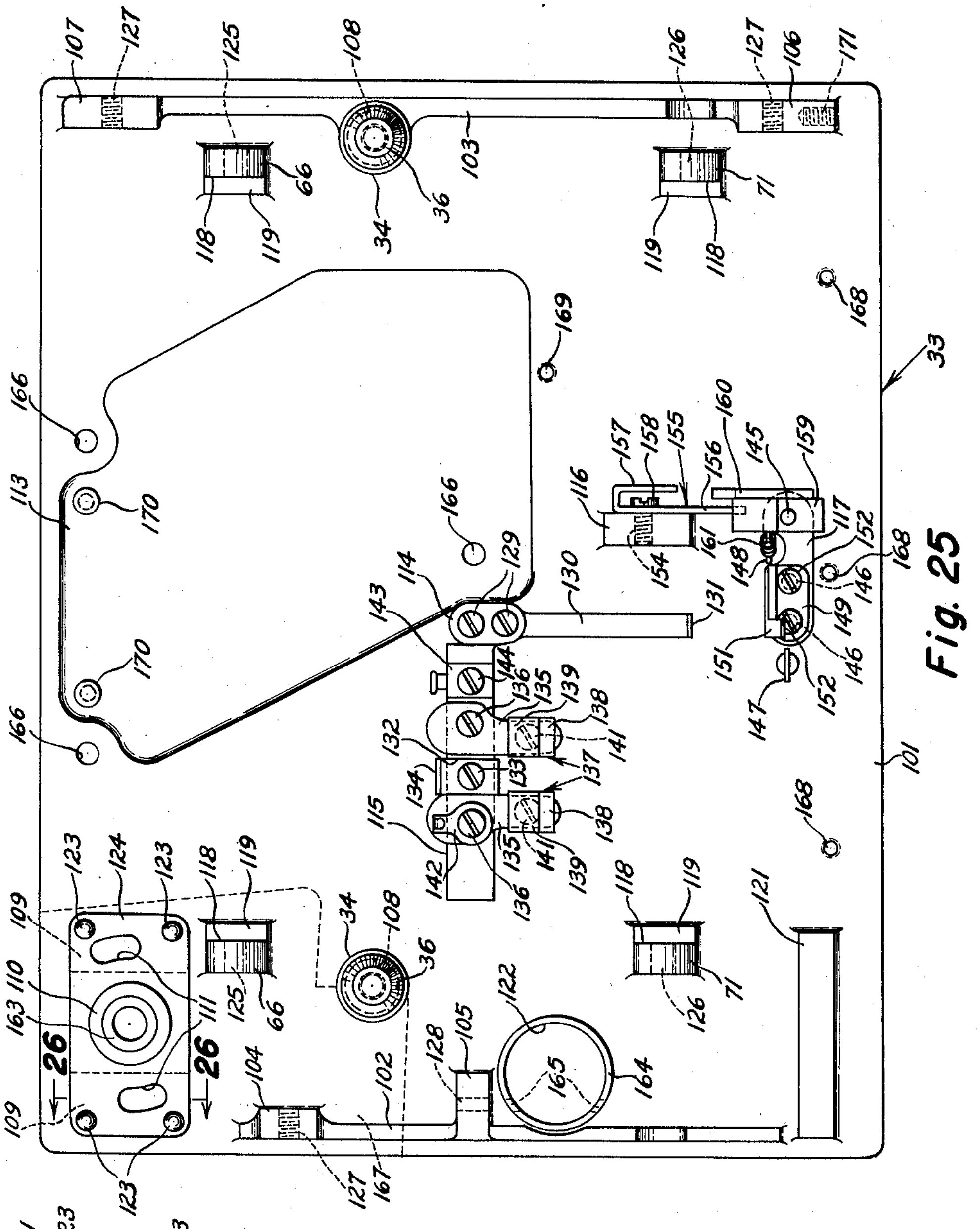
Figure 25 is a plan view of the meter base plate unit.

Referring for the moment to Figure 25, base plate unit 33 comprises a casting providing a substantially rectangular body portion 101, approximately 8⅜ inches from side to side and $6\frac{9}{16}$ inches from back to front and of any suitable thickness, preferably formed of S. A. E. standard No. 33 type 1 aluminum alloy. Body portion 101 has the previously described upstanding ears 66 and 71 formed thereon at a predetermined distance inwardly from opposite side edges. Forwardly and rearwardly extending ribs 102 and 103 paralleling said opposite side edges are integrally formed on body portion 101 and are spaced inwardly a predetermined distance sufficient to accommodate the thickness of cover 97. As clearly seen in Figure 25, rib 102 extends a substantial distance along the left side edge and terminates a predetermined substantial distance from the rear edge in an enlarged ear 104. Substantially midway of the front and rear edges of body portion 101 rib 102 intersects the outer end of a transversely disposed enlarged ear 105. Rib 103 has its opposite ends located a predetermined distance inwardly from the front and rear edges of body portion 101 and is provided with enlarged upstanding ears 106 and 107. One of the upstanding securing bosses 34, it will be noted, merges into rib 103 at a point a predetermined distance to the rear of the transverse center of body portion 101 and the other boss 34 is in transverse alignment therewith. The centers of both bosses 34 lie outwardly of a line connecting the outer faces of their adjacent ears 66 and 71 and are suitably cored to provide through apertures 108 to receive brass inserts 36 previously described.

Figure 26:
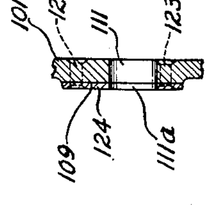
Figure 26 is a fragmental sectional view taken on line 26—26 of Figure 25.
Figure 39:
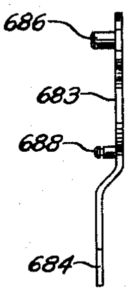
Figure 39 is a detailed edge view of the extras drum holding detent employed in this invention.

Adjacent the left rear edge, body portion 101 is provided with an apertured boss 110 and shallow transversely spaced lands 109 having circularly elongated slots 111 therein (Figure 26) concentrically disposed with respect to opening 110. Also adjacent the rear of body portion 101, and covering an area similar in shape to the frame plate 112 (Figure 16) of clock assembly unit 78, body portion 101 is provided with a depression 113.

To the left of depression 113 adjacent the front edge thereof, body portion 101 is provided with an upstanding lug 114, the left edge of which merges into a transversely extending, raised portion 115 terminating inwardly of the inner vertical faces of ears 66. Slightly in front of land 113 and to one side of the fore and aft centerline of body portion 101, an upstanding ear 116 is formed with its side faces extending in a forwardly and rearwardly direction. Substantially centrally disposed with respect to the opposite side edges of body portion 101 and spaced slightly inwardly from the front edge thereof body portion 101 is provided with a transversely extending land 117. Ears 66 and 71 throughout the length of their inner faces 118, are provided with forwardly and rearwardly extending lands 119. Adjacent its left hand forward edge and spaced inwardly from the front edge a predetermined distance, body portion 101 is provided with a transversely disposed land 121. Substantially midway between left hand ear 71 and the front face of ear 105, body portion 101 is provided with an opening 122. These ears, lands, ribs and openings are all formed in the casting operation and the lands are adapted by suitable machining operations to provide planar areas for accommodating the various assembly units and mechanisms to be hereinafter described.

To this end, lands 109 have their upper faces suitably machined to lie in a common plane and are provided with through openings adapted to receive rivets 123 for securing a wear plate 124 having slots 111*a* coinciding with slots 111 in place around boss 110. The lands 119 of ears 66 and 71 and land 121 are suitably machined to provide supporting faces in the same horizontal plane and are adapted to provide seating surfaces for units 65 and 69. As clearly seen in Figure 25, the ears 66 are suitably provided with through openings 125 to adapt them for receiving the bolt and nut assemblies and the ears 71 are suitably tapped at 126 to receive screws 68. Ears 104, 106, and 107 are suitably tapped at 127 to receive securing screws 127*a* (Figure 1) for fastening cover 97 to base plate unit 33. Transverse boss 105 is provided with a through opening 128 extending in a forwardly and rearwardly direction so a prolongation of its axis would lie over the left slot 111 in land 109. The purpose of opening 128 will be hereinafter described.

Lug 114 has its upper face suitably machined in a plane parallel to lands 119 and 121, and is provided with spaced apertures tapped to receive securing screws 129 provided to fasten a forwardly extending spring arm 130 having an upturned ratchet engaging pawl 131 in place on lug 114. The upper face of raised portion 115 is suitably machined to dispose it in a plane parallel to lands 119 and 121 and is provided with a depressed portion 132 (Figure 15) having a tapped aperture to receive securing screw 133 provided to fasten a substantially L-shaped stop member 134 in depressed portion 132 with one of its legs extending vertically upward at the rear of depressed portion 132 and the opposite sides of its other leg in engagement with the walls of portion 132 so as to prevent rotation of member 134. At opposite sides of depressed portion 132, raised portion 115 is provided with relatively short, light, forwardly extending leaf springs 135 secured in place by screws 136 threaded into suitably tapped apertures in portion 115. The forward ends of springs 135 are provided with position blocks 137 having forwardly and upwardly facing intersecting surfaces 138 and 139 (Figures 15 and 25) the purpose of which will be hereinafter pointed out. Suitable screws 141 threaded into the underside of blocks 137 secure blocks 137 to springs 135. A spring retainer 142 is also secured in place on top of the leaf spring 135 by its securing screw 136.

Adjacent the end of raised portion 115 nearest lug 114 a spring retainer 143 is fastened in place by screw 144.

Land 117 has its upper face machined to provide a surface parallel to lands 119 and 121, and its right end is suitably tapped to receive an upwardly extending cylindrical post 145 having an enlarged base the upper edge of which is flush with or just below the surface of land 117. Adjacent to opposite end land 117 is provided with spaced tapped apertures 146. To the left of land 117, body portion 101 is suitably tapped to receive a spring retainer 147 and midway between the right hand tapped aperture 146 and post 145 body portion 101 is suitably tapped to receive spring retainer 148. A substantially L-shaped member 149 having a vertically extending finger 151 at its left end is secured to land 117 by screws 152 threaded into apertures 146. As clearly seen in Figure 16, the upper end of finger 151 is sloped forwardly at 153 for a purpose to be presently pointed out.

Figure 16:
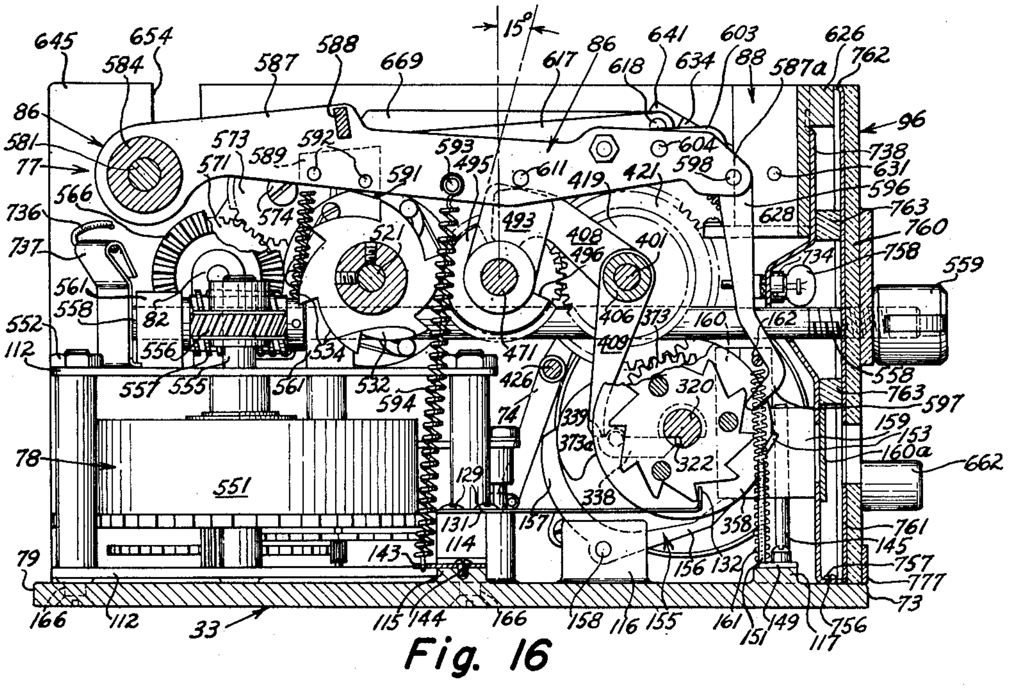
Figure 16 is a sectional view taken substantially on line 15—15 of Figure 11 looking in the direction opposite the direction of the arrows.

Ear 116 is provided with a tapped opening 154 and its right hand face is machined to provide a smooth working surface. A lever 155 having a forwardly extending arm 156 and an offset upwardly extending cam arm 157 is journalled against the machined face of ear 116 by means of a journal screw 158 threaded into aperture 154 of ear 116. As seen in Figures 8 and 16, arm 156 engages the under surface of a block 159 slidably carried by post 145 so as to be raised and lowered under control of cam arm 157 and a tension spring 161 connected to spring retainer 148 and a spring stud 162 on block 159 in a manner and for a purpose to be hereinafter pointed out. As clearly seen in Figures 16 and 25, block 159 has a vertically and rearwardly extending guide flange 160 adapted to be slidably received in a guide groove to be hereinafter described and provided by drum shaft assembly 72. Block 159 is suitably tapped along its front face as indicated in Figure 8 to receive securing screws (not shown) for attaching a rectangularly elongated shutter member 160*a* to block 159 in position to cover the window openings for the drums of assembly 72 when the meter is in the "home" position.

As clearly seen in Figures 6 and 25, apertured boss 110 of body portion 101 is provided with a bearing bushing 163 and opening 122 of body portion 101 is provided with an electrical socket adaptor 164 which is press fitted into opening 122 and is provided with aligned apertures 165, the axes of which coincide with the axes of aperture 128 in lug 105.

Body portion 101 adjacent the rear of depression 113 and at the forward left hand end of land 113, is provided with through openings 166 countersunk on the underside of body portion 101 and adapted to receive the securing screws of clock assembly unit 78. The underside of body portion 101 at the left rear end is suitably machined throughout the area 167 enclosed by the dotted lines and adjacent the front edge and the forward edge of depression 113 is provided with tapped apertures 168 and 169 for a purpose to be hereinafter pointed out. A suitably tapped aperture 171 is also provided in the front wall of ear 106.

The base plate unit 33 thus far described constitutes the basic subassembly unit upon which the other sub-assemblies are to be mounted in sequence. The next sub-assembly unit to be described is the left side frame and mileage gear and lever assembly unit, which is preferably the next unit in the sequence of final assembly.

*Left side frame and mileage gear and lever assembly unit*

The left side frame and mileage gear and lever assembly unit 65 is shown in Figures 6, 8, 9 and 15 and comprises a casting the body portion 176 of which is substantially flat on one face and has a pair of vertically spaced, right angularly disposed ears 177 extending outwardly from its other face adjacent one end and merging into a vertically extending, strengthening rib 178 provided to reinforce the rear edge of body portion 176. At its opposite end, body portion 176 is provided with a vertically extending supporting wall 179 disposed at right angles to body portion 176 and extending outwardly in the same general direction as ears 177. As clearly seen in Figure 9, supporting wall 179 has a forwardly extending boss 181 integrally formed thereon adjacent its upper end and provided with a through aperture 182 into which a bearing bushing 183 is press fitted. Supporting wall 179 is also provided with a through aperture 184 adjacent its outer edge 185, clearly indicated by Figures 6 and 9. Adjacent body portion 176, supporting wall 179 is provided with a through opening 186 (Figures 6 and 18), the forward end of which is countersunk as shown at 187. Adjacent the bottom of supporting wall 179, and in alignment with opening 128 of ear 105 and apertures 165 in electric socket adaptor 164, supporting wall 179 is provided with a through opening 188. The purposes of these openings will be hereinafter pointed out.

Spaced rearwardly from supporting wall 179, a distance of approximately 1½ inches, is a right angularly disposed supporting bracket 189 extending at right angles to body portion 176 and terminating a substantial distance upwardly from the lowermost edge of body portion 176. Bracket 189 is provided with an opening 191 having a bearing bushing 192 press fitted therein and disposed in alignment with bushing 183 of opening 182. Bracket 189 is also provided with a through opening 193 in alignment with opening 184 of wall 179. As clearly seen in Figure 6, the upper portion of bracket 189 is substantially thicker than the lower portion 194, which intersects a forwardly and rearwardly extending rib 195 provided to strengthen body portion 176.

Body portion 176 adjacent to and slightly forwardly of ears 177, is provided with a pair of vertically spaced and vertically aligned apertured bosses 196 and 197 each of which is provided with a press-fitted bearing bushing 198. As clearly seen in Figures 6 and 9, bosses 196 and 197 extend from body portion 176 in the same direction as ears 177, and are adapted to respectively journal stub shafts 199 and 201 which constitute the power shafts of the mileage gear and lever mechanism 85.

Referring for the moment to Figures 6 and 9, the outer ends of shafts 199 and 201 are respectively provided with worm gears 202 and 203, each of which is secured to its respective shaft by a set screw 204. Shaft 199 extends beyond the opposite side of body portion 176 and has secured thereto adjacent the face of body portion 176 a total mileage operating cam 205. In longitudinal spaced relation to cam 205, shaft 199 has journalled thereon a combined paid mileage cam and gear 206, which is held on shaft 199 by means of an intermediate paid mileage drive gear 207 secured to the extreme end of shaft 199 in abutting relation to combined gear and cam 206.

Body portion 176 is, adjacent its rear vertical edge on the inner face, provided with a pivot stud 208 which extends inwardly from body portion 176 to a point substantially opposite the end of shaft 199. Pivot stud 208 is adapted to receive a coil spring 209 and a shifter lever 211, both of which are held in assembled relation by means of a spring retainer 212 disposed in a groove 213 provided in the outer end of stud 208. As clearly seen in Figure 15, lever 211 is pivoted at one end and comprises a portion 214 extending upwardly from its pivot 208 and a substantially right angularly disposed portion 215 extending forwardly from pivot 208 and having a curved recess 216 in its under edge adapted to freely receive the hub of gear 207. Portion 215 of lever 208 carries an idler gear 217 journalled on stud 218 secured in lever 211. The forward end of portion 215 extends a substantial distance forwardly of shaft 199 and is provided with a stud 219 projecting toward body portion 176. One end of coil spring 209 hooks around portion 214 of lever 211 as shown at 221 and its other end 222 extends forwardly and under shaft 201 so as to normally tension spring 209 and cause it to bias lever 211 in a counterclockwise direction around its pivot 208 to engage gear 217 with gear and cam 206 and gear 207. As clearly seen in Figure 9, gear 217 is of a width substantially equal to the combined width of gear 207 and the gear portion of combined gear and cam 206 to adapt it for engagement with gears 207 and the combined gear and cam 206. When so engaged, combined gear and cam 206 is connected for rotation with cam 205 and shaft 199 through gear 207 and idler 217 with the result that cam 205 and cam portion of combined gear and cam 206 will rotate in unison.

Figure 15:
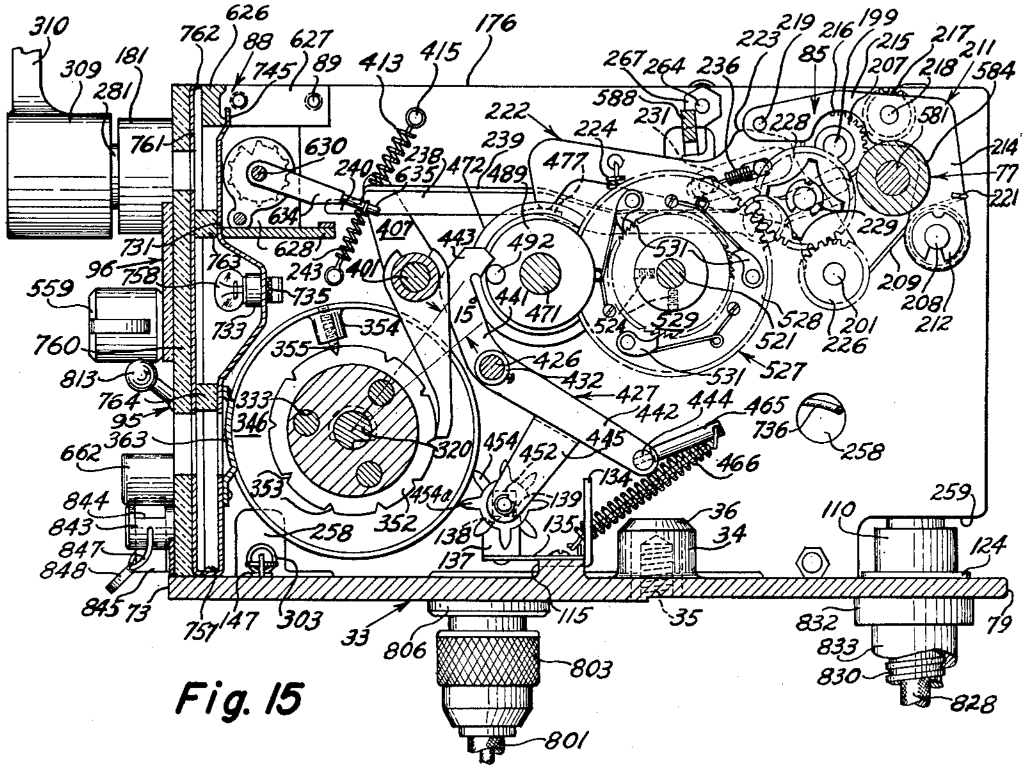
Figure 15 is a sectional view taken substantially on line 15—15 of Figure 11 looking in the direction of the arrows.

Since combined gear and cam 206 is to be driven only when the meter is placed in registering condition, means is provided to maintain lever 211 in a position to disengage gear 217 from gear 207 and combined cam and gear 206 so paid mileage cam 206 will operate only when meter 30 is registering. In the present invention, this is accomplished by single tariff shear 222 journalled on shaft 201 in spaced relation to body portion 176, substantially in the vertical plane containing gear 207. Tariff shear 222 as seen in Figure 15, is provided with a hump 223 at a point directly below stud 219 of lever 211 and is normally held in its upper position with hump 223 engaging stud 219 to hold gear 217 in its disengaged position. Shear 222 is resiliently biased in a counterclockwise direction as viewed in Figure 15 by a tension spring 224 connected at one end to tariff shear 222 and its other end to a stud 225 secured in body portion 176 and is held in its normal position by means of a cam shear assembly carried by unit 75.

The outer end of shaft 201 has secured to it a drive gear 226 which is adapted through a spacing washer 227 (Figure 15) to hold tariff shear 222 against longitudinal movement upon shaft 201.

Shear 222 carries an idler gear 228 journalled on its side by means of a stud and spring retainer assembly 229. Gear 228 constantly meshes with gear 226 on shaft 201 and through counterclockwise movement of shear 222 around the axis of shaft 201 is selectively meshed with a gear and ratchet wheel assembly carried by drive shaft assembly unit 76.

The face of shear 222 opposite gear 228 is provided with a slidable locking pawl 231 the point 232 of which is adapted to normally engage the gear teeth of combined gear and cam 206 and lock it against rotation due to its frictional contact with gear 207 and shaft 199. As clearly seen in Figures 9 and 15, locking pawl 231 is slidable mounted on pins 233 carried by pawl 231 and extending through axially aligned slots 234 provided in the body of shear 222. Pins 233 are slidably associated with shear 222 by means of spring retainers 234a. The most forwardly disposed pin 233 is substantially longer than the other pin and has its end 235 formed to provide a spring retainer to which one end of a coil spring 236 is connected. The opposite end of spring 236 is connected to a spring retainer 237 secured on the side of shear 222. It will thus be seen that spring 236 resiliently biases pawl 231 toward locking engagement with combined cam and gear 206 at all times and that disengagement of pawl 231 is effected only upon counterclockwise rotation of shear 222 under influence of spring 224.

Figure 34:
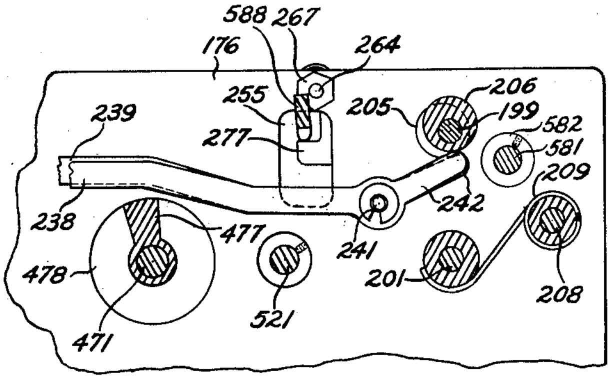
Figure 34 is a fragmental view showing the upper right hand corner of Figure 15 with certain parts removed and other parts in section to more clearly illustrate the construction and operation of certain parts of the meter of this invention.

The mileage counters are disposed at the left hand end of counter assembly unit 88 as viewed in Figure 8. To operate these counters a total mileage counter lever 238 and a paid mileage counter lever 239 are provided. Levers 238 and 239 are pivoted on the face of body portion 176 in side by side relation by means of stud and retainer assembly 241. As shown in Figures 9 and 34, levers 238 and 239 have rearwardly extending cam engaging portions 242 adapted to respectively contact total mileage cam 205 and the cam portion of combined paid mileage gear and cam 206. Since the pivot point of levers 238 and 239 is forwardly of the axis of rotation of these cams, the forward ends of levers 238 and 239 having fingers 240 cooperating with their respective counters will have an upward movement imparted thereto by rotation of the cams. Downward movement is imparted to levers 238 and 239 through the counter assemblies which are normally biased to their downward position by tension springs 243 connected at one end to elongated stud 244 provided with axially spaced spring retaining grooves 245 and secured in body portion 176.

Body portion 176 approximately midway between wall 179 and bracket 189 and upwardly from the bottom edge thereof a sufficient distance to provide clearance between base plate unit 33 and the registering drums of unit 72 is provided with an apertured boss 246 having press-fitted therein a bearing bushing 247. Bushing 247 is adapted to journal one end of the register drum shaft assembly 72 as indicated in Figure 6. Rearwardly spaced from bushing 247 and slightly above it and adjacent the forward face of wall 189, wall portion 176 is provided with an opening 248 adapted to journal one end of the fare drum stop finger and tariff drum drive gear shaft unit 83.

At a level substantially midway between the centers of boss 246 and opening 248 and just to the rear of bracket 189, wall portion 176 is provided with an opening 249 adapted to journal one end of the combined fare drum transfer pinion and clock stop finger shaft unit 74. Slightly to the rear of opening 249 in the horizontal plane of shaft 201, body portion 176 is provided with an apertured boss 251 having a bearing bushing 252 press-fitted therein and adapted to journal one end of the cam shaft assembly unit 75.

To the rear of boss 251, body portion 176 is provided with a tapped aperture 253 the axis of which is in the same horizontal plane as the axis of boss 251. Aperture 253 is adapted to threadedly receive a bearing bushing member 254 which is provided with a hexagonal head adapting it for ready removal when worn. Bearing bushing 254 is adapted to journal one end of the drive shaft assembly unit 76.

Disposed above opening 253 with its forward edge substantially in alignment with the axis of opening 253, is a vertically elongated rectangular opening 255 provided for a purpose to be hereinafter pointed out.

Arranged below and slightly to the rear of opening 253 and disposed in vertical alignment with each other, are a pair of outwardly extending bosses 256, each of which is suitably tapped as indicated at 257 (Figure 9) to mount a switch element of electrical control circuit 95 to be hereinafter described.

Substantially midway of a vertical line connecting bosses 256 and substantially in vertical alignment with the axes of shafts 199 and 201, body portion 176 is provided with a through aperture 258 providing a passage for an electrical lead of the electrical control circuit 95.

Adjacent the forward lower edge of body portion 176 and to the rear of wall 179, body portion 176 is provided with an aperture 258, and at its rearmost bottom end, body portion 176 is notched as indicated at 259 for purposes to be presently pointed out.

Each of ears 177 is preferably provided with vertically aligned press-fitted bearing bushings 261 for journalling the drive means 84.

The left side frame and mileage gear and lever subassembly unit is preferably composed of the various elements just described and is mounted on base plate unit 33 by positioning the outer wall of body portion 176 against the vertical faces 118 of ears 66 and 71 and inserting bolt assembly 67 through ear 66 and aperture 262 (Figure 6) provided in body portion 176 and screw 68 through ear 71 into threaded engagement with tapped aperture 263 provided in body portion 176. When assembled in this manner, aperture 188 of wall 179 is aligned with apertures 165 of electrical socket adaptor 164 and aperture 128 of transverse ear 105. The purpose of these aligned apertures is to receive a locking and sealing assembly adapted to be applied at the time the meter is installed in the vehicle.

Time delay mechanism 87 and flag shaft assembly 91 and its related mechanism are preferably assembled on unit 65 after unit 65 is secured to unit 33. For the sake of convenience, mechanism 87 and flag assembly 91 and their manner of assembly will now be described.

*Time delay mechanism*

Time delay mechanism 87, as previously pointed out, is provided to maintain the fare registering elements of the meter in an inoperative position until the initial fare registered upon throwing the flag shaft assembly 91, is consumed. This time delay mechanism comprises a pivot stud 264 threaded into a suitable aperture formed in body portion 176 of unit 65 adjacent the upper left hand corner of opening 255, a sleeve 265 having annular end flanges at each of its ends journalled on stud 264, a lock nut 267 threaded on the end of stud 264 into abutting engagement with the opposite wall of body portion 176 and a depending arm 268 journalled on stud 264 between the outer end of sleeve 265 and the head of stud 264. The lower portion 269 of arm 268 extends downwardly to a point slightly below opening 253, is outwardly offset beyond the head of stud 264 and is provided with a cam surface 271 adapted to cooperate with a cam, to be hereinafter described, carried by drive shaft assembly unit 76. A coil spring 272 surrounds sleeve 265 between its end flanges and has one end hooked around portion 269 of arm 268, as indicated at 273. The opposite end 274 of spring 272 bears against the under side of boss 196 so as to tension spring 272 and cause it to normally bias lever 268 toward opening 253.

The outer face of portion 269 of arm 268 at a point opposite opening 255, is provided with a pivot stud 275 which carries a pivoted catch element 276 having a supporting finger 277 which projects partway across opening 255 and is adapted to operatively support a projection arm of the registering lever assembly 86 of subassembly 77. Catch element 276, at a point spaced downwardly and rearwardly from its pivotal axis, is provided with a slot 278 adapted to cooperate with a set screw 279 threaded into portion 269 of arm 268. Slot 278 and set screw 279 adapt catch element 276 for slight angular adjustment around pivot stud 275 in order to raise or lower finger 277 and make final fine adjustments to assure proper functioning of the delay mechanism 87. The operation of time delay mechanism 87 in conjunction with drive shaft assembly unit 76 and fare and trip counter lever shaft assembly unit 77 will be hereinafter described.

*Flag shaft assembly*

Flag shaft assembly 91 comprises a shaft 92 journalled in bushings 183 and 192 of unit 65 with its opposite ends projecting forwardly beyond boss 181 and rearwardly beyond bracket 189. The rearwardly projecting end of shaft 92 is provided with a worm gear 93 which is secured to shaft 92 by means of a tapered pin 283 driven into a suitable through opening provided in shaft 92. Shaft 92 at the opposite side of bracket 189 is provided with a ratchet wheel 284 of a flag shaft locking and release mechanism 285, the details of which form no part of the present invention and are fully described in United States Patent 1,678,480 to Paul Riegger issued July 24, 1928. Ratchet 284 is secured to shaft 92 by means of a tapered pin 286 drivingly associated with a suitable aperture formed in shaft 92. As clearly seen in Figures 6 and 8, ratchet 284 is secured to shaft 92 with the face of stop tooth 284*a* at an angle of 15° in a clockwise direction from the axis of pin 286 which axis is in a horizontal plane in the home position illustrated in Figure 8. The cooperating pawls of locking mechanism 285 are pivoted on the front face of bracket 189.

Flag shaft 92, adjacent the rear face of wall 179, is provided with a flag positioning cam 287 having four equiangularly disposed dwell formations 288, 288*a*, 288*b* and 288*c* (Figure 18) positioned in predetermined relation to ratchet 284 by means of a tapered pin 289 drivingly associated with a suitable opening provided in shaft 92 with its axis in the horizontal plane containing the axis of pin 286 and with the diametrical plane of opposite dwells 288 to 288*c* respectively disposed at an angle of 19° to the axis of pin 289 and a plane at 90° to the 19° angle.

Figure 18:
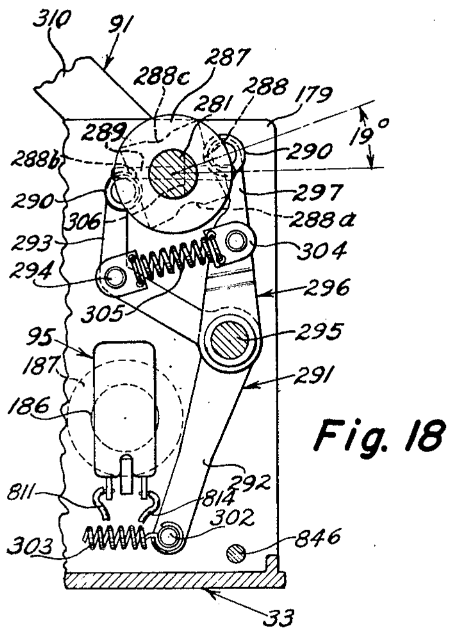
Figure 18 is a fragmental sectional view taken substantially on line 18—18 of Figure 6 looking in the direction of the arrows and showing the flag shaft positioning cam detent mechanism.

Positioning cam 287 is adapted to be engaged by a pair of diametrically opposed rollers 290, one of which is carried by a lever arm 291 having a downwardly directed arm 292 and an upwardly curved arm 293 extending toward the body portion 176 of unit 65 and provided intermediate its length with a spring retaining stud 294 (Figure 18).

As clearly seen in Figures 6 and 18, lever 291 is journalled on a supporting shaft 295 carried in openings 184 and 193 of wall 179 and bracket 189 respectively. A second lever 296 is journalled on shaft 285 adjacent lever 291, and is provided with a portion 297 off-set in the direction of wall 179 so as to dispose its associated roller 290 in the plane of positioning cam 287. Shaft 295 and levers 291 and 296 are held against longitudinal movement relative to wall 179 and bracket 189 and each other by means of collars 298 secured to shaft 285 by set screws 299 and spaced apart by sleeve 301.

The lower end of lever 291 is provided with a spring retainer stud 302. One end of a tension spring 303 is connected to stud 302 and the other end is connected to spring retainer 167 of base plate unit 33. Off-set portion 297 of lever 296, adjacent its lower end, is provided with a spring retainer 304 and a tension spring 305 has one end connected to retainer 304 and the other end connected to retainer 294 of lever 291. From the foregoing description, it will be appreciated that spring 303 normally biases arm 291 in a clockwise direction to resiliently retain roller 290 of arm 291 in engagement with positioning cam 287 and spring 305 normally biases lever 296 in a counterclockwise direction to resiliently engage its roller 290 with the positioning cam diametrically opposite the other roller 290.

The forwardly protruding end of shaft 92, as clearly shown in Figure 1, is provided with a flat 306 formed at right angles to the axes of pins 286 and 288 and is adapted to receive a knurled bushing 307 having a flat lug 308 formed in the wall of its bore (Figure 27) and adapted to cooperate with flat 306 to assure unitary rotation of bushing 307 and shaft 92. As clearly seen in Figure 1, knurled bushing 307 is adapted to have complementary knurled hub 309 of flag 310 associated therewith in a manner to assure unitary rotation of bushing 307 and flag 310. Bushing 307 and flag 310 are secured against axial movement along shaft 281 by means of a tapered pin 311 cooperating with a through opening 312 centered with respect to lug 308 of bushing 307 (Figure 27) and extending completely through hub 309, bushing 307 and the end of shaft 92.

As will be clear from a consideration of Figure 8 and Patent 1,678,480, locking mechanism 285 prevents counterclockwise rotation of flag 310 and the associated flag shaft 92 from its first registering position to "home" position and from "home" position to its third registering position and permits rotation of flag 310 and shaft 92 in a clockwise direction only after the flag is moved slightly in a counterclockwise direction to release latch element 313 of locking mechanism 285. This releasing action is effected by engagement of pawl 314 loosely pivoted on stud 314*a* carried by bracket 189 with tooth 315 of ratchet 284 during the slight counterclockwise movement permitted by mechanism 285 and the resulting clockwise movement of pawl 314 which acts through spring stud 316 on pawl 314 to rotate latch element 313 in a clockwise direction out of the path of tooth 284*a*. In its final position stud 316 lies under the heel 317 of element 313 and holds element 313 out of the path of tooth 284*a* until tooth 284*a* passes element 313 at which time the peripheral surface of ratchet 284 acts to hold element 313 in its nonlocking position and imparts counterclockwise movement to pawl 314 to condition it for its next releasing movement.

As a consequence, flag 310 and flag shaft 92 may not be moved from its home or inoperative position, as shown in the drawings, to a registering position, until the slight counterclockwise movement required by the mechanism 285 is accomplished. This locking mechanism, therefore, prevents accidental movement of flag 310 and flag shaft 92 to a registering position and also prevents continuous and rapid movement of flag 310 and flag shaft 92 in a clockwise direction from its final registering position through the home position to its initial registering position. As a consequence, clockwise rotation of the flag and flag shaft is stopped momentarily in the home position so that the meter registering mechanism will have sufficient time to permit re-setting of the meter mechanism, drums and counters to their normal "for hire" or "home" position before the meter can be set for the next trip and prevents an unprincipled operator from overcharging a passenger by a manipulation of the flag in a manner to effect a setting of the fare drums to an improper initial charge.

It will be seen from an inspection of Figure 18 that flag 310 and flag shaft 92 have four operating positions and that positioning cam 287 and rollers 290 which snap into the selected dwells 288 and 288c as soon as the rollers pass the corners of the positioning cam assure proper positioning. The position shown in Figure 18 is the "home" or "for hire" position, dwells 288 and 288b being the controlling factor in determining the "home" position. In this position the meter operating mechanism is inoperative except for the total mileage drive and the fare drums are in their "for hire" position.

The first operating position, 90 degrees from the "home" position, is determined by cooperation of rollers 290 with dwells 288a and 288c. When in this position, the meter operating mechanism through flag shaft gear 93 and cam shaft assembly 75 is conditioned for registering operation at the single tariff rate, the tariff drum and the trip counter are operated and the fare and tariff drums are exposed. In this position, the fare drum indicates the fare for the first unit distance of travel or time, the tariff drum is rotated one quarter of a turn so as to display the notation "Hired" or the single tariff rate whichever indication is desired for the particular meter in question and the trip counter is actuated to indicate a paid trip.

The next operating position, 90 degrees from the first operating position in the same direction from the "home" position, is determined by cooperation of rollers 290 with dwells 288b and 288. This position is customarily provided for localities, such as the European countries, where a single and double tariff rate are in effect and would in such cases rotate the gear 282 and cam shaft assembly 75 and tariff drum an additional quarter revolution and effect operation of double tariff shear so that the tariff drum and fare drum would indicate the initial double tariff rate and the meter would be conditioned for operation at this different tariff rate. In the meter illustrated in the drawings, which is adapted for use in the United States where the single tariff rate alone is used, the double tariff shear which normally would be disposed on shaft 201 adjacent single tariff shear 222 and adjacent the single clock shear of assembly 81 in a manner similar to the shear arrangement of U. S. Patent 1,762,862 to J. Gluck, are omitted. Accordingly, the tariff drum alone is operated during the movement to the second operating position and the fare drum and its driving mechanism remain coupled to be driven at the single tariff rate.

The next position determined by cooperation of rollers 290 with dwells 288c and 288a is a preliminary non-operating position in which the flag and flag shaft are turned at the end of a trip and before returning to the "home" position. When this position is reached, the gear 93, cam shaft assembly 75 and tariff drum will have been rotated an additional one quarter of a turn in the same direction from the "home" position and the clock drive gear shear shaft assembly 81 has been moved to its "home" position to disconnect the operating mechanism from the clock assembly 78 and its drive gear and shear assembly 81. The trip counter, the fare drum and the extra passenger drum and counter will, however, remain in their last indicating position and the operator and the passenger will both be in a position to check the total fare due and effect proper settlement before the meter is cleared for the next trip.

From this last mentioned inoperative position the flag is rotated an additional quarter of a turn in the same direction as before to the "home" position. During this quarter revolution the meter operating mechanism is reset to its non-registering position under control of the reset mechanism 99.

*Register drum shaft assembly*

Figure 20:
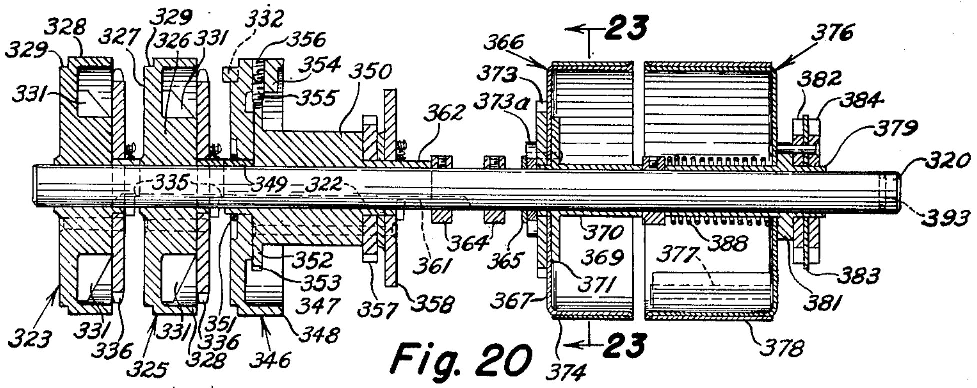
Figure 20 is a detail view illustrating the register drum shaft assembly of the meter of Figures 1 to 19.

Register drum shaft assembly 72 (Figures 8, 11, 15, 16, 17 and 20) comprises a shaft 320 one end of which is journalled in bushing 247 of left hand frame assembly 65 (Figure 8) and the other end of which is adapted to extend through right side frame and extra drum and counter operating assembly 69 where it is journaled in journal bushing 321. Referring in particular to Figure 20, shaft 320 adjacent the end journalled in assembly 65 is provided with a longitudinally extending spline groove 322 the purpose of which will presently appear. Adjacent left side frame and mileage gear and lever assembly 65, shaft 320 rotatably supports a $10.00 drum 323 the periphery of which has a horizontal dash 324 at the zero position and is numbered in sequence from the dash around the periphery from one to nine. Immediately adjacent to and to the right of drum 323 shaft 321 rotatably supports a $1.00 fare drum 325 the periphery of which is inscribed with numerals 0 through 9. Both of these drums are constructed in substantially the same manner so a description of the drum 325 only will be given here.

Referring for the moment to Figures 20 to 22, drum 325 comprises a die casting having a hub 326 merging into an enlarged radially extending end flange 327. The outer edge of end flange 327 carries an integral, axially extending peripheral flange 328 and the exposed face of flange 327 is recessed at its periphery to provide an annular shoulder 329. As clearly seen in Figure 20 hub 326 and end flange 327 are interconnected by radially extending reinforcing flanges 331 adapted to minimize warpage of the casting during its finishing operations.

The peripheral flange 328 has the characters 0 to 9 cast therein in relief and the casting dies are formed to provide a single gear tooth space 332 on the exposed face of flange 327 with its centerline disposed at an angle of 12° below a plane through the centerline of the "0" marking on the periphery.

The hub portion 326 is provided with three equally spaced rivet holes 333 (Figure 21), the rivet hole opposite tooth space 332 being centered in a plane disposed at an angle of 15° above the plane of the "0" centerline. Hub portion 326 at its opposite ends is provided with a portion 334 of reduced diameter of a length adapted to properly position the drums with respect to each other upon shaft 320. The portion 334 of hub 326 at the right end of drum 325, as viewed in Figure 20 is notched along the plane of line 335 of Figure 22 for a purpose to be presently pointed out.

As clearly seen in Figure 20, the right hand end of hub 326 is substantially flush with the axial edge of flange 328 and is adapted to abut a side face of gear element 336 which is provided with angularly spaced rivet openings mating with rivet openings 333 of hub 326. Suitable tapered rivets (dotted lines Figure 20) passing through these mating rivet openings and having their heads machined off flush with the opposite face of gear 336 and the exposed face of flange 327 secure gear 336 to hub 326. Gear 336 (as seen in Figure 22) is provided with twenty teeth arranged so that the tooth space opposite the 15° angularly disposed rivet hole is in the plane of the center line of tooth space 332.

Gear 336 at a point on the center line of zero and opposite the 15° angularly disposed rivet hole of hub 326 is provided with a tapped opening adapted to receive a pivot stud 337 for pivotally mounting a pawl 338 having an outwardly and radially extending shoulder 339 adapted to normally lie in the plane of the center line of zero and an inwardly extending finger 341 the upper surface of which is adapted to abut the adjacent edge of axially notched hub 334. Finger 341 is provided with an end surface 342 adapted to ride upon the periphery of shaft 320 and enter into axial spline groove 322 upon counter-clockwise rotation of shaft 320 as viewed in Figures 7 and 22 during the resetting operation of the meter. A suitable tension spring 343 having one end connected to pawl 338 and its opposite end connected to gear 336 normally biases pawl 338 to its normal position as shown in Figure 22.

Drum 323 is constructed in the same manner as drum 325 except that the tooth 332 is omitted from its end face and the zero character is replaced by the dash 324.

Figure 28:
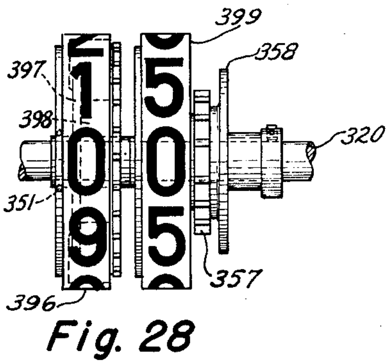
Figure 28 is a fragmental elevational view illustrating a modified units and tens fare drum assembly that may be used in place of the standard units and tens drum indicating assembly of Figures 1 to 19.
Figures 29, 30:
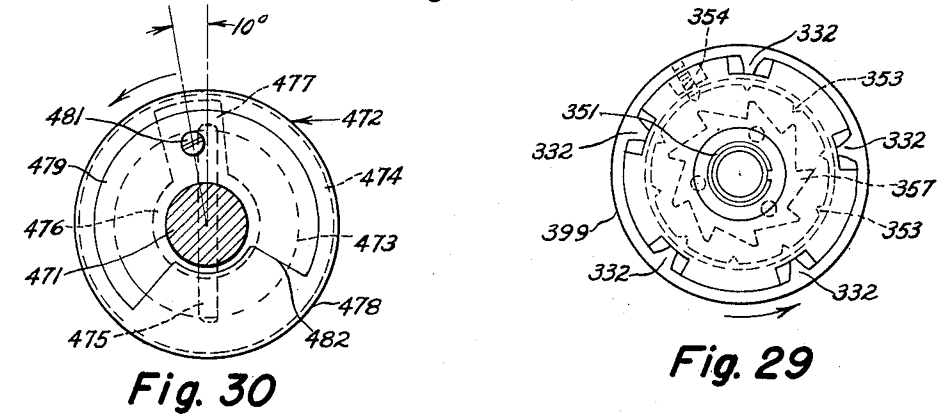
Figure 29 is an end view of the units drum of Figure 22.
Figure 30 is a detailed transverse sectional view through the camshaft subassembly of Figure 15 taken just to the right of and looking toward the mileage cam shear assembly.

While a dollar and a ten dollar drum of the construction just described may be used with any suitable tens and unit drum construction adapted to provide any desired unit fare rate the illustrated meter contemplates a 10 cent unit rate or a 5 cent unit rate. In this connection, the mechanism illustrated in Figures 8, 11 and 20 provides a 10 cent unit fare and the alternative structure illustrated in Figures 28 and 29 provides a five cent unit fare.

Referring for the moment to Figures 8, 11, 15 and 20, a tens drum assembly 346 is rotatably mounted on shaft 320 adjacent the $1.00 drum 325. Assembly 346 comprises a die cast drum, having a radially extending end wall 347 and an axially extending peripheral wall 348, rotatably journalled upon a reduced end 349 of a hub 350 and held against axial movement by a snap ring 351. Sleeve 350 is in turn rotatably journalled on shaft 320. As clearly seen in Figures 15 and 20, hub 350 has a radially extending flange 352 provided with equally angularly spaced, axially extending V slots 353 in its periphery. The inner surface of peripheral wall 348 of the drum is provided with an integral boss 354 extending radially inwardly toward flange 352. Boss 354 is suitably tapped to receive a positioning screw 355 having a conical end adapted to snugly fit in a selected one of notches 353 to secure the drum 346 to hub 350 to assure unitary rotation of the hub and drum. A set screw 356 is also threaded into boss 354 so as to lock positioning screw 355 against accidental loosening. It will thus be appreciated that hub 350 and its associated tens drum are relatively angularly adjustable by loosening and removing screw 356 and loosening screw 355 but that when in assembled relation they in effect become a unitary assembly.

The periphery of drum assembly 346 is inscribed with the numerals zero to nine and notches 353 in flange 352 are ten in number, corresponding to the number of characters on the periphery, and are arranged so that their axial centerlines coincide with the axial center line of the drum characters when the drum and hub 350 are in assembled relation. Hub 350 is provided with rivet holes 333 to receive three equally spaced tapered rivets arranged in angular relation to the center line of zero in the same manner that the rivets of drum 325 are arranged. This is clearly indicated in Figures 15 and 16. These rivets pass from end to end through hub 350 and are adapted to secure a ratchet wheel 357 and pawl disc 358 to the right end of hub 350 as clearly shown in Figure 20.

Referring for the moment to Figure 16, it will be seen that ratchet wheel 357 is provided with ten teeth, each of which has a radial shoulder lying in a plane subtending the midpoint between numerals on the drum periphery. This assures proper positioning of the numerals by the actuating pawl to be presently described and forming a part of the registering lever assembly 86. Disc 358 on its face opposite the face engaging ratchet wheel 357 is provided with a reset pawl 338 corresponding exactly with pawl 338 of drum 325 and adapted to cooperate with the notch 361 (Figures 16 and 20) in the reduced end 362 of sleeve 351 during the resetting operation of the meter. Referring to Figure 20, it will be noted that hub 350 is of sufficient length to occupy the space of two fare drums and that no unit fare drum is used in this form of mechanism. This construction, as previously mentioned is utilized where the unit fare rate is ten cents so that the fare increases in multiples of ten. With such a construction, the units drum window in the face of the meter is preferably covered as shown in Figure 15 by a stationary units indicator 363 in the form of a bowed plate member riveted to the brass light socket plate of the front assembly 96 to be presently described.

The meter illustrated in the drawings is designed to operate in a locality where the initial fare rate is 35 cents and the unit mileage rate or elapsed time rate is 10 cents. Accordingly, plate 363 in the illustrated embodiment would have the number 5 inscribed on it and the tens drum assembly 346 just described is normally set to display the numeral 3 when the meter mechanism is disposed in its "home" or "for hire" position. This position of the tens drum assembly is obtained by rotating the drum of assembly 346 in a counter-clockwise direction as viewed in Figure 15 and engaging retaining screw 355 with the appropriate notch 353 to display the numeral 3 as shown in Figure 8. It will, of course, be appreciated that hub 350 through cooperation of pawl 338, notch 361 of hub 362 and groove 322 of shaft 320 will always return to the same relative position with respect to shaft 320 and the other fare drums when the meter is reset to the "for hire" position. In order to hold fare drums 323, 325, and drum assembly 346 with its associated ratchet wheel and disc against longitudinal movement on shaft 320, a securing collar 364 is secured in place against reduced section 362 of hub 350 by suitable securing screws.

A second collar 364 is secured to shaft 320 in longitudinally spaced relation to the right of the first securing collar 364 and in spaced relation to a friction ring and spacer assembly 365 loosely mounted on shaft 320 at the end of a tariff drum assembly 366 journalled for rotation on shaft 320. The space between friction ring and spacer assembly 365 is adapted to receive the rearwardly extending guide flange 160 of block 159 (Figures 8, 16 and 25) and retain it against rotational movement with respect to post 145.

As clearly seen in Figures 20 and 23 tariff drum assembly 333 comprises a hollow, open ended drum 367, the peripheral wall of which is provided with an axially extending slot 368, carried by a hub member 369 which has a reduced section 370 and a radially extending flange 371. The end wall of the drum 367 is secured to flange 371 by rivets 372 which also secure a gear 373 and cam member 373a to the exposed face of the end wall of drum 367. The desired tariff rate or a "hired" inscription for drum 367 is provided by a suitably inscribed metallic band 374 applied to the periphery of drum 367 by inserting its opposite free ends 375 through slot 368 and bending them against the inner peripheral surface of drum 367 to retain band 374 in place as shown in Figure 23.

Since the embodiment of this invention shown in these figures of the drawing is adapted to operate on a shingle tariff rate the band 374 preferably has no inscription at the "home" position, has the word "hired" inscribed at the first and second operating positions and has the word "stopped" inscribed at the third position intermediate the second operating and home positions. It will be appreciated, therefore, that operation of the flag shaft as heretofore described will move drum assembly 366 one quarter of a turn to display the word "hired" in the first operating position, will rotate a second one quarter of a revolution to display the second word "hired" at the second operating position and will be rotated a third quarter of a turn to display the word "stopped" at the third position. This operation of drum assembly 366 is effected through suitable gear means to be hereinafter described carried by cam shaft assembly 75. In order to retain drum assembly 366 in its desired position on shaft 320, a third securing collar 364 is secured to shaft 320 in position to engage the right hand end of hub portion 370 as shown in Figure 20.

As clearly seen in Figure 16, cam 373a is normally disposed at the rear of drum 367 and engages cam arm 157 during movement of drum assembly 366 from its "stopped" to home position to raise block 159 to its upper position with shutter element 160a carried by block 159 covering the windows through which the drums of drum shaft assembly 72 are displayed. Spring 161 (Figure 8) returns block 159 and shutter 160a to their lower position to clear said windows when cam 373a clears arms 157.

Immediately adjacent the open end of drum 367, shaft 320 rotatably supports a hollow, open ended extras drum 376 having its end wall disposed at the end remote from tariff drum assembly 366. Drum 376, as clearly shown in Figures 17 and 20, has an axially extending slot 377 formed in its peripheral wall and is adapted to receive a metallic band 378 secured to drum 376 in the same manner as band 374 is secured to drum 366. In the present embodiment of the invention the extras fare indications are arranged on band 378 in multiples of 35 cents and run from zero to three dollars and fifteen cents. Accordingly, it will be appreciated that nine indications are provided on drum 376 and that the center line of each of these indications are disposed at intervals of 40° around the drum.

Drum 376 is mounted on a hub member 379 one end of which protrudes into drum 376 and abuts the last mentioned securing collar 364, the center portion 381 of which forms a spacing flange, and the other end of which receives a holding ratchet 382, a thin spacing disc 383, and an actuating ratchet 384. Drum 376, flange 381, ratchets 382 and 384 and disc 381 are all secured together by suitable tapered rivets 385 so as to rotate as a unit with respect to shaft 320.

Figure 17:
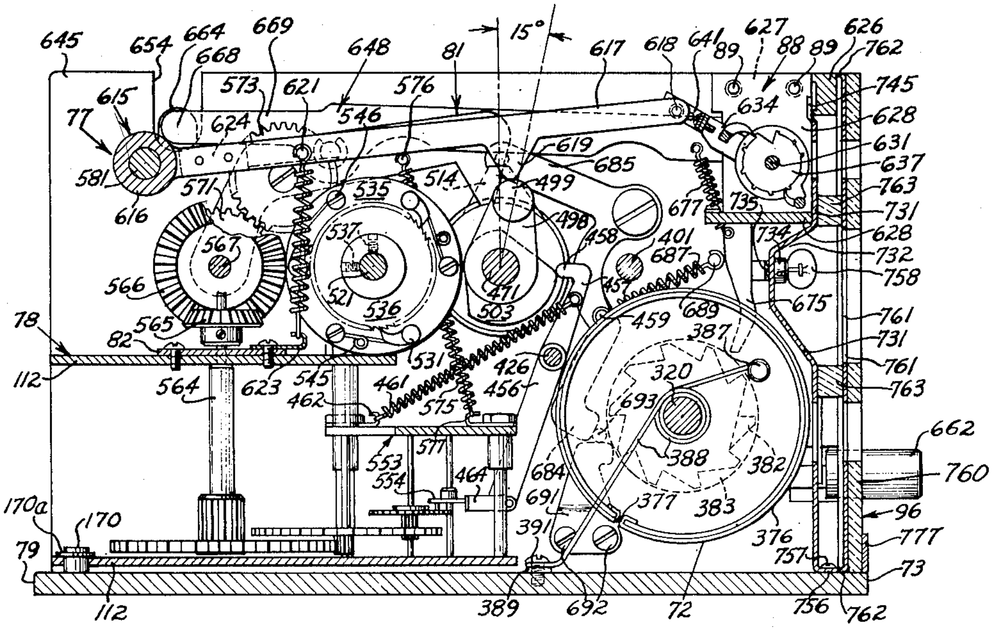
Figure 17 is a sectional view taken substantially on line 17—17 of Figure 11 looking in the direction of the arrows.

Referring to Figures 8 and 17, it will be noted that operating ratchet wheel 384 opposite the zero position has a tooth omitted so as to provide a straight face 386 out of the path of the extras drum operating pawl of assembly 69 to be presently described. This ratchet construction prevents rotation of drum 376 from its three dollar and fifteen cent position back to zero through the instrumentality of the actuating pawl and provides an operating ratchet wheel having one less tooth than the holding ratchet wheel which is provided with nine teeth disposed so as to hold one or the other of the nine extras fare indications in proper position for display through the appropriate window provided in the meter front assembly 93.

In order to return drum 376 to its zero indicating position, the inner face of the drum end wall is provided with a spring securing stud 387 (Figure 17) adapted to have one end of coil spring 388 surrounding hub 379 secured thereto. The opposite end 389 of spring 388 extends through the open end of drum 376, passes backwardly between the adjacent ends of drums 367 and 376 and is secured to base plate assembly 33 by means of a securing screw 391 threaded into tapped aperture 169 (Figure 25) provided in body portion 101 of assembly 33.

The structure so far described completes assembly 72 which is mounted on base plate and left side frame assemblies 33 and 65 at this time by inserting the end of shaft 320 in bearing 274, base plate and left side frame assemblies 33 and 65 preferably being disposed on left side frame assembly at this time to aid in retaining assembly 72 in place.

The end of shaft 320 extending beyond right side frame and extras drum and counter operating assembly 69 is adapted to receive a pinion gear forming a part of reset mechanism 99 to be hereinafter described. To this end, shaft 320 is provided with a tapered through opening 393 (Figure 20) at its last mentioned end. The end of shaft 320 (Figure 7) is provided with a reference mark 395 to locate the centerline of groove 322 and opening 393 is preferably aligned with this reference mark to assure proper timing of the resetting mechanism in a manner to be hereinafter pointed out. The drums 323, 325, and 346 are normally held in their "home" positions by fare drum stop finger and tariff drum drive gear assembly 83 which also actuates tariff drum 366 as will presently be described.

Referring for the moment to Figures 28 and 29, the modified tens and units drum structure to be used in place of drum 346 and hub 351 will now be described. This construction comprises a tens drum 396 rotatably journalled on a radially flanged hub 397 by means of a snap ring 351 in the same manner that the drum of assembly 346 is secured to hub 350. The radial flange of hub 397 is provided with peripheral notches 353 arranged in the same manner as notches 353 of hub 350 and an inwardly directed tapped boss 354 similar in all respects to boss 354 of drum assembly 346 and a positioning screw 355 and set screw 356 adapting drum 396 for angular adjustment with respect to hub 397 to set the tens drum to indicate the initial base fare.

A gear 336 similar in all respects to gears 336 of drums 323 and 325 is secured to hub 397 by tapered rivets passing through rivet holes arranged in the flange of hub 397, gear 336 and a spacing sleeve 398 in the same manner that rivet holes 333 are arranged in drums 323 and 325. The exposed face of gear 336 of drum 396 is also provided with a pawl 338 and a tension spring 343 identical in construction and function to pawls 338 and springs 343 previously described. Hub 397 is also provided with a notch along the plane of a line 335 in exactly the same manner as drums 323 and 325 and for the same purpose and drum 396 is also provided with a tooth space 332 on its outer end wall face corresponding to tooth spaces 332 of drums 323 and 325.

A units drum 399 is mounted on a hub 350*a* journalled on shaft 320 and is provided with five equally angularly spaced tooth spaces 332 (Figure 29) adapting drum 399 for actuation of drum 396 every second unit movement of drum 399. As hub 350*a* is identical to hub 350, except for its substantially shorter length, and as drum 399 is also provided with an inwardly extending tapped boss 354, a positioning screw 355 and set screw 356, it will be appreciated that drum 399 may also be set at any desired position in effecting the initial fare setting of the fare drums and will be rotated one unit distance for each registering movement of registering lever assembly 86.

Since drum 399 is adapted to actuate tens drum 396 every second unit movement of drum 399, it will be appreciated that the unit fare rate in this modification is $0.05. Accordingly, the periphery of drum 399 has the numerals "0" and "5" alternately inscribed on it so as to alternately display the numerals "0" and "5" through the units fare drum window and the stationary unit indicating plate 363 is omitted when this construction is employed.

While the present application discloses fare drum constructions adapted for use on either a $0.10 or $0.05 unit fare rate, it will be appreciated that the present meter may be adapted to operate on any desired unit fare rate by appropriate numbering of the drum assembly 349 or the tens and units drums 396 and 399 of Figures 28 and 29.

*Fare drum stop finger and tariff drum drive gear shaft assembly*

The fare drum stop finger and tariff drum drive gear shaft assembly 83 is illustrated in Figures 8, 11, 14, 15 and 16.

Figures 12, 13, 14, 35:
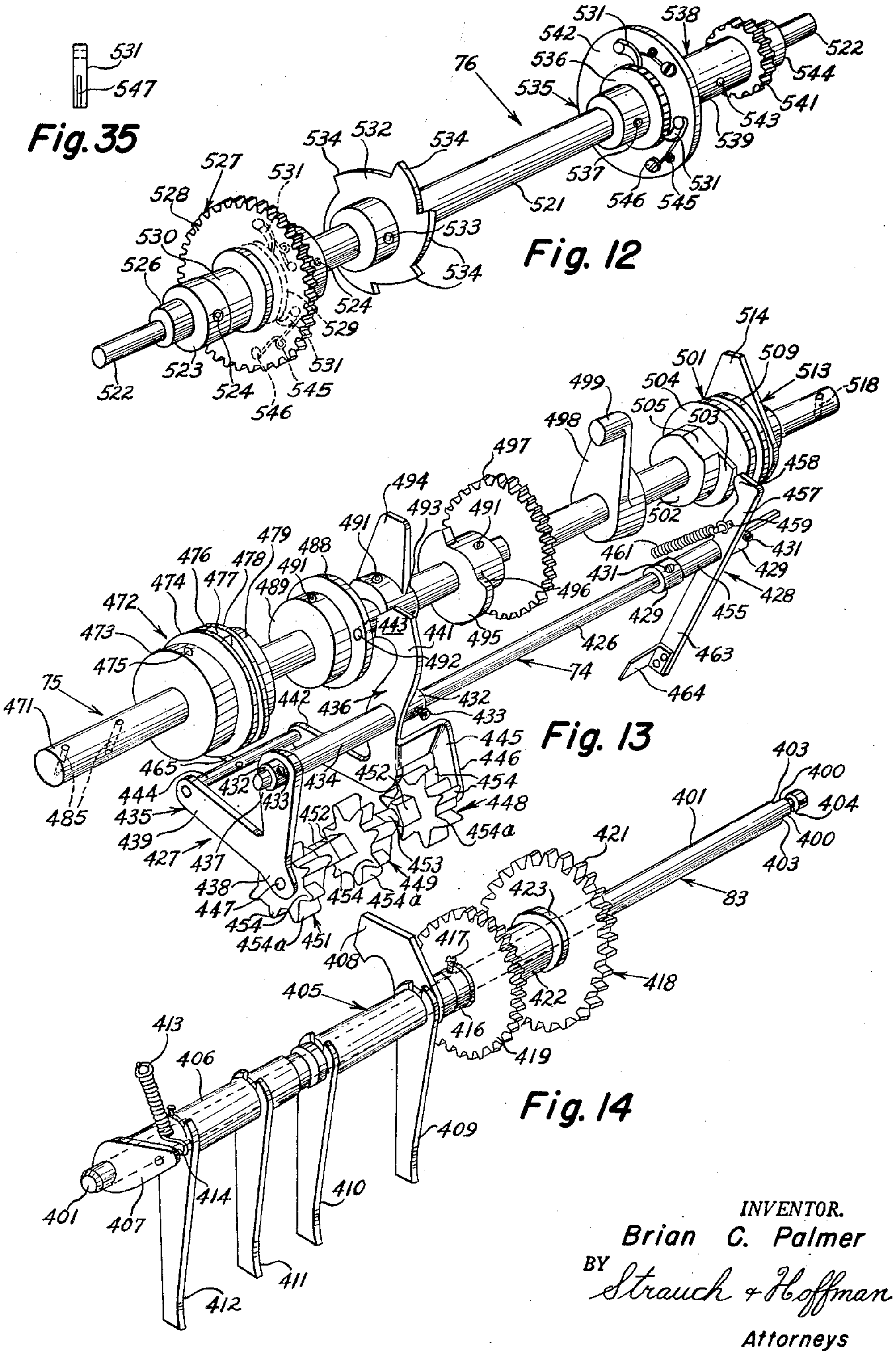
Figure 12 is a pictorial view of the drive shaft subassembly.
Figure 13 is a pictorial view of the cam shaft and transfer pinion frame and clock stop finger subassemblies.
Figure 14 is a pictorial view of the fare drum stop finger and tariff drum drive gear subassembly.
Figure 35 is a detailed edge view of one of the spring pressed pawls used in the pawl driving discs of the meter of Figures 1 to 34.

Referring primarily to Figure 14 where this assembly is shown in perspective, the assembly comprises a nonrotatable supporting shaft 401 the left hand end of which is adapted to be disposed in opening 248 (Figure 6) of unit 65 and the opposite end of which is reduced in diameter and adjacent the reduced end is provided with flats 400 adapting shaft 401 to be non-rotatably supported in and protrude through a suitable opening in unit 69. Shaft 401 is held against axial movement by spring washer 402 (Figure 7) fitting in annular groove 404 (Figure 14) provided in shaft 401 and drawing radially extending shoulders 403 formed by flats 400 against the inner face of assembly 69.

Adjacent its first mentioned end, shaft 401 rotatably supports a fare drum stop finger assembly 405 comprising a die cast tubular body 406 (Figure 14) provided at its left end with a crank arm 407 and at its right end with a cam engaging arm 408 adapted to operatively cooperate with a control cam secured to cam shaft assembly 75 to be presently described. Body 406 at predetermined spaced points opposite the gear and ratchet wheel positions of the fare drums and between arms 407 and 408 is provided with fare drum stop fingers 409, 410, 411 and 412. These stop fingers are integrally cast on body 406 and, in the embodiment of Figure 20, are adapted to respectively engage the radial shoulders 339 of the pawl 338 provided on pawl disc 358, freely pass the edge of the drum of assembly 346, and engage shoulders 339 of pawls 338 of the dollar drum 325 and the ten dollar drum 323 of the register drum shaft assembly in the "home" position of the meter operating mechanism as indicated in Figure 16. These fingers prevent clockwise rotation of the fare drums as viewed in Figure 16 and the opposite ends of pawls 338 engaging in groove 322 of shaft 320 (Figure 20) which is held against rotation by the reset mechanism and prevent counterclockwise rotation of the fare drums. As a consequence the fare registering drums are positively held against movement in their normal set "home" positions. To accomplish proper control of stop finger assembly 405, the cam cooperating with arm 408 is suitably formed to assure the positioning of the stop fingers in the path of shoulders 339 and the coil spring 413, acting between spring stud 414 on arm 407 and spring stud 415 on body 176 of unit 65, is arranged to retain arm 408 in contact with its cooperating cam at all times.

The stop finger assembly 405 is held against axial movement along shaft 401 by a collar 416 secured to shaft 401 by set screw 417. A tariff drum intermediate drive gear 418 is rotatably journalled on shaft 401 in abutting engagement with collar 416 and, as will be clear from Figures 11 and 14, comprises a cluster gear having driven gear 419 and a driving gear 421 press fitted on a hub 422 provided with radially spaced flanges 423 adapted to position gears 419 and 421 in predetermined spaced relation. As clearly shown in Figures 11 and 16, gear 421 is positioned so as to engage gear 373 of tariff drum 366 which, due to its overlapping relation with respect to gear 421, maintains gear assembly 418 against axial movement away from collar 416.

From the foregoing description it will be seen that fare drum stop finger and tariff drum drive gear shaft assembly 83 provides a simple and effective means for holding the fare drums in their normal "home" or "for hire" position and a simple means for driving tariff drum 366.

*Fare drum transfer pinion and clock stop finger shaft assembly*

The fare drum transfer pinion and clock stop finger shaft assembly 74 is illustrated in Figures 11, 13, and 15. Assembly 74 as clearly seen in Figure 13, comprises a shaft 426 rotatably supporting a transfer pinion frame assembly 427 adjacent one end and a clock stop finger assembly 428 adjacent the other end. Axially spaced positioning collars 429 secured to shaft 426 by set screws 431 position assembly 428 in predetermined axial position on shaft 426 while collars 432 secured to shaft 426 by set screw 433 retain the transfer pinion frame assembly 427 in predetermined axial position on shaft 426. One end of shaft 426 is adapted to be supported in opening 249 of assembly 65 (Figure 6) and the other end is supported in a suitably aligned opening to be hereinafter described provided in assembly 69 (Figure 7).

As clearly seen in Figure 13, transfer pinion frame assembly 427 comprises an elongated diecast tubular body 434 having an integral substantially Y-shaped lever 435 formed at one end and an integral substantially L-shaped lever 436 formed at its other end. Lever 435 is joined to body 434 at the free end of one of the arms 437 of the Y and the stem 438 extends in a generally forwardly direction from arm 437 and the other arm 439 extends rearwardly from the juncture of arm 437 and stem 438.

The L-shaped lever 436 is joined to body portion 434 approximately at the mid-point of its arm 441 and the other arm 442 of lever 436 extends rearwardly from body portion 434 parallel to and in horizontal alignment with arm 439 of the Y-shaped lever. The upper end of arm 441 of lever 436 is provided with a rearwardly extending finger 443 the rearmost edge of which is of arcuate shape to provide a cam surface adapted to engage a crank pin. to be hereinafter described, carried by cam shaft assembly 75. The adjacent free ends of arms 435 and 442 are suitably apertured to receive a connecting bar 444 the purpose of which will be presently pointed out.

Lever 436 adjacent the point of intersection of arms 442 and 443 is provided with an integral L shaped supporting flange 445 one leg of which generally parallels body 434 and the other leg 446 of which generally parallels the stem 438 of lever 435. Stem 438 and arm 446 are suitably apertured to receive a pinion shaft 447 upon which three fare drum transfer pinions 448, 449 and 451 are rotatably mounted. Each pinion 448, 449 and 451 is provided with a squared hub 452 the flats of which are adapted to brush against the surfaces 138 and 139 of the positioning blocks 137 carried by leaf springs 135 secured to raised portion 115 of base plate assembly 33. This engagement of hubs 452 and blocks 137 is effected as transfer pinion assembly 427 moves in a counterclockwise direction around shaft 426 during the resetting operation to its "home" position illustrated in Figure 15 and positions pinion 448, 449 and 451 in position to properly engage the transfer gears of the respective fare drums when the meter mechanism is next moved to "hired" position.

As clearly seen in Figure 13, the square hubs of gears 449 and 451 are disposed on opposite faces of the gears and arranged in abutting relation when the gears are assembled on shaft 447. The squared hub 452 of gear 448 is provided on the same respective face as the hub 452 of gear 449 and is adapted to abut an annular hub 453 formed on the opposite face of the gear 449.

Alternate teeth 454 of each pinion 448, 449 and 451 are foreshortened to dispose their right hand faces inwardly from the right hand faces of their adjacent teeth 454a to clear shoulder 329 on their respective fare drums and extend along the side face of the fare drum end wall. The teeth 454a enter the tooth spaces 332 formed on each fare drum and impart rotation to the respective pinions in a manner clear to those skilled in the art. Since the tooth space 332 on each fare drum is cut into shoulder 329, as clearly indicated in dotted lines on the fare drum 346 of Figure 20, it will be appreciated that the teeth 454a may freely enter into and out of toothed engagement in normal gear tooth engaging manner.

Since each pinion is provided with eight teeth, four of which are of full width and four of reduced width, and as rotation is imparted to each pinion 448, 449 and 451 by engagement of its teeth 454a with its respective tooth space 332, it will be appreciated that each pinion is rotated one eighth of a revolution or 45° during each period of engagement with its associated fare drum actuating tooth 332 and that the 8 to 20 gear ratio between pinions 448, 449 and 451 and their respective gears 336 effects a rotation of its associated gear 336 and fare drum through an angle of 18°, the distance between the center line of adjacent numerals as heretofore pointed out. It, therefore, will be appreciated that this transfer pinion arrangement when moved from the position shown in Figure 15 into engagement with the fare drum transfer gears 336 can effect proper mating engagement with the gear 336 and the gear tooth spaces 332 only if the pinion gears are normally maintained in a predetermined position, namely, the position determined by blocks 137 with a full width tooth 454a facing forwardly as shown in Figure 15.

Clock stop finger assembly 428 comprises a die casting having a tubular body 455, an integral straight lever 456 the short leg 457 of which is provided with a cam engaging nose 458 adapted to cooperate with a suitably formed cam to be hereinafter described forming a part of cam shaft assembly 75. As clearly seen in Figure 13, leg 457 is also provided with a spring stud 459 adapted to have one end of the tension spring 461 secured thereto. The opposite end of spring 461 is secured to a stationary part of the meter, such as the spring retainer 462 (Figure 17) secured to the clock assembly 78. This spring as clearly seen from Figure 17 normally biases nose 458 of lever 456 toward the cam shaft assembly 75 to maintain nose 458 in engagement with its operating cam at all times.

The other leg 463 of lever 456 extends in the opposite direction from body 455 and is provided at its outermost end with an L shaped stop finger 464 adapted, when the meter is in its "home" or "for hire" position to cooperate with the clock escapement fork of clock assembly 78 as indicated in Figure 17.

Referring for the moment to Figure 15, rod 444 connecting arms 435 and 442 is provided with a rearwardly extending spring stud 465 threaded into bar 444 and adapted to have one end of a tension spring 466 secured thereto. The opposite end of spring 466 is connected to spring retainer 142 secured to base plate assembly 33 so as to tension spring 466 and normally bias transfer pinion frame assembly 427 in a direction to resiliently engage pinions 448, 449 and 451 with their respective fare drum drive gears upon release of cam finger 443. This same positioning of frame 427 assures the disposition of finger 443 in the path of its actuating member on cam shaft assembly 75 which acts against tension spring 466 to move transfer pinion frame assembly 427 to its "home" position shown in Figure 15.

*Cam shaft assembly*

The cam shaft assembly 75 is shown in detail in Figures 11, 13, 15 to 17 and 30 to 33. Cam shaft assembly 75 comprises a shaft 471 one end of which is journaled in and protrudes through boss 251 formed on body portion 176 of assembly 65 (Figure 6). The other end of shaft 471 is journaled in and projects through a suitable aperture in assembly 69 (Figure 7) to be hereinafter described.

As clearly seen in Figures 11 and 13, shaft 471 adjacent to its first mentioned end is provided with a mileage shear cam assembly 472 comprising a hub 473 adapted to position cam 472 in a proper spaced relation to body portion 176 of assembly 65. Hub 473 is provided with a radially extending flange 474 and is secured to shaft 471 by a tapered pin 475 passing through hub 473 and a suitably formed opening (not shown) in shaft 471 (Figure 13). A cam element 476 having a single cam lobe 477, a thin shear retaining disc 478 and a double tariff cam 479 (Figures 13 and 30) are secured to hub 473 in side-by-side abutting relation by a screw 481 passing through suitably aligned apertures in cam 479, disc 478 and cam lobe 477 and threaded into a suitably tapped opening provided in hub 473 with its center line at an angle of 10° ahead of the center line of pin 475. In order to properly position cam 479 on assembly 472, the aperture for screw 481 is disposed on the center line bisecting the mileage shear receiving recess 482 provided in cam 479. As will be clear from an inspection of Figures 11 and 15, mileage shear 222 is disposed so as to fall between the flange 474 and disc 478 so that its nose will normally engage cam lobe 477 in the "home" or "for hire" position of the meter mechanism.

The end of shaft 471 protruding through boss 251 is adapted to receive a worm gear 483 (Figures 6 and 11) and a switch operating cam 484 the purpose of which will be hereinafter pointed out. To this end, shaft 471 as clearly shown in Figure 13 is provided with axially spaced tapered apertures 485 adapted to receive suitably tapered pins 486 (Figure 6) passing through the hub of gear 483 switch cam 484. As clearly indicated in Figure 6 the tapered pins 486 and the tapered pin receiving openings 485 have their axes in a vertical plane the same as the axis of pin 475 of cam shaft assembly 472. As a consequence, the gear 483, cam 484 and cam assembly 472 may be secured to shaft 471 in their proper relative angular positions (Figures 6 and 15) by proper location of their pin receiving openings during their manufacture. It will further be appreciated that cam 484 is notched as indicated at 487 in a plane substantially parallel to the axis of pin receiving opening 485 to provide an operating cam surface definitely positioned with respect to cam shear assembly 472 and shaft 471 for a purpose to be presently pointed out. Gear 483 is also definitely positioned to assure proper mesh with gear 282 when shaft 471 is in its "home" or "for hire" position.

Shaft 471 to the right of mileage shear cam assembly 472 is provided with a transfer pinion frame actuating disc 488 having a hub 489 provided with two angularly spaced tapped apertures (compare Figure 32) to receive set screws 491 for securing disc 488 to shaft 471. The radial flange of disc 488 is provided with an axially extending pin 492 adapted to engage the cam surface of finger 443 of transfer pinion frame assembly 427 in the "home" or "for hire" position of cam shaft 471 as clearly indicated in Figure 15. To this end, disc 488 may be properly positioned upon shaft 471 so as to engage finger 443 by loosening set screws 491.

To the right of disc 488, shaft 471 is provided with a stop cam 493 having a radially extending arm 494 adapted to cooperate with registering lever assembly 86 in the "home" or "for hire" position of the meter to hold assembly 86 in its non-registering position out of engagement with the operating or "jumper" cam on drive shaft assembly 76 to be presently described. As clearly shown in Figures 11 and 13 stop cam 493 is adapted to be secured to shaft 471 by set screws 491. Referring to Figure 16, it will be seen that cam 493 is positioned on shaft 471 so that its trailing edge is disposed at an angle of 15° ahead of the vertical plane containing pins 475 and 486. This positioning assures release of assembly 86 as cam shaft assembly 75 moves through its first quarter revolution under control of the flag shaft assembly 91.

To the right of stop cam 493, shaft 471 is provided with a stop finger operating cam 495 secured to shaft 471 by means of set screws 491. As clearly seen from Figures 13 and 32, cam 495 is provided with a relatively wide recess 496 into which the cam engaging finger of cam arm 408 of stop finger assembly 405 falls in the "home" or "stopped" position of cam shaft assembly 75. When in this position stop fingers 409 to 412 engage with their cooperating stop pawls 338 as heretofore pointed out. To secure this end, cam 495 is positioned on shaft 471 with its leading edge at an angle of 17°30′ (Figure 32) behind the vertical plane of pins 475 and 486 so as to raise cam arm 408 to the high part of cam 495 during the first quarter revolution of cam shaft assembly 75 to the first "hired" position.

Shaft 471 immediately to the right of cam 495 is provided with tariff drum drive gear 497 positioned in alignment with gear 419 of assembly 83 so as to be constantly meshed with the tariff drum intermediate gear 418. Gear 497 is secured to shaft 471 by suitable set screws 491 and the ratio between gears 497, 419, 421 and 373 is such as to assure a 1 to 1 drive relation between shaft 471 and shaft 320 of the register drum shaft assembly 72. It will, therefore, be appreciated that a quarter of a turn of shaft 471 will result in a quarter turn of drum 366 and proper positioning of the "hired" and "stopped" indicia of tariff drum 366.

Shaft 471 in longitudinally spaced relation to the right of gear 497 is provided with trips counter stop cam 498 which is secured to shaft 471 by suitable set screws 491 (not shown). As clearly seen in Figure 13, cam 498 has a relatively long axially extending holding formation 499 adapted to cooperate with the trips counter operating lever of fare and trips counter lever shaft assembly 77 to be presently described. As clearly indicated in Figure 17, cam 498 is secured to shaft 471 with its holding formation disposed at an angle of 15° ahead of the vertical plane containing pins 475 and 486 so as to release the trips counter operating lever at substantially the same moment cam 495 releases assembly 86.

Shaft 471 to the right of cam 498 is provided with a combined clock stop finger and clock shear cam assembly 501. As clearly seen in Figures 13 and 31, assembly 501 comprises a hub 502 having an integral clock stop finger cam formation 503 and an integral, annular clock shear retaining flange 504. A portion of the hub and cam formation 503 is cut away as shown at 505 at an angle of 123° ahead of the center line of pins 475 and 486 and the center line of a pin 506 provided to secure hub 502 to shaft 471 in predetermined position with respect to the cam assembly 472 and gear 483. It will be clear from a comparison of Figures 30 and 31, that the center lines of the securing pins of cam assemblies 472 and 501 are in the same vertical plane so that these cam assemblies are initially mounted on shaft 471 in predetermined angular position.

Assembly 501 is provided with a cam segment 507 adapted to cooperate with the clock shear of the clock drive gear and shear shaft assembly 81 to be presently described. As clearly seen in Figure 31, cam segment 507 is secured to annular flange 504 by rivets 508, exposed through suitably formed openings in a clock shear retaining disc 509 secured to the exposed face of cam segment 507 by means of screw 511 threaded into annular flange 504 of cam assembly 501. Referring for the moment to Figure 17, it will be noted that stop finger cam portion 503 is disposed so that clock stop finger 458 will be moved to its disengaged position upon clockwise rotation of cam shaft assembly 75 through its first quarter turn. It will also be noted that stop finger cam portion 503 is of such an angular dimension that finger 458 will be moved into its engaged position when the camshaft assembly reaches its "stopped" position. It, accordingly, will be appreciated that clockwork 78 is started into operation during the first quarterly movement of the cam shaft assembly and is stopped as soon as the flag shaft and cam shaft assembly reach the third quarterly or "stopped" position and that, therefore, the clock mechanism is running during only operating positions of the meter mechanism.

Immediately to the right of cam assembly 501 shaft 471 is provided with a stop cam 513 (Figures 13 and 33) arm 514 of which is adapted to engage the holding detent of the extras drum (Figure 17) to be presently described so as to maintain the detent out of engagement with ratchet wheel 382 when the flag shaft and meter mechanism are in their "home" or "for hire" positions. Stop cam 513 is secured to shaft 471 by a tapered pin 515 the axis of which is in the vertical plane containing pins 475, 486 and 506 and the axis of cam arm 514. As a consequence cam 513 is rigidly fastened to shaft 471 so as to always be in position to engage the holding detent in the "home" or "for hire" position of the meter mechanism.

Figures 31, 32, 33:
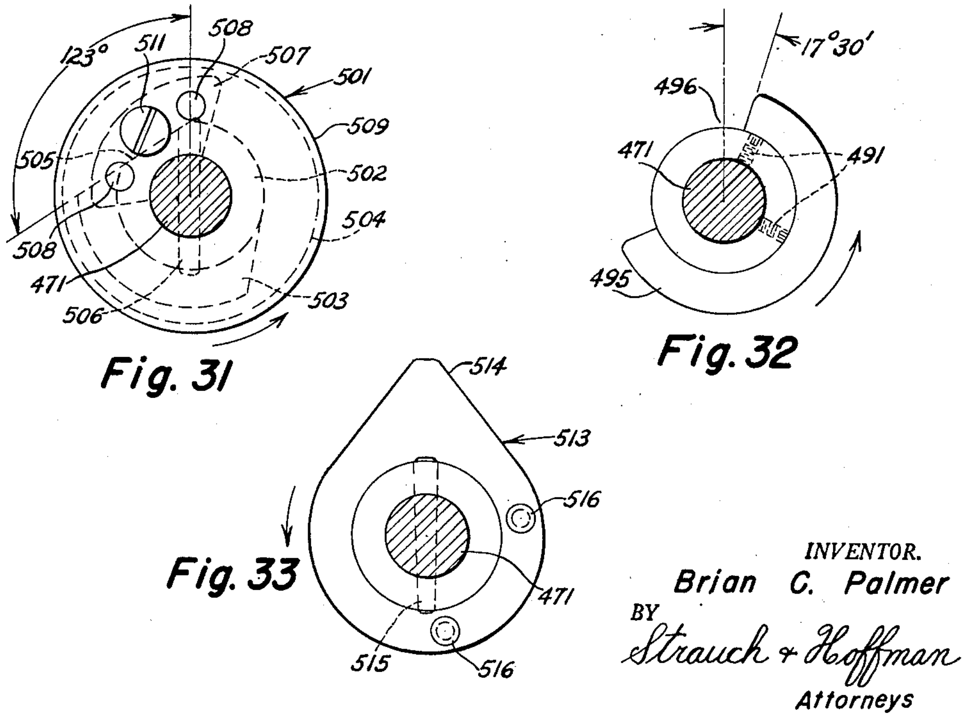
Figure 31 is a detailed transverse sectional view through the camshaft subassembly of Figure 15 taken to the right of and looking toward the clock shear cam assembly.
Figure 32 is a detailed transverse sectional view through the camshaft subassembly of Figure 15 taken to the right of and looking toward the stop and release cam for the fare drum stop finger and tariff drum drive gear subassembly.
Figure 33 is a detailed transverse sectional view through the camshaft subassembly of Figure 15 taken to the right of and looking toward the stop and release cam for the extras drum and counter operating mechanism.

Stop cam 513 as clearly seen in Figures 11 and 33 is provided with axially directed pins 516 extending toward the cam assembly 501. These pins constitute the control elements for a "delayed waiting time" clock shear (not shown) functioning in a manner similar to the delayed waiting time clock shear of United States Patent 1,762,862 to J. Gluck. Accordingly, it will be appreciated that the "delayed waiting time" feature may be readily added to this meter along with the double tariff mileage feature heretofore mentioned in localities where such features are desired. Since this "delayed waiting time" clock shear mechanism operates alternately with respect to the "waiting time" clock drive gear and shaft assembly 81 to be presently described and can be added in a manner similar to the "delayed waiting time" mechanism of the aforementioned United States patent a detailed description of this alternative mechanism will not be given here. The end of shaft 471 extending beyond stop cam 513 passes through the opening provided in assembly 69 and is adapted by provision of a tapered passage 518 to receive a cam forming a part of reset mechanism 99 (Figures 7, 8, and 11) to be presently described.

From the foregoing description, it will be appreciated that cam shaft assembly 75 carries the cam elements necessary for setting the paid mileage drive mechanism, the fare drum stop finger assembly 405, the transfer pinion assembly 427, the registering lever assembly 86, the trip counter lever, the clock stop finger assembly 428, the clock drive gear and shear shaft assembly 81, and the extras drum and counter operating mechanism to their operative positions and also carries gear 497 rotating the tariff drum intermediate gear 418 and tariff drum 366 to their various positions. Accordingly, this single shaft assembly operated by rotation of the flag 310 and its associated flag shaft assembly 91 conditions all mechanism of the meter for registering operation and is under the control of the operator.

*Drive shaft assembly*

The drive shaft assembly 76 is illustrated in Figures 11, 12, 15, 16 and 17. Referring particularly to Figures 12 and 15, drive shaft assembly 76 comprises a shaft 521 journaled adjacent one end in bearing bushing 254 carried by body portion 176 of assembly 65. The opposite ends of shaft 521 are reduced in diameter as shown at 522 and the enlarged portion adjacent the left end as shown in Figure 12 is provided with a spacing collar 523 secured to shaft 521 by set screw 524. As clearly shown in Figure 12, collar 523 is positioned inwardly from reduced section 522 to provide a bearing area 526 adapted to cooperate with bushing 254. Immediately adjacent collar 523 shaft 521 is provided with a paid mileage gear and ratchet drive assembly 527.

Assembly 527 comprises a gear member 528 having an elongated hub 530 abutting spacing collar 523 and journaled for rotation on shaft 521. Gear 528 as clearly seen in Figure 15, is adapted to mesh with idler gear 228 carried by mileage shear 222 so as to be driven at a predetermined rate with respect to the mileage drive gear assembly 85. While the rate may be varied in any desired manner by use of preselected gear ratios in the paid mileage gear train, the illustrated embodiment is designed for operation at a $0.30 per mile rate. Accordingly, shaft 521 makes one complete revolution for every two revolutions of shaft 199 and combined paid mileage cam and gear 206.

Immediately adjacent gear 528 and in running contact therewith shaft 521 has secured thereto a ratchet wheel 529. Ratchet wheel 529 is secured to shaft 521 by suitable set screws 524 (Figure 15) passing through its hub and is adapted to cooperate with spring biased pawls 531 pivotally secured to the adjacent face of gear 528 and facing in the same direction so as to drive ratchet wheel 529 upon counterclockwise rotation of gear 528 as seen in Figure 15. As clearly indicated in Figure 15, pawls 531 are angularly offset so one pawl only is adapted to drivingly engage the teeth of ratchet wheel 529 at any time so that an extremely rapid pick up of the ratchet wheel and shaft 521 will occur upon rotation of gear wheel 528 in a counterclockwise direction. This pick up ratchet drive is referred to in the trade as the "lighting pick up" and is particularly desirable in a meter of this type to assure registering operation of the meter mechanism promptly upon movement of the vehicle.

It will be appreciated that combined gear and ratchet assembly 527 provides a one way drive. As a consequence shaft 521 is free to overrun if rotated at a greater speed than the speed of gear 528.

To the right of assembly 527 and in position to cooperate with the fare registering lever mechanism 86, shaft 521 is provided with a star wheel or jumper cam 532 secured to shaft 521 by set screws 533 (Figure 16) and having six cam lobes 534 each of which is adapted to oscillate the fare registering and units counter lever assembly 86 through one registering stroke. As a consequence, fare drum 346 is rotated through three indicating positions each one-half revolution of shaft 521 and registers a $0.30 fare charge for each one-half revolution of shaft 521 corresponding to a traversed distance of one mile. Simultaneously lever assembly 86 during each registering stroke moves the unit counter to be presently described to its next indicating position to record the number of registering strokes or units of fare for which the driver must account at the end of the day.

The drive shaft structure just described would be sufficient to record the fare and fare units if the fare rate were to be determined on the basis of mileage alone. The meter of the present invention, however, also contemplates means for charging for waiting time of the vehicle if stopped because of traffic conditions or the request of the passenger by provision of clock assembly 78. To adapt drive shaft 521 for driving the meter registering mechanism by clock assembly 78, a combined clock gear and ratchet drive assembly 535 is provided.

As clearly seen from Figures 12 and 17 assembly 535 comprises a ratchet wheel 536, similar to ratchet wheel 529, secured to shaft 521 by set screws 537 and pawl disc and gear assembly 538 made up of an elongated bushing 539 having reduced ends (not shown) upon which a gear member 541 and pawl disc 542 are press fitted. As seen in Figure 12 bushing 539 is provided with an oil hole 543 provided to lubricate the mating surfaces of shaft 521 and bushing 539 to assure free rotation of bushing 539 on shaft 521. As clearly seen from Figures 12 and 17 pawl disc 542 is provided with three angularly spaced pawls 531 in all respects similar to pawls 531 of assembly 527. Pawls 531 of disc 542 are arranged to face in the same direction as pawls 531 of assembly 527 so that shaft 521 will be rotated in the same direction irrespective of whether shaft 521 is driven by assembly 527 or assembly 536.

Combined gear and pawl disc assembly 538 is retained in operative relation to ratchet wheel 536 by means of a collar 544 secured to shaft 521 by means of set screws (not shown). As clearly shown in Figures 12, 15 and 17 pawls 531 are normally biased towards their respective ratchet wheels by means of springs 545 secured to the face of gear 538 or pawl disc 542 by screws 546. To assure proper cooperation between springs 545 and pawls 531 the outer edges of the pawls are provided with shallow slots 547 as clearly shown in Figure 35. Reduced end 522 of shaft 521 adjacent assembly 535 is adapted to be journaled in a suitable aperture in assembly 69 and extends beyond assembly 69 to receive a reset cam forming a part of the reset mechanism to be presently described.

*Clock assembly 78*

Clock assembly 78 of the present invention is illustrated in Figures 11, 16 and 17 and comprises a conventional clock works 551 mounted between frame plates 112. Clock works 551 is secured to base plate assembly 33 by bolt and nut assemblies 552 the bolts of which pass through the counter sunk openings 166 and studs 170 provided by base plate unit 33. As seen in Figure 17, studs 170 protrude through lower plate 112 which is held against displacement with respect to studs 170 by spring washers 170*a* disposed in suitable annular grooves provided in studs 170. As a result of this structure, an unprincipled operator is prevented from disconnecting clockworks 78 from base plate 33 by loosening bolt and nut assemblies 552 and moving the clockworks so as to jam the drive and render it inoperative. Referring also to Figure 17 the clock escapement mechanism 553, including escapement fork 554, is arranged adjacent the front of the clock works with the escapement fork 554 in position to be engaged by stop finger 464 carried by stop finger assembly 428.

The winding shaft 555 of clock works 551 extends through and above the top of frame member 112 and is provided with a worm gear 556 adapted to engage a worm pinion 557 secured to a forwardly and rearwardly extending winding shaft 558. The forward end of shaft 558 protrudes through the face of the meter and threadedly receives a winding key 559. As clearly seen in Figures 11 and 16, shaft 558 is journaled in bearing brackets 561 carried by upper frame member 112 and the rear end of shaft 558 is provided with an anti back-up ratchet wheel 562 adapted to cooperate with spring biased pawl 563 mounted on the rear face of the rearmost bearing bracket 561.

The main clock power take-off shaft 564 (Figures 11 and 17) protrudes through frame member 112 and is provided with a bevel drive pinion 565 which cooperates with the clock drive gear and shear shaft assembly 81 which will now be described.

*Clock drive gear and shear shaft assembly*

Figure 36:
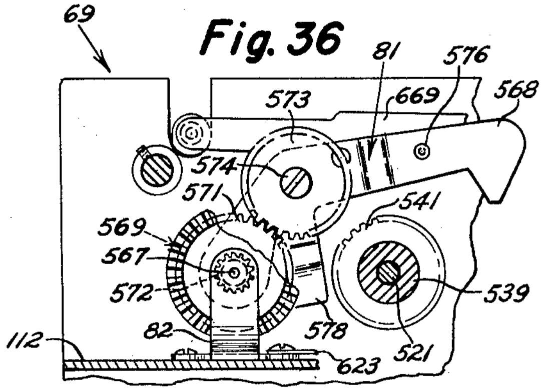
Figure 36 is a fragmental sectional view illustrating the construction of the clock drive gear and shear shaft assembly of this invention.

The clock drive gear and shear shaft assembly 81 is shown in Figures 11, 17 and 36 and is supported at one end by bracket 82 carried by upper frame 112 and at its other end in a suitably formed aperture in assembly 69 to be presently described. Assembly 81 comprises a bevel gear 566 meshing with gear 565 and carried by a shaft 567 journalled in bracket 82 and assembly 69 and providing a support for assembly 81. Shaft 567 adjacent assembly 69 is provided with a clock shear 568 the hub of which positions shear 568 for cooperation with clock shear cam assembly 501.

Immediately adjacent clock shear 568 shaft 567 is provided with a compound spur gear 569 composed of a large gear portion 571 constituting one of the gears in the gear train for "waiting time" and a substantially smaller gear portion 572 constituting one of the gears of the "delayed waiting time" gear train previously referred to and which may be incorporated in this meter. In this connection, the space on shaft 567 between compound gear 569 and bevel pinion 565 provides the journal for the "delayed waiting time" shear assembly.

Referring in particular to Figure 36, it will be seen that clock shear 568 is provided with a gear 573 journaled on journal pin 574 and adapted to constantly engage gear 571. As a consequence, gear 573 will be continuously rotated whenever the clock works 551 is operating. When shear 568 rotates around the axis of shaft 567 to its lower position under the influence of tension spring 575 (Figure 17), connected at one end to spring stud 576 on shear 568 and at its other end to spring retainer 577 secured to clock escapement mechanism 553, gear 573 moves into meshing engagement with gear 541 and will tend to drive shaft 521 through assembly 535 in the same direction that shaft 521 is driven by assembly 527 (Figure 12). Since the speed with which shaft 521 is driven through assembly 527 normally exceeds the driving speed of assembly 535, it will be appreciated that ratchet wheel 536 will normally overrun ratchet disc 542 so that the burden of driving shaft 521 will be assumed only by mechanism 527. However, should the speed of the vehicle be reduced to such a degree that the driving speed of assembly 527 falls below the speed of assembly 535 or should the vehicle be stopped by traffic conditions or at the request of the passenger, assembly 535 due to its "lighting pick-up" will immediately take over the driving burden and drive the registering mechanism. It will thus be apparent that the meter registering mechanism will be positively driven at all times when flag shaft assembly 91 is in one or the other of its operating positions and that the meter at the end of a trip will indicate the proper fare.

Referring for the moment to Figure 36 it will be noted that shear 568 in radial alignment with the axis of gear 573 is provided with a downwardly extending arm 578. As clearly seen from Figure 11 arm 578 is in longitudinal alignment with pins 516 of the "delayed waiting time" cam shear assembly. The purpose of this arm is to provide a positive lock-out to assure alternate operation of shear 568 and the "delayed waiting time" shear (not shown) by reason of engagement of arm 578 with the "delayed waiting time" shear at all times.

Since the rate of charge for "waiting time" can be at any desired figure and the meter arranged to register the desired rate merely by choice of proper gear ratios between compound bevel gears 565 and 566, gear 569, gear 573 and gear 541 the particular gear ratios in this train of gears is selected to secure the desired ratio.

*Fare and trip counter levers shaft assembly*

The fare and trip counter levers shaft assembly 77 is illustrated in Figures 11, 16, and 17. Assembly 77 comprises a shaft 581 one end of which is supported in a suitably formed opening in body portion 176 which opening is in vertical alignment with the axis of gear 217 carried by shifter lever 211 and the other end of which is supported in an axially aligned opening provided in assembly 69 to be hereinafter described. Immediately adjacent body portion 176 shaft 581 (Figure 11) is provided with a collar 582 secured to shaft 581 by means of suitable set screws. Collar 582 is adapted to prevent axial movement of shaft 581 to the left through body portion 176. A second collar 583 is secured to shaft 581 in axially spaced relation to the collar 582 to position the registering lever assembly 86 in proper position with respect to "jumper" cam 532 and ratchet wheel 357 of register drum shaft assembly 72.

As clearly seen in Figures 11 and 16 assembly 86 comprises an elongated hub 584 having a reduced end 585 and an oil opening 586. Hub 584 is rotatably mounted upon shaft 581 and is held against axial movement away from collar 583 by a collar 585 secured to shaft 581 by suitable set screws. A forwardly extending fare drum and unit counter operating arm 587 has one end secured to the enlarged portion of hub 584 and extends forwardly over drive shaft assembly 76, cam shaft assembly 75 fare drum stop finger and tariff drum drive gear shaft assembly 83 and registering drum shaft assembly 72 and terminates near the front of the meter in an enlarged end portion 587*a*. Arm 587 opposite opening 255 of unit 65 is provided with a right angularly extending arm 588 the free end of which extends through opening 255 and projects beyond the outer face of body portion 176 of unit 65 into overlying relation with respect to finger 277 of time delay mechanism 87 as clearly shown in Figure 6. When the meter is in its "home" or "for hire" position as illustrated in the figures of the drawing arm 588 will be supported by finger 277 so as to hold operating arm 587 in its nonregistering or inoperative position.

Arm 587 on the side opposite arm 588 is provided with a substantially wedge shaped cam abutment 589 the sloping edge 591 of which cooperates with "jumper" cam 532. Cam abutment 589 is preferably hardened to resist the wearing action resulting from its contact with cam 532 and is preferably removably secured to arm 586 by rivets 592 so it may be readily replaced when required.

Arm 587 forwardly of arm 588 and on the same side is provided with a spring retaining stud 593 to which one end of tension spring 594 is attached. The opposite end of spring 594 is connected to spring retainer 143 provided on base plate assembly 33 so as to normally tension spring 594 and hold cam abutment 589 of arm 587 in contact with "jumper" cam 532 or arm 588 in engagement with finger 277. So long as arm 588 is supported by finger 277 "jumper" cam 532 barely touches the lowermost corner of edge 591 of abutment 589 and is ineffective to oscillate arm 587 around shaft 581. As a consequence registering movement of the fare drum and the units counter to be hereinafter described will not be effected in spite of rotation of drive shaft 521. This condition persists in all positions of the meter mechanism until the drive shaft 521 has rotated a sufficient distance for cam 595 secured to end of shaft 521 protruding from assembly 65 (Figures 6 and 11) to engage cam surface 271 of arm 269 of time delay mechanism 87 and rotate mechanism 87 in a clockwise direction around its pivot stud 264 sufficiently to disengage finger 277 from its supporting relation with respect to arm 588 and release assembly 86 for registering cooperation with shaft 521.

As previously pointed out, release of assembly 86 does not occur until the initial fare registered on the meter upon operation of the flag shaft assembly 91 has been fully consumed by traversing of the predetermined initial distance or the lapsing of the predetermined time or combination of both. It, accordingly, will be appreciated that the cooperation of time delay mechanism 87 and arm 588 provides a very simply but effcient means for delaying the registering operation of the meter until the initial fare is consumed.

Arm 587 at the extremity of the enlarged portion 587*a* is transversely thickened (Figure 11) adapting it to pivotally receive a depending fare drum operating pawl 596 having a rearwardly directed nose 597 (Figure 16) positioned in operative relation to the teeth of ratchet wheel 357. To this end, a suitable journal pin 598 for pivotally securing pawl 596 to arm 587 is riveted in the thickened portion of arm 587 and a tension spring 599, connected at one end to spring stud 601 on pawl 596 and at its other end to spring stud 602 on arm 587, is provided to normally hold arm 596 in proper position.

Figure 37:
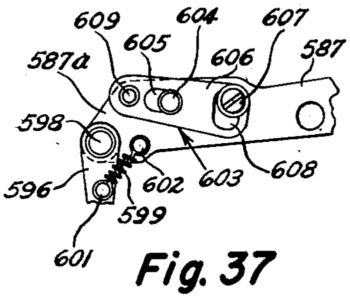
Figure 37 is a fragmental elevational view illustrating the details of mounting the fare drum operating pawl and the units counter operating assembly on the end of the fare drum and units counter operating arm.

End 587*a* of arm 587 is also provided with a units counter operating arm assembly 603 (Figure 37) which is adjustably secured to arm 587 by a rivet 604 having a pivotal and sliding fit in a slot 605 in plate 606 of assembly 603 and a screw and nut assembly 607 passing through arm 587 and an enlarged rectangular opening 608 in plate 606. At its forward end plate 606 is provided with a right angularly extending pin 609 which engages the operating mechanism of the units counter to be presently described as shown in Figure 11. Referring to Figure 37, it will be appreciated that assembly 603 may be readily adjusted in an orbital path by loosening bolt and nut assembly 607 and pivoting and sliding plate 606 along the face of arm 587, the path of movement of pin 609 being determined by the sliding contact between the wall of opening 608 and the shank of the bolt of assembly 607.

In order to move assembly 86 from its registering position to its uppermost and non-registering position, the face of arm 587 in vertical alignment with the cam arm 494 is provided with a right angularly extending cam abutment pin 611 (Figures 11 and 16) adapted to be contacted by the end of cam arm 494. As cam shaft assembly 75 is moved to its "home" position arm 494 will contact pin 611 and raise it and assembly 86 until cam abutment 589 clears "jumper" cam 532 and arm 588 moves out of the path of finger 277 of time delay assembly 87. When this is accomplished time delay assembly 87 acting under influence of spring 274 will rotate in a counterclockwise direction around pivot stud 264 (Figure 6) to dispose finger 277 in supporting position under arm 588 effecting a resetting of assembly 86 for its next registering operation.

Shaft 581 to the right of assembly 86 is adapted to rotatably support trips counter operator assembly 615 comprising a hub 616 having a trips counter operating arm 617 press-fitted thereon and extending forwardly over clock drive gear and shear shaft assembly 81, drive shaft assembly 76, cam shaft assembly 75 and fare drum stop finger and extras drum drive gear shaft assembly 83. Arm 617 at its forward end (Figures 11 and 17) is provided with a right angularly disposed trip counter operating pin 618 adapted to cooperate with the operating mechanism of the trip counter to be presently described. The under edge of 617 in vertical alignment with cam formation 499 of cam 498 is provided with a depending cam abutment 619 adapted to engage cam formation 499. To assure proper contact with the cam formation 499, arm 617 approximately midway between abutment 619 and shaft 581 is provided with a spring stud 621 to which one end of tension spring 622 (Figure 17) is connected. The opposite end of spring 622 is connected to spring retainer 623 mounted on the supporting flange of bracket 82. Spring 622 as clearly illustrated in Figure 17 tends to normally resiliently bias arm 617 into engagement with cam formation 499 which holds arm 617 in its "home" or "for hire" position. When cam shaft assembly 75 is moved from its "home" position to its operating position cam formation 499 clears abutment 619 and permits spring 622 to move arm 617 to its lowermost position so actuation of trips counter will occur upon return of arm 617 to its "home" position in a manner that will be clear from an inspection of Figure 17.

In order to limit downward movement of arm 617 to prevent it from interferring with operation of the meter registering mechanism or being disengaged from the trips counter operating mechanism, the face of arm 617 adjacent assembly 69 is provided with a forwardly extending leaf spring 624 (Figure 11) which is in a position to engage the peripheral edge of pawl disc 542 when arm 617 reaches its predetermined lower position.

*Counter assembly*

Counter assembly 88 is illustrated in Figures 11, 15, 16 and 17. Since the counters per se form no part of the present invention but constitute a conventional structure readily obtainable on the market, the counters will be described only in their general arrangement in assembly 88.

In this connection assembly 88 is composed of a supporting frame 625 composed of a U-shaped frame member 626 extending transversely of the meter parallel to the drum shaft assembly 72 with its legs 627 extending rearwardly along the top edges of the inner faces of assemblies 65 and 69 and an integral, depending side wall and bottom portion 628 interrupted at 629 between its ends and terminating inwardly from the face of assembly 69 as seen in Figures 8 and 11. Portion 628 is adapted to receive the end of fair drum and units counter operating arm 587 and its associated fair drum operating pawl 596 and trip-counter operating assembly 603. As clearly seen in Figure 11, the sidewalls of portion 628 respectively journal the supporting shafts 630 and 631 of the two spaced sets of counters. Shaft 630 supports the total mileage counter 632 adjacent assembly 65 and the paid mileage counter 633 adjacent counter 632. Each of these counters is provided with a U-shaped actuating frame 634 cooperating with fingers 240 of total mileage lever 238 and paid mileage lever 239 as shown in Figure 15. Spring retaining studs 635 are secured to frames 634 and are connected to the upper ends of tension springs 243 which act to return counters 632 and 633 and their associated counter operating frames 634 to their next operating position as levers 238 and 239 move to their lowermost positions under influence of springs 243 and cams 205 and 206.

Shaft 631 journals units counter 636 adjacent opening 629 of frame 628, trips counter 637 immediately adjacent counter 636 and extras counter 638 immediately adjacent counter assembly 637. Each of these counters is provided with a U-shaped operating bracket 634. As clearly seen in Figure 11, operating bracket 634 of counter 636 is provided with an L-shaped operating finger 639 having a bifurcated leg to receive pin 609 of assembly 603 in a manner that will be clear in the art. It will, therefore, be appreciated that units counter 636 is simultaneously operated by arm 587 during operation of the fare drums.

The arm 634 of trips counter assembly 637 is also provided with an L-shaped operating finger 641 having a bifurcated leg (Figure 17) to receive pin 618 of lever 617 in a manner well known to those skilled. It, accordingly, will be appreciated that counter assembly 637 will be actuated each time arm 617 rises and falls in response to one complete revolution of the cam shaft assembly 75 to indicate the number of paid trips. A similar finger 641 is secured in a reverse position to frame 634 of counter 638 and is adapted to cooperate with the extras counter operating mechanism to be presently described. Counter assembly 88 is secured to assemblies 65 and 69 as a unit by screws 89 as heretofore pointed out.

Since the counters 632 to 633 and 636 to 638 are conventional counter assemblies obtainable on the open market and composed of an assembly of four counter drums operating in a conventional and well known manner, a more detailed description of these counters is not deemed necessary at this time. Accordingly, a description of the assembly 69 will now be given.

*Right side frame and extras drum and counter operating assembly*

The right side frame and extras drum and counter operating assembly 69 is illustrated in Figures 7, 8, 10, 11, 17 and 40. As most clearly seen from Figures 7, 10 and 17, assembly 69 comprises a main plate 645 having suitable openings adapted to support or journal respective shafts 320, 401, 426, 471, 521, 567 and 581. Except for the opening for shaft 401, shown in fragmental enlarged Figure 38, these openings are circular and aligned with the openings in body portion 176 of assembly 65. The opening for shaft 401 provides forwardly and rearwardly disposed circular wall portions 646 and upper and lower flat wall portions 647 (Figure 40) adapted to receive the similarly shaped end of shaft 401 so that shoulders 400 of shaft 401 will abut the inner face of plate 645 and prevent shaft 401 from moving axially through plate 645. The flats 647 engaging the flats of shaft 401 retain shaft 401 against rotational movement.

Assembly 69, in addition to providing the shaft supporting openings, carries the extras drum and extras counter operating lever assembly 648. To this end, plate 645 adjacent its lower forward edge is provided with a notch 651 (Figures 7, 10 and 40), a pivot stud 652 (Figure 7) disposed in a horizontal plane slightly above the top edge of notch 651 and substantially midway between the center lines of shafts 521 and 567 and a notch 654 in its upper edge 653 in a vertical plane passing substantially midway between shafts 567 and 581. Stud 652 is adapted to pivotally receive a bell crank lever 655 pivoted at the juncture of its arms 656 and 657 and held against axial removal from stud 652 by means of a spring washer 658. As clearly seen in Figure 7, leg 656 of bell crank lever extends in a downwardly and forwardly direction and at its free end is provided with a pivot stud 659 which pivotally receives the rear end of a forwardly extending plunger arm 661. Arm 661 is held against axial displacement on stud 659 by a further spring washer 658 and its forward end is provided with a cylindrical push button element 662 which extends through and beyond the meter front assembly 96 as is clearly shown in Figures 1, 2, 7, and 11.

Arm 657 of bell crank 655 extends in a rearwardly direction and is provided with a pivot stud 663 (Figure 7) which pivotally receives the lower end of link member 664 which is held against axial displacement on stud 663 by a spring retainer 665 adapted to have one end of tension spring 666 secured thereto. The opposite end of spring 666 is connected to spring stud 667 formed on plate 645 and is held in place by a second spring retainer 665. Spring 666 is adapted to normally yieldingly retain bell crank lever 655 in the position illustrated in Figure 7 thereby forcing arm 661 to its extreme forward position and holding link 664 in its normal lowermost position. The position of these parts in Figure 7 is the "home" or "for hire" position of these elements.

The upper end of link 664 is pivotally mounted upon a pivot stud 668 carried at the rear end of an extras drum and extras counter operating lever 669 (Figures 10 and 40) extending along the inner face of plate 645 and pivoted on pivot stud 671 mounted in plate 645 above and approximately in vertical alignment with the axis of drive shaft 521. Suitable spring washers 672 and 673 are provided for respectively holding the upper end of link 664 on stud 668 and lever 669 on stud 671. A brass sleeve 674 is preferably loosely mounted on stud 668 between link 664 and lever 669 to absorb wear and shock resulting from contact with the walls of notch 654 during operation of the extras drum and counter operating assembly 648.

Figures 40, 41:
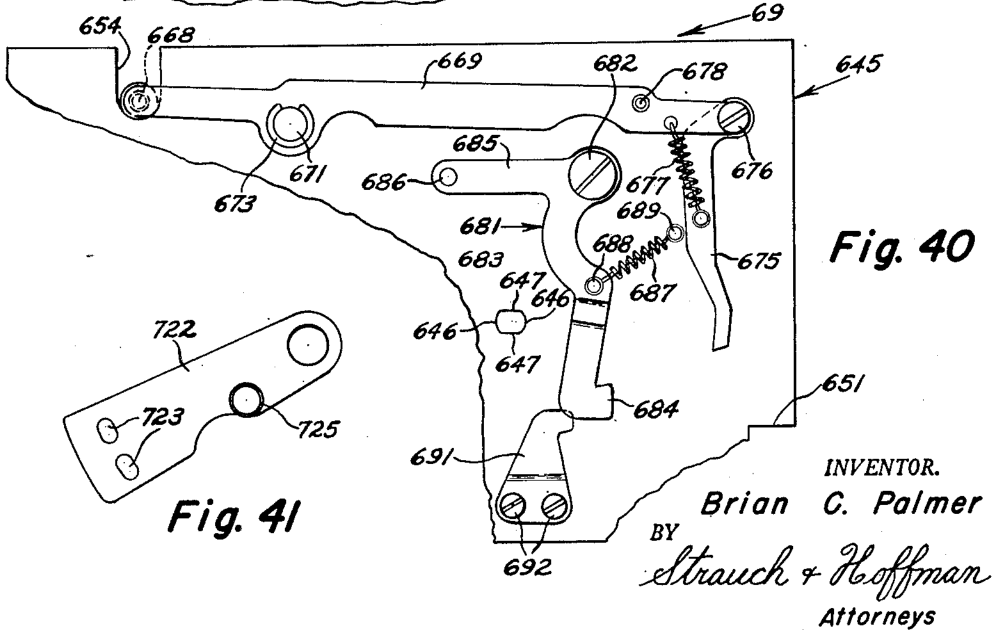
Figure 40 is a fragmental elevational view of the inner face of the right side frame assembly and extras drum and counter operating arm and holding detent.
Figure 41 is a detailed plan view of the adjustment plate carried by the fare drum shaft reset arm.
Figure 42:
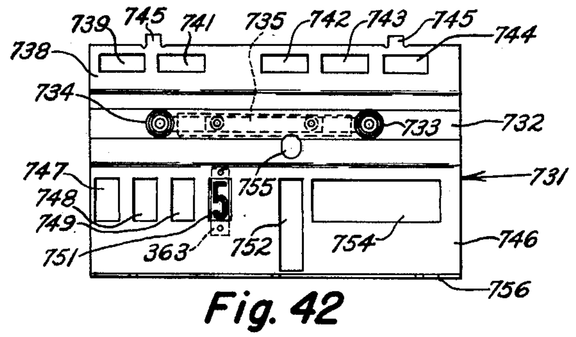
Figure 42 is a front elevational view of the socket plate of the meter front assembly of this invention.

Referring for the moment to Figures 8, 10, 17 and 40 the forward end of lever arm 669 is provided with a depending ratchet pawl 675 pivotally secured to lever 669 by a pivot pin 676. The lower end of pawl 675 is in position to cooperate with the teeth of extras drum operating ratchet wheel 384. To assure proper positioning of ratchet pawl 675, a tension spring 677 having its opposite ends secured to arm 669 and pawl 675 as indicated in Figures 17 and 40 is provided to resiliently bias pawl 675 to a substantially right angular position with respect to lever 669. Arm 669 to the rear of leg 627 of U-shaped frame number 626 as seen in Figure 11 is provided with a right angularly extending operating pin 678 adapted to operatively cooperate with operating finger 641 secured to the operating bracket member 634 of counter assembly 638. It will, therefore, be clear that arm 669 is adapted to operate counter 638 as well as extras drum 376 upon oscillation of arm 669 on stud 671. The desired oscillation is effected by pressing plunger button 662 to move plunger arm 661 to the rear thereby rocking crank arm 655 in a counterclockwise direction as seen in Figure 7 around pivot pin 652 and raising link 664 and the rear end of arm 669 thereby forcing the forward end of arm 669, ratchet pawl 675 and pin 678 downwardly and operating ratchet 384 and counter operating bracket 634 of counter 638 to effect advancing movement of drum 376 and counter 638 to their next successive indicating position. This operation has the effect of registering one extra passenger transported and the fare for the extra passenger. Upon release of button 662, spring 666 returns pawl 675, arm 669, link 664, crank arm 655 and plunger 661 to their "home" positions.

To prevent accidental operation of plunger button 662 when the registering mechanism is in its "home" position and retain extras drum 376 in its registering position until the machine is cleared by operation of the flag shaft assembly 91, extras drum and extras counter operating lever assembly 648 is provided with a combined lock out and holding detent 681 (Figures 17 and 40) pivoted on a pivot screw 682 threaded into plate 645 directly above shaft 401. As clearly seen in Figure 40 detent 681 has a depending arm 683 curved backwardly to clear shaft 401 (Figure 17) and provided with a forwardly directed nose 684 offset axially away from plate 645 and adapted to engage the ratchet teeth of holding ratchet wheel 382 thereby preventing rotation of extras drum 376 to its zero or "home" position under influence of spring 388. Detent 681 also has a rearwardly extending arm 685 provided with a right angularly disposed cam abutment pin 686 adapted to engage arm 514 of cam 513 carried by cam shaft assembly 75 when the meter mechanism is in its "home" position and hold detent 681 out of cooperating engagement with ratchet wheel 382. Pin 686 also cooperates with the under edge of arm 669 in the "home" position (Figure 17) to lock plunger arm 669, plunger 661 and button 662 against accidental operation. Normally detent 681 is biased in a counterclockwise direction as seen in Figure 17 to engage pin 686 with cam 513 and assure engagement of nose 684 with ratchet wheel 383 upon release of pin 686 by a tension spring 687 one end of which is connected to a spring stud 688 on arm 683 and the other end of which is connected to a spring stud 689 carried by plate 645.

As button 662 is depressed to rotate drum 376 nose 684 rides over the teeth of ratchet wheel 382 and due to spring 687 is forced into holding engagement with the holding shoulder of the ratchet teeth. It will, therefore, be clear that drum 376 has a step-by-step movement imparted to it by mechanism 684 and is held in each position by detent 681. This operation proceeds for nine steps until pawl 675 reaches flat 386. At this point, pawl 675 merely slides on flat 386 and further forward movement of drum 376 is impossible.

Plate 645 is also provided with an upstanding stop finger 691 secured in place by screws 692 threaded into plate 645. Stop finger 691 is disposed out of the plane of detent 681 and is adapted to be engaged by stop pin 693 on the outer surface of drum 376 so as to positively stop drum 376 and hold it at its zero indicating position until actuated by plunger button 662.

Assembly 69 is assembled with respect to the free shaft ends of assemblies 72, 74, 75, 76, 77, 81 and 83 and its lower edge is positioned behind ears 66 and 71 on lands 119 and secured in place by nut and bolt assembly 67 passing through ear 66 and cap screw 68 threaded into a suitably tapped aligned opening in plate 645 in a manner obvious to those skilled in the art. Counter assembly 83 is then secured to assembly 69 by threading screws 89 into suitably tapped openings in the adjacent end leg 627.

The meter is now in condition for application of the reset mechanism 99 which will now be described.

*Reset mechanism*

Reset mechanism 99 is shown in Figures 7, 8, 11 and 41 and is composed of suitable reset cams mounted on the ends of cam shaft 471 and drive shaft 521 protruding from assembly 69 and cooperating cam followers and lever and gear assemblies adapted to assure proper positioning of shafts 320, 471 and 521 in the "home" position.

To this end, shaft 471 is provided with reset cam 700 having a dwell 701 the sloping edges of which are disposed on either side of a vertical plane passing through the axis of shaft 471 in the "home" position illustrated in Figure 7. Cam 700 is provided with a hub portion 702 which is adapted to receive a second reset cam 703 having a single lobe 704 the trailing edge of which is offset substantially 15° ahead of the vertical plane passing through the axis of shaft 471 as shown in Figure 7. The leading edge of dwell 701 (dotted lines Figure 7) of cam 700 is preferably disposed at an angle approximately 35° ahead of the vertical plane containing the axis of shaft 471 (Figure 7). Both of these cams are secured in their predetermined positions by a tapered pin 705 passing through the hubs of cams of 700 and 703 and passage 518 the axis of which coincides with the vertical plane containing the axis of shaft 471.

The protruding end of shaft 521 is provided with a heart-shaped cam 706 the dwell 707 of which lies in the vertical plane containing the axis of shaft 521 when said shaft is in its "home" or "for hire" position as illustrated in Figure 7. Plate 645 forwardly of shaft 401 and slightly above the horizontal plane of said shaft is provided with a pivot screw 708 adapted to pivotally mount a cam follower arm 709 which extends rearwardly over shafts 471 and 521 and is provided with downwardly facing free rolling rollers 711 and 712 adapted to respectively cooperate with cams 700 and 706. As clearly shown in Figure 7, roller 712 when the meter mechanism is in its "home" or "for hire" position rests in dwell 707 and roller 711 lies in but clears the lowermost surface of dwell 701 in cam 700. The rear end of arm 709 is provided with a spring stud 713 to which one end of a tension spring 714 is connected. The other end of spring 714 is connected to a spring stud 715 in plate 645. Spring 714 is adapted to resiliently bias arm 709 toward cams 700 and 706 so that either roller 711 or 712 will ride on the cam surface of its respective cam.

In this connection, roller 712 engages the cam surface of cam 706 when cam shaft assembly 75 is in its "home" position with roller 711 in dwell 701 of cam 700 while roller 711 engages the cam surface of cam 700 when the cam shaft assembly 75 is in its three operating positions and holds roller 712 out of the path of cam 706 in these operating positions to free shaft 521 for registering operation. Since cam shaft assembly 91 disconnects the driving mechanism for shaft 521 when in its "home" position, it will be appreciated that shaft 521 is likewise freed for resetting movement in the position of the parts illustrated in Figure 7. Since dwell 701 is relatively wide, it will be appreciated that movement of cam shaft assembly 75 to its "home" position will, due to the positioning of clock shear cam 507 and the 10° offset of the mileage shear cam 477 in the third position of assembly 91, disconnect shaft 521 from the clock drive, will then disconnect shaft 521 from the mileage drive and will thereafter as it approaches its "home" position permit roller 711 to enter dwell 701 of cam 700. At this time spring 714 will engage roller 712 with a portion of the cam surface of heart cam 706. Unless shaft 521 happens to be in its "home" position, this engagement of roller 712 with the cam surface of heart cam 706 will, under the driving force of spring 714 and due to the heart shape of cam 706, rapidly rotate the freed shaft 521 to its "home" position determined by engagement of roller 712 in dwell 707. Therefore, shaft 521 is automatically reset to its "home" position almost instantaneously with the positive resetting of cam shaft assembly 75 to its "home" position.

Resetting of the register drum shaft assembly 72 is accomplished by means of the cam gear segment 716 formed on the end of an arm 717 pivoting around the axis of the pivot stud 718 (Figure 7) and in meshing engagement with pinion gear 719 secured to shaft 320 by tapered pin 721 passing through the hub of gear 719 and tapered opening 393 shaft of 320. Gear 719 is provided with 15 teeth and is secured to shaft 320 with the center line of a tooth space in the plane of the center line of groove 322 of shaft 320. To this end, the openings for pin 721 provided in the hub of gear 719 are aligned with a tooth space of gear 719 so that the gear will be properly positioned automatically due to the angular position of shaft opening 393 with its axis in the plane containing reference mark 395. Gear segment 716 is provided with 20 teeth and the fourth tooth from the lower end is fully meshed with the teeth of pinion 719 in the "home" position of the meter so that counterclockwise movement of segment 716 as seen in Figure 7 to its registering position will effect at least one complete revolution of shaft 320 to properly position groove 332 of shaft 320 for resetting the fare drums to their "home" positions upon reverse rotation of pinion 716 through one complete revolution during resetting movement of arm 717 and gear segment 716.

In order to provide an adjustment for properly positioning arm 717 with respect to the other resetting mechanism, arm 717 is provided with cam follower plate 722 which is freely pivoted on screw 718 in contact with the outside face of arm 717. Plate 722 is provided with adjustment slots 723 (Figure 41) the axes of which lie in an arc having the center of screw 718 as its center. Slots 723 are adapted to receive securing screws 724 (Figure 7) which are threaded into suitably tapped openings provided in arm 717. These slots and screws permit relative angular movement of plate 722 with respect to arm 717 so that a freely rotating cam engaging roller 725 carried by plate 722 and adapted to cooperate with lobe 704 of cam 703 may be angularly adjusted around the axis of screw 718 toward and away from the axis of cam 703 to properly position segment 716 to assure accurate setting of shaft 320.

Referring to Figure 7, it will be noted that lobe 704 upon counterclockwise rotation of shaft 471 as viewed in Figure 7 will normally engage the roller 725 at approximately the same time that roller 711 falls into dwell 701 of cam 700. As a consequence, resetting movement of arm 717 and gear segment 716 is initiated at approximately the same time that roller 711 enters dwell 701 and, due to the curvature of leading edge 727 of cam 703 and the peripheral surface of lobe 704, cam roller 725 moves arm 717 in a clockwise direction as seen in Figure 7 against the resistance of a spring 726 which normally biases arm 717 to its operating position. As a consequence, it will be appreciated that shaft 320 is positively moved to its "home" position by the coaction of cam 703 and roller 725 during the period in which the drive shaft 521 is being automatically reset.

Referring for the moment to Figure 6, it will be appreciated that movement of cam shaft assembly 75 to its "home" position in addition to moving arm 588 out of the path of finger 277 of time delay mechanism 87, also through the aforementioned rotation of shaft 521 moves cam 595 to its "home" position as illustrated in Figure 6. As a consequence, time delay mechanism 87 is automatically reset to its "home" position under influence of spring 274.

At the same time that shaft 471 and cam shaft assembly 75 are brought to their "home" positions switch cam 484 is moved to position notch 487 to receive the switch element of electrical control circuit 95 to be presently described. It will be clear, therefore, that the resetting of the entire meter is accomplished by movement of flag 310 and flag shaft assembly 91 through its third position to its "home" position. Furthermore, since flag shaft assembly 91 cannot be rotated through the "home" position without momentarily stopping because of the cooperation of shoulder 284A and latch element 318 (Figure 8), the resetting operation is positively stopped at the end of its cycle and a sufficient delay in setting the meter mechanism to its operating position for the next trip is afforded to allow drive shaft assembly 76, cam delay mechanism 87, and the extras fare drum, all of which are spring actuated during the resetting of the meter, to reach their "home" positions before the next registering setting of the meter can be accomplished.

*Meter front assembly*

The meter front assembly 96 is illustrated in Figures 6, 7, 11, 15, 16, 17 and 42 to 45. Referring for the moment to Figures 15 to 17 the meter front assembly 96 comprises a light bulb socket plate 731 adapted to extend transversely of the meter front between the inwardly facing side faces of body portion 176 of assembly 65 and plate 645 of assembly 69. As clearly seen in Figures 16 to 17, plate 731 immediately below the counter assembly 88 is provided with a transversely extending rearwardly offset bulb receiving recess 732 having a pair of transversely spaced socket members 733 and 734 (Figure 42) secured therein. The back of plate 731 in the horizontal plane of sockets 733 and 734 is provided with a transversely extending contact assembly 735 of any suitable construction to provide live contacts for sockets 733 and 734. To this end, electrical lead 736 is soldered to contact assembly 735 and extends rearwardly across shafts 401, 471, 521 and under shaft 581, through a supporting clip 737 mounted on clock frame 112, then across the meter and through opening 258 in wall portion 176 of assembly 65 to a connection with the electrical control circuit 95 to be presently described.

Referring again to Figure 42, plate 731 above recess 732 provides a vertically extending wall portion 738 having apertures 739, 741, 742, 743 and 744 elongated in a transverse direction and adapted to respectively display the indicating indicia of the total mileage counter 632, paid mileage counter 633, units counter 636, trip counter 637 and extras passenger counter 638. Wall portion 738 at its upper edge is provided with transversely spaced rearwardly offset tabs 745 adapted to engage behind the frame member 636 of counter assembly 88 and retain the upper edge of plate 731 in proper position.

Plate 731 below recess 732 provides a second vertically extending wall portion 746 lying in the plane of wall portion 738 and provided adjacent the left edge with vertically elongated openings 747, 748, 749 and 751 adapted to respectively display the indicia of $10.00 drum 323, $1.00 drum 325, tens drum 346 and unit plate 363 or a unit drum 399 depending upon the unit indicating construction used in the meter. As clearly seen in Figure 42 plate 363 is riveted to the rear of wall 746.

To the right of aperture 751 and in alignment with the forwardly disposed edge of block 159 wall portion 746 is provided with a relatively long vertically extending opening 752 adapted to receive the forwardly disposed vertical edge of block 159 to which shutter 160*a* is secured as previously described. To the right of opening 752 wall 746 is provided with a transversely elongated opening 754 adapted to expose the indicating indicia of tariff drum 366 and extras fare drum 376. Immediately above aperture 752 and in vertical alignment therewith the backwardly and upwardly sloping wall of recess 732 is provided with an oval aperture 755 adapted to freely receive the forwardly extending end of clock winding shaft 558 as clearly shown in Figure 16.

The lower edge of plate 731 is provided with a right angularly and forwardly directed securing flange 756 adapted to freely receive securing screws 757 which are threaded into tapped apertures 168 in base plate assembly 33 to secure the lower end of plate 731 to the meter base. As clearly seen in Figures 15 to 17 sockets 733 and 734 are provided with light bulbs adapted to illuminate the meter face.

A dial plate assembly extending transversely of the meter to the outer edges of wall portion 179 of assembly 65 and plate 645 of assembly 69 and vertically from the top surface of base plate assembly 33 to the top edge of frame member 626 is secured in place by screws (not shown) adapted to be inserted into suitably tapped apertures formed in the front face of wall portion 179 and aperture 759 formed in frame member 626 and aperture 138 formed in ear 106 of base plate assembly 33. While dial plate assembly may be constructed in any suitable manner, the present invention contemplates a tamperproof dial plate assembly to prevent unscrupulous operators from gaining access to the fare drums, counter assembly 88 and the meter mechanism. Consequently the assembly is made up of a transparent "Lucite" dial plate 760 and a relatively thin sheet metal back plate 761 (Figures 15–17 and 43) having a rearwardly extending peripheral flange 762 (Figure 5) adapted to abut the front face of frame member 626, the front edge of flange 756 of plate 731, and the front faces of wall portion 179. This flange makes it impossible to work a wire or other instrument around the periphery of the dial plate assembly to gain access to the meter mechanism to alter the dial readings should an unscrupulous driver attempt to do so.

Figure 43:
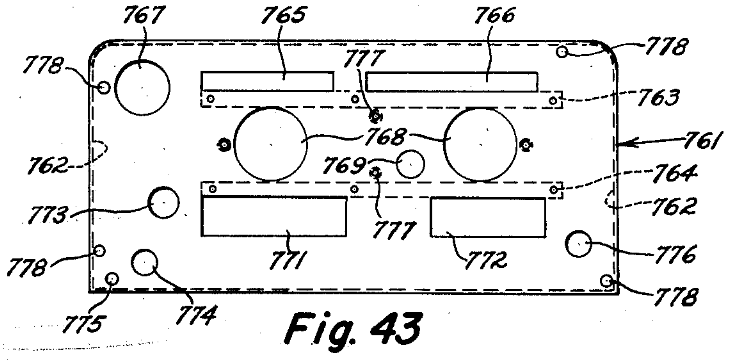
Figure 43 is a front elevational view of the dial backing plate of the meter front assembly of this invention.
Figure 44:
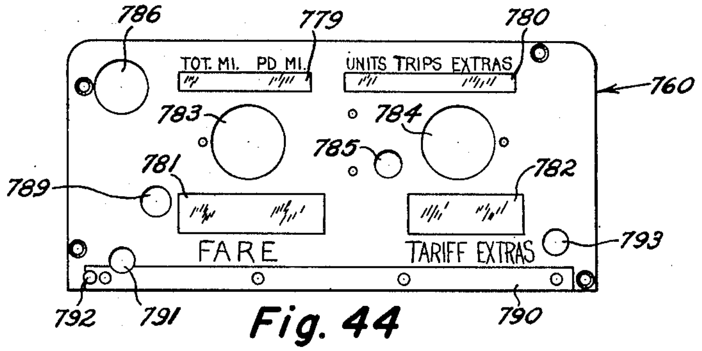
Figure 44 is a front elevational view of the dial plate of the meter front assembly of this invention.
Figure 45:
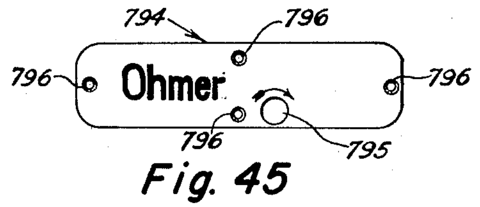
Figure 45 is a front elevational view of the name plate forming a part of the meter front assembly of this invention.

Plate 761 as clearly seen in Figures 15 to 17 and 43 is provided with transversely extending, plastic strips 763 of transparent material, such as "Lucite" disposed in substantial horizontal alignment with the upper edge of wall portion 746 and the lower edge of wall portion 738. These strips are of a thickness corresponding to the distance between the front face of plate 731 and the rear face of plate 761. These strips extend from the inner face of body portion 176 of assembly 65 to the inner face of plate 645 of assembly 69 and in cooperation with body portion 176 and plate 645 completely enclose recess 732 making it impossible to gain access to the openings for the drums and counters from recess 732. Plate 76 as clearly seen in Figure 43 is provided with transversely spaced elongated apertures 765 and 766 in horizontal alignment with the axes of apertures 739 to 744 of socket plate 731 to respectively expose these apertures of plate 731 and consequently the indicia of the counters of counter assembly 88.

To the left of opening 765, plate 761 is provided with an enlarged circular opening 767 adapted to freely receive boss 181 of wall portion 179. Immediately below apertures 765 and 766 and in a concentric relation to sockets 733 and 734, plate 761 is provided with large circular openings 768 to provided access to bulbs 758. Adjacent right hand opening 768 and in alignment with opening 755 of plate 731, plate 761 is provided with a circular opening 769 freely receiving the clock winding shaft 558. Immediately below openings 768 plate 761 is provided with transversely elongated, spaced openings 771 and 772 adapted respectively to expose the openings 747 to 751 and 754 of plate 731 and the fare drum, tariff drum, and extras fare drum indicia.

To the left of opening 771 plate 761 is provided with a circular opening 773 adapted to receive a switch element of electrical control circuit 95 provided to manually control light bulbs 758. Below and to the left of opening 773 plate 761 is provided with a pair of circular openings 774 and 775 of substantially different diameter adapted to respectively receive a post and locking rod forming a part of the meter seal to be hereinafter described.

To the right of opening 772 and in alignment with notch 651 of plate 645 plate 761 is provided with a circular opening 776 to receive plunger button 662. Plate 761 adjacent bulb openings 768 and in vertical alignment midway between these openings is provided with suitably tapped apertures 777 for a purpose to be presently pointed out. Plate 761 is also provided with small circular openings 778 adjacent its periphery to freely receive the securing screws of the dial plate assembly.

"Lucite" plate 760 has one face, that in engagement with plate 761 coated to render it opaque, except for transversely elongated areas 779, 780 and vertically spaced areas 781, 782 coinciding respectively with the openings 765, 766, 771, and 772 of plate 761. In a horizontal plane between areas 779, 780 and 781, 782, plate 760 is provided with circular openings 783, 784 and 785 aligned with openings 768 and 769. The left end of plate 760 is also provided with openings 786, 789, 791, 792 and 793 on right end corresponding in shape and size to the openings 767, and 773 to 776 of plate 761 for freely receiving the meter elements mentioned in connection with the latter openings.

Transparent plate 760 along its lower edge has a metal strip 790 riveted thereto and finished to correspond to the finish of meter cover 97 in order to cooperate with cover 97 to provide the dial plate assembly with a peripheral ornamental frame of pleasing appearance.

The rear face of transparent plate 760 adjacent transversely extending uncoated areas 779 to 782 is suitably printed to designate the character of the indicia displayed through the various openings. Openings 783 and 784 of plate 760 are preferably closed by means of a "Lucite" name plate element 794 having an opening 795 to receive clock winding shaft 558 and suitable apertures 796 aligned with tapped apertures 777 of plate 761 to receive securing screws 797 (Figures 1 and 2) for fastening plates 794 and 760 to plate 761 to provide the unitary dial plate assembly.

*Electrical control circuit*

Figure 24:
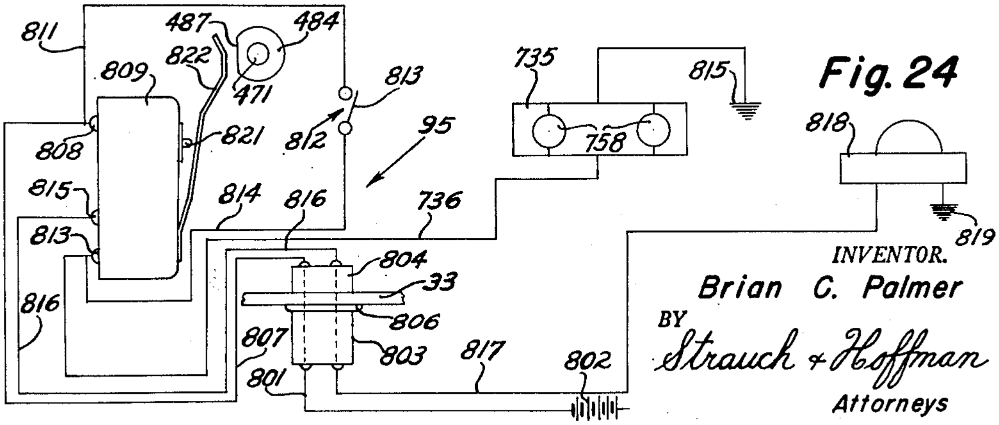
Figure 24 is a diagram of the electrical circuit for lighting the meter face when the meter is in operating condition and controlling the "for hire" telltale light disposed on the roof of the cab.

The electrical control circuit 95 is illustrated in Figures 6, 8, 11 and 24. Referring for the moment to Figure 24, control circuit 95 comprises a cable 800 containing a main power lead 801 from a battery 802 of the vehicle to plug 803 which is inserted into socket 804 mounted in adapter 164 (Figures 6 and 25) by means of nut 805 threaded onto the body of socket 804 and acting against the end of adapter 164 to draw shoulder 806 of the socket into firm abutting engagement with the under surface of base plate assembly 33. While socket 804 and plug 803 may be connected in any suitable manner, a bayonet type of connection (not shown) is preferably employed and the body of plug 803 extends upwardly into socket 804 and is provided with a transversely extending groove (not shown) axially aligned with openings 165 in adapter 164 and corresponding aligned openings in socket 804 for a purpose to be presently pointed out.

Socket 804 is provided with a lead 807 directly connected to contact 808 of a double pole single throw switch 809. Contact 808 is also directly connected through lead 811 with one terminal of a single pole make and break switch 812 adapted to be manually operated by switch arm 813 protruding through meter front assembly 96. The other terminal of switch 812 is connected to a contact 813 of switch 809 through lead 814. It will, therefore, be appreciated that switch 812 is connected in parallel to contacts 808 and 813.

Contact 813 is also directly connected to live contact assembly 735 of bulb socket plate 731 through lead 736 previously described. Plate 731 and sockets 733 and 734 secured therein are suitably grounded as indicated at 815 through the meter base plate in any conventional manner. Switch 809 is also provided with a contact 815 which is connected through lead 816, socket 804, plug 803 and lead 817 of cable 800 to telltale light 818 mounted on the vehicle roof and grounded as indicated at 819 to the vehicle structure in well known manner and adapted to provide a visual indication to persons outside of the cab as to whether the vehicle is "for hire."

Double pole switch 809 as clearly shown in Figures 6, 8 and 24 is provided with an actuating button 821 adapted to operate dual switch elements provided by switch 809 in well known manner. Button 821 is normally biased to its "off" position illustrated in Figures 6, 8 and 24 and is adapted to be moved to its "on" position by spring arm 822 which is arranged to be actuated by cam 484 carried on the end of shaft 471 of cam shaft assembly 75 as previously pointed out. The end of switch arm 822 in the "off" position is adapted to lie in notch 497 of cam 484 so that both tell-tale light 818 and bulbs 758 of meter 30 are extinguished. However, upon operation of flag 310 and flag shaft assembly 91 cam 484 will be rotated to engage switch arm 822 with button 821 and close the circuit through switch 809 to thereby illuminate tell-tale signal 818 and bulbs 758.

In order that bulbs 758 may be illuminated to inspect the meter readings or for similar purposes, switch 812 may be manually operated by switch arm 813 so as to illuminate bulbs 758 through the parallel circuit established from battery 802, through lead 801, plug 803, socket 804, lead 807, contact 808, lead 811, switch 812, lead 814, contact 813, lead 736, contact assembly 735, bulbs 758, sockets 733 and 734 to ground 815. It, accordingly, will be appreciated that automatic illumination of the meter bulbs and telltale light 818 is accomplished upon conditioning the meter for registering operation and that the meter face may be independently illuminated manually when desired.

In many installations, it is required that the top or tell-tale light 818 (Figure 24) be illuminated when the flag is in the "home" or "for hire" position. It, accordingly, will be appreciated that this function may be accomplished by changing the double pole single throw switch 809 to a single pole double throw switch with contact 815 closed when actuating plunger 821 is at rest position as shown.

*Transmission drive means*

The present invention embodies a novel transmission drive means 84 for imparting movement to gears 202 and 203 of mileage gear and lever mechanism 85. To this end, the invention provides a vertically extending shaft 820 journalled in bushings 261 of ears 177 formed on body portions 176 of assembly 65, worm pinions 823 and 823a secured to shaft 820 by suitable set screws 824 and adapted to respectively mesh with worm gears 202 and 203 and a ratchet wheel 825 secured to the lower end of shaft 820 by set screws 824. As clearly seen in Figure 6 the lower end of shaft 820 stops within the body of ratchet wheel 825 so that the ratchet wheel is in effect mounted at the end of shaft 820.

Ratchet wheel 825 is adapted to cooperate with ratchet pawl disc 826 journalled in boss 110 of base plate assembly 33 by the lower reduced end of its hub 827 which is supported in bearing 163 and has the bore in its lower end squared to receive a squared drive coupler 828 formed on the upper end of the flexible drive shaft 829 carried in flexible cable 830. Pawl disc 826 as clearly seen in Figure 11 is provided with "lighting" pick-up pawls 831 similar in all respect to the "lighting" pick-up pawls of the mileage drive gear and ratchet pawl assembly 527. As a consequence, reverse rotation of pawl disc 826 will not effect rotation of ratchet wheel 825 and the meter cannot be defrauded by reversing the vehicle.

The upper end of cable 830 is provided with a coupler 832 composed of a circular hub 833 and an integral rectangular plate 834 provided with diametrically disposed, axially extending L-shaped lugs 835 legs 836 of which are of arcuate configuration and extend in opposite directions from a diametrical plane so as to be received in arcuate slots 111—111a of base plate assembly 33 and wear plate 124 and be locked in engagement by relative rotation of coupler 832 with respect to base plate assembly 33. The opposite end of cable 830 is provided with a coupler 837 adapted to operatively connect flexible drive shaft 829 to a gear box 838 mounted on the transmission (not shown) and corresponding in all substantial respects to the corresponding gear box shown in United States Patent 2,006,653, of July 2, 1935, to H. C. Riesinger.

From the foregoing description, it will be appreciated that pawl disc 826 and ratchet wheel 825 are independently journalled for rotation and as a consequence binding of shaft 820 or shaft 828 as a result of misalignment of the respective bearing bushings 163 and 261 is completely eliminated. As a consequence, free rotation of shaft 820 and drive coupler 829 is assured and at the same time proper driving engagement between pawl disc 826 and ratchet wheel 825 is obtained.

While this novel driving relationship between ratchet wheel 825 and pawl disc 826 and their method of mounting is extremely beneficial in the embodiment of the invention illustrated in the drawings, this arrangement is of particular value when the conventional compensating gear box (not shown) required by some state laws to be mounted on the underside of the meter base plate assembly 33 to correct any error in the number of revolutions per mile of the outlet element of the transmission gear box disclosed in these drawings is used. This compensating gear box is a well known expedient forming no part of the present invention and will not be further described here.

*Meter seal construction*

With the meter parts assembled as heretofore described, cover 97 is placed in position as illustrated in Figure 1 so as to cooperate with the meter front assembly 96 to completely enclose the meter mechanism. Cover 97 as clearly illustrated in Figure 1 is sealed against authorized removal by a conventional wire seal element 841 passing through securing screw 127A at the forward right hand corner of the cover and a suitably formed lug 842 formed integrally on the cover itself. This seal prevents unauthorized removal of cover 97 since its removal would result in damage to the construction of the seal which would be readily discernible upon inspection.

Furthermore, wall portion 179 of assembly 65 as clearly shown in Figure 6 is provided with a forwardly extending post 843 extending through apertures 774 and 791, in meter front assembly 96 and provided with a transverse slot 844 (Figure 15) to receive an arm 845 secured on one end of a locking rod 846 extending through apertures 775 and 792 in meter front assembly 96, apertures 165 in adapter 164, the aligned groove in plug 803, ear 165 of base plate assembly 33 into engagement with the axially extending lug 835 of coupler 834. As clearly illustrated in Figure 2, arm 845 and post 843 are suitably apertured to receive wire element 847 of seal 848.

Rod 846, therefore, cannot be withdrawn from its locking engagement with plug 803 and coupler 834 except upon damaging or breaking seal 848. It, accordingly, will be appreciated that rod 846 locks plug 803 and coupler 832 in assembled relation with the base plate assembly 33 so that an unscrupulous driver or operator cannot disconnect the meter drive by uncoupling the meter drive coupling 832 or disconnect tell-tale light 818 without the knowledge of the cab inspector. As a consequence, these two seals and the construction of meter front assembly 96 heretofore described, effectively protect meter 30 against the machinations of unscrupulous drivers and the protective seals are disposed for ready inspection and are not in inaccessible positions on the under side or back of the meter as has been the case in the past.

From the foregoing description, it is believed that the operation of the meter of the present invention is entirely clear and that a detailed summation of the operation is not necessary. It will also be appreciated that the present invention provides a simple, compact meter capable of furnishing all the required information of the much larger and more complicated prior art meters and that the various subassemblies of the meter are designed to permit ready and inexpensive repair and replacement.

*Modified ratchet pawl construction for mileage transmission drive means*

In actual usage of the meter so far described, it has been found that a careless driver will, when running the cab in reverse, suddenly shift into forward drive. This sudden reversal of flexible drive shaft 829 causes shaft 829 to rebound in a forward direction with the result that one or more of the pawl springs for pawls 831 may at times become dislodged from the groove in the pawls. In time the dislodged spring will work its way out beyond the periphery of disc 826 where it will engage the reinforcing web on body portion 176 and jam the meter drive. To overcome this objection, the present invention contemplates the use of the novel pawl disc construction of Figures 46 and 47.

Figure 46:
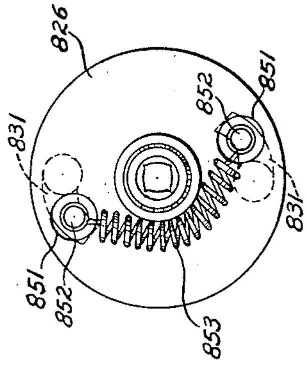
Figure 46 is a plan view of a modified pawl disc construction for use on the transmission drive means.
Figure 47:
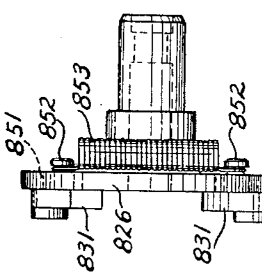
Figure 47 is an edge view of the pawl disc of Figure 46.

This pawl disc 826*a* is substantially like disc 86 previously described except that the spring securing screws are omitted, two pawls only are provided and the disc adjacent the free ends of pawls 831 are provided with enlarged circular openings 851. Pawls 826 on their face adjacent disc 826 are provided with spring studs 852 which extend through openings 851 in annularly spaced relation to the walls of the openings. The protruding ends of studs 852 are adapted to have the opposite ends of a coil tension spring 853 secured thereto as shown in Figure 46 with the midportion of spring 852 in engagement with the hub of disc 826 and the spring under tension. As a result of this construction, pawls 831 are normally spring biased inwardly into engagement with ratchet wheel 825. The construction of studs 852 and the ends of spring 853 is such that rebounding of shaft 829 will not disengage the springs and pawls and proper operation of the drive means is assured at all times.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a taximeter having a base and operating mechanism carried by said base; a front face for displaying the meter indicia and receiving the operator actuated control elements; a drive cable coupling removably associated with said base and provided with a drive cable operatively connected to said operating mechanism; a rod of substantial diameter extending through said front face and into axial abutting engagement with said drive cable coupling to lock said coupling against removal from said base; a lug protruding through said front face adjacent the protruding end of said rod and fully visible seal means cooperating with said rod and said lug at the front of said face in a position for ready inspection to disclose unauthorized tampering with said drive cable.

2. The combination defined in claim 1 together with an electric socket for a "for hire" tell-tale signal removably associated with said base and cooperating with said rod whereby said rod also locks said socket against unauthorized removal and prevents intentional disconnection of said tell-tale signal.

3. A taximeter adapted for ready assembly and replacement of parts worn in use comprising a base plate assembly; a side frame and mileage drive gear and lever mechanism assembly secured to said base plate inwardly of one edge thereof; a forwardly and rearwardly disposed flag shaft assembly journalled on the outwardly facing side of said frame assembly; an operator actuated flag secured to the forward end of said flag shaft assembly and a gear secured to its other end; drive means operatively connected to said mileage drive gear and lever mechanism; a side frame and extras drum and counter operating lever mechanism assembly secured to said base plate inwardly of the opposite edge thereof; a drum shaft assembly journalled in said side frame assemblies adjacent the lower forward edges thereof and comprising a plurality of fare indicating drums arranged in side-by-side relation to display their indicia at the front of the meter; a counter assembly secured to said side frame assemblies vertically above said drum shaft assembly and comprising a plurality of individual counter assemblies arranged in side-by-side relation to display their indicia at the front of the meter; a meter front panel having spaced windows for displaying the indicia of said plurality of drums and said plurality of counter assemblies; a drum transfer pinion and clock stop finger shaft assembly journalled in said side frame assemblies immediately to the rear of said register drum shaft assembly and including transfer pinions adapted to be selectively moved into and out of engagement with certain of said plurality of drums and a clock stop finger adapted to be moved into and out of engagement with the escapement fork of a clock; a drum stop finger and drum drive gear shaft assembly journalled in said side frame assemblies above and slightly to the rear of the axis of said drum shaft assembly and including fare drum stop fingers adapted to be moved into and out of engagement with said certain drums and an idler gear in driving engagement with one of said drums other than said certain drums; a clock assembly mounted on said base plate adjacent the rear thereof and between said side frame assemblies; a clock shear and drive gear shaft assembly having one end journalled on said clock assembly, its other end journalled in one of said side frame assemblies; a drive shaft assembly journalled in said side frame assemblies in rearwardly spaced relation to said drum stop finger and drum drive gear shaft assembly, operatively connected to said mileage drive gear and said clock drive gear so as to be driven by one or the other during all operating positions of the meter and including a jumper cam; a fare and trips lever shaft assembly journalled adjacent the rear ends of said side frame assemblies and having lever means extending forwardly into operative relation with said jumper cam and one of said certain drums and one of said counter assemblies and a trips counter operating lever extending forwardly into operative relation with another of said counter assemblies; and a cam shaft assembly journalled in said side frame assemblies between said drive shaft assembly and said drum stop finger and drum drive gear shaft assembly and having a gear engaging said flag shaft gear, a cam assembly operatively cooperating with said mileage lever mechanism and adapted to selectively connect said mileage drive gear to said drive shaft assembly, a cam adapted to operate said drum transfer pinion and clock stop finger shaft assembly, a release cam adapted to cooperate with said lever means to release said lever means for operation by said jumper cam, a cam adapted to operate said drum stop finger and drum drive gear shaft assembly, a gear adapted to engage said idler gear and rotate said one drum a predetermined distance, a cam adapted to oscillate said trips counter operating lever and a cam assembly operatively cooperating with said clock shear and drive gear shaft assembly and adapted to selectively connect said clock drive gear to said drive shaft assembly.

4. A base plate assembly for a taximeter comprising a body portion; upstanding mounting ears spaced inwardly from the opposite side edges of said body portion and providing machined lands adapted to support opposite side frame assemblies in parallel position upon said body portion; upstanding flanges paralleling said edges and disposed outwardly of said ears to position a cover transversely of said base plate assembly, one of said flanges terminating a substantial distance inwardly of the adjacent rear corner of said body portion; a wear plate covering said rear corner of said body portion and providing a horizontal planar surface in a plane above the upper surface of said body portion, said corner and said plate having equa-radially spaced arcuate openings therein; an upstanding boss integrally formed on said rear corner of said body portion and extending through said wear plate, said boss providing a concentric through bore and having its axis coinciding with the axis of said arcuate slots and being adapted to receive a primary drive shaft for said meter; a depressed area in said body portion between the rearmost upstanding mounting ears adapted to receive a frame member of a clock for driving said meter, through apertures arranged in and adjacent said depressed area to receive securing bolts for said clock; a transversely extending land disposed between said depressed area and the inner vertical faces of the mounting ears at one side of said body portion, said land having its upper surface lying in a plane parallel to the lands on said mounting ears, a substantially centrally disposed rectangular depression; an L-shaped stop member removably secured in said rectangular depression and adapted to determine forward movement of a fare drum transfer pinion frame assembly; forwardly extending spring arms removably secured to said land at both sides of said rectangular depression and having upstanding transfer pinion positioning blocks removably mounted on their free ends, one of said spring arms having a spring retainer secured to its upper surface at its fastened end; an upwardly extending lug between said depressed area and the adjacent end of said transversely extending land; a forwardly extending spring arm secured to said lug and having a right angularly disposed upwardly extending stop finger at its forward end adapted to secure unidirectional rotation of a fare drum operating ratchet wheel; an upstanding ear on said body portion disposed adjacent to and to one side of said end of said stop finger; an upstanding post mounted in said body portion forwardly of and in alignment with one side face of said last mentioned ear; a block member slidably mounted on said post and having an upwardly extending guide finger and a vertically extending forwardly facing mounting face; an L-shaped actuating lever pivotally mounted on said side face of said ear and having one leg extending forwardly under said block member to support said block and the other leg extending upwardly and adapted to engage an actuating cam on the register drum shaft assembly; resilient means connected at its opposite ends to said block and said body portion and adapted to retain said block in engagement with said one leg of said L-shaped lever; a transversely extending land on said body portion adjacent one side of said post; and an upstanding arm removably secured to said land and adapted to retain a fare drum actuating pawl in operative relation to said fare drum operating ratchet wheel.

5. The combination defined in claim 4 wherein said depressed area adjacent its rear edge is provided with transversely spaced upwardly extending studs adapted to cooperate with said clock to retain said clock against displacement in event the securing bolts are removed by an unscrupulous operator.

6. The combination defined in claim 4 wherein said body portion is provided with a through opening adjacent said one upstanding flange and an electric socket adaptor is secured in said opening.

7. The combination defined in claim 6 together with a transversely extending ear having a forwardly and rearwardly extending through opening aligned with the center line of one of said arcuate slots and openings in said adapter whereby a locking rod may be passed through said openings to lock an electrical socket in said adaptor and a drive shaft coupler in said arcuate slots.

8. A side frame and mileage drive gear and lever mechanism assembly for a taximeter comprising a plate like body portion having journal openings therein adapted to respectively receive a register drum shaft assembly, a fare drum transfer pinion frame and clock stop finger shaft assembly, a fare drum stop finger and tariff drum drive gear shaft assembly, a cam shaft assembly, a drive shaft assembly, and a fare drum and counter levers shaft assembly; a pair of vertically spaced, horizontally extending apertured supporting ears on one face of said body portion at one end thereof providing vertically aligned journal openings; a transmission driven worm drive shaft mounted in said aligned journal openings, a horizontally disposed stub shaft journalled in said body portion adjacent each of said ears; a worm gear mounted on each of said stub shafts adjacent said one face of said body portion and adapted to be independently driven from said transmission driven drive shaft; a total mileage drive cam secured to one of said stub shafts adjacent the other face of said body portion; a combined paid mileage drive gear and cam journalled on said one stub shaft adjacent said total mileage drive cam; a first gear secured to said one stub shaft adjacent said paid mileage drive gear and cam; a journal stud projecting from said other face of said body portion at one side of and adjacent said stub shafts; a total mileage counter operating lever pivoted on said journal stud in the plane of said total mileage drive cam and having a portion normally engaging said cam whereby said lever has an oscillating movement imparted to it during each revolution of said cam; a mileage shear journalled on said other stub shaft in spaced relation to said other face of said body portion and normally disposed in its upper inoperative position; a locking pawl on one side of said mileage shear in the plane of and adapted to normally engage the gear of said paid mileage gear and cam; an idler gear journalled on the other side of said mileage shear; a second gear secured on said other stub shaft in the plane of said idler gear and constantly meshing with said idler gear; a shifter lever journalled at one end on said other face of said body portion to the rear of said stub shafts and extending forwardly over said worm shafts; means at the forward end of said shifter lever for operating with the upper edge of said mileage shear to normally retain said shifter lever in its uppermost position; a relatively wide gear journalled on said shifting lever and adapted to selectively engage with said first gear and the gear of said paid mileage drive gear and cam to drivingly connect said first gear and said gear of said paid mileage drive gear and cam to drive the latter, said wide gear being normally held disengaged when said mileage shear is in its inoperative position; and a paid mileage counter operating lever journalled on said journal stud in the plane of the cam of said paid mileage drive gear and cam and having a portion normally engaging said last mentioned cam whereby said lever will have an oscillating movement imparted to it upon rotation of said paid mileage drive gear and cam.

9. A fare drum stop finger and tariff drum drive gear assembly for a taximeter comprising a shaft adapted to be supported adjacent its ends; a tariff drum intermediate drive gear journalled on said shaft and having a driven gear portion and a driving gear portion adapted to respectively cooperate with a flag actuated drive gear and a gear secured to said tariff drum to continuously rotate said tariff drum as said flag is moved throughout its operating cycle; a fare drum stop finger assembly journalled on said shaft in longitudinally spaced relation to said gear and having an arm adapted to engage a flag actuated fare drum stop finger control cam and a plurality of stop fingers the free ends of which are adapted to engage zero stop shoulders provided on the respective fare drums; and spring means cooperating with said stop lever and adapted to resiliently urge said fare drum stop lever into engagement with said control cam whereby said stop fingers are moved to and from their zero stop positions as said flag is moved throughout its operating cycle.

10. A cam shaft assembly for a taximeter comprising a shaft adapted to be journalled adjacent its ends; a mileage shear cam assembly secured to said shaft a predetermined distance inwardly from one end of said shaft; a clock shear cam assembly secured to said shaft a predetermined distance inwardly from said other end of said shaft; a fare drum transfer pinion frame release pin secured to said shaft in predetermined spaced relation to said mileage shear cam assembly; a fare drum and units counter lever latch cam secured to said shaft in predetermined spaced relation to said pin; a fare drum stop finger operating cam secured to said shaft in predetermined spaced relation to said latch cam; a tariff drum drive gear secured to said shaft in predetermined spaced relation to said release cam; a trips counter lever operating cam secured to said shaft in predetermined spaced relation to said tariff drum drive gear; a clock stop finger release cam secured to said shaft in predetermined spaced relation to said trips counter release cam; and an extras counter and extras fare drum mechanism release cam secured to said shaft adjacent said clock shear cam assembly.

11. The combination defined in claim 10 wherein said mileage shear cam assembly and said clock shear cam assembly are relatively positioned circumferentially of said shaft and are provided with cam surfaces of differing angular dimensions to simultaneously effect operative connection of the drive shaft assembly and the mileage drive gear and lever assembly and the clock shear and drive gear assembly and to effect sequentially disconnection of the clock shear and drive gear assembly and then the mileage drive gear and lever assembly.

12. The combination defined in claim 11 wherein the transfer pinion frame release pin; fare drum stop finger operating cam, the trips counter lever operating cam, the clock stop finger release cam and extras counter release cam are relatively positioned circumferentially of said shaft and are provided with cam surfaces of differing angular dimensions to simultaneously effect operative and inoperative positioning of said transfer pinion frame, said fare drum stop finger, said trips counter lever, said clock stop finger and said extras counter mechanism as the connection and disconnection of the mileage drive gear and lever assembly is effected.

13. The combination defined in claim 12 wherein the tariff drum drive gear provides a continuous 360° tooth portion adapted to effect rotation of the tariff drum as the connection and disconnection of the mileage drive gear and lever assembly is effected.

14. In a taximeter drive shaft assembly comprising a shaft adapted to be journalled inwardly of its ends and having a mileage drive gear assembly adjacent one end comprising a gear rotatably mounted on said shaft and a drive wheel secured to said shaft adjacent said mileage gear, a clock drive gear assembly adjacent the other end comprising a gear rotatably mounted on said shaft and a drive wheel secured to said shaft adjacent said clock gear, and a jumper cam secured to said shaft between said drive assemblies in position to cooperate with a fare drum and units counter operating lever: a one way drive connection between said respective gears and wheels adapted to impart uni-directional rotation to said shaft irrespective of which gear supplies the driving force comprising a plurality of angularly spaced pick-up elements having at least one element in driving engagement at all times with its cooperating drive wheel to assure instant establishment of a driving connection and continuous uninterrupted rotation of said shaft so long as either of said gears is rotated.

15. In a taximeter drive shaft assembly comprising a shaft adapted to be journalled inwardly of its ends and having a mileage drive gear assembly adjacent one end comprising a gear rotatably mounted on said shaft and a drive wheel secured to said shaft adjacent said mileage gear, a clock drive gear assembly adjacent the other end comprising a gear rotatably mounted on said shaft and a drive wheel secured to said shaft adjacent said clock gear, and a jumper cam secured to said shaft between said drive assemblies in position to cooperate with a fare drum and units counter operating lever: a one-way drive connection between said respective gears and wheels adapted to impart uni-directional rotation to said shaft, irrespective of which gear supplies the driving force, comprising angularly spaced pick-up elements at least one of which is constantly in driving position to assure instant establishment of a driving connection and continuous, uninterrupted rotation of said shaft, so long as either of the gears is rotated; and a time delay mechanism mounted on a stationary part of the meter adjacent to said drive shaft and comprising a depending, spring biased, pivoted arm, one edge of which forms a cam surface, a supporting finger pivotably mounted on said arm for angular adjustment and protruding from said arm and adapted to support said fare drum and units counter operating lever in its uppermost, non-operating position, and a cam secured to said drive shaft and adapted upon predetermined rotation of said drive shaft to move said finger out of supporting contact with said lever and permit said lever to engage and be reciprocated by said jumper cam, said pivotably mounted supporting finger adapting said meter to be accurately adjusted to prevent additional charges until the initial fare rate has been consumed.

16. A fare drum and units counter operating lever assembly comprising a main operating lever having one end provided with a journal opening adapting it for journalled mounting on a shaft and having a depending fare drum operating pawl pivoted to its other end; a plate member pivotally and slidably mounted adjacent to the other end of said main operating lever; a units counter operating pin protruding from said plate to one side of said main operating lever; means for securing said plate in a selected position to assure proper operation of said units counter when said main operating lever is reciprocated; and a tension spring interconnecting said main operating lever and said depending pawl to bias said pawl toward said one end of said main operating lever.

17. A clock drive gear and shear shaft assembly for a taximeter comprising a shaft adapted to be journalled at its ends; a gear secured adjacent one end of said shaft in spaced relation to said gear and adapted to mesh with a companion gear on the driven shaft of a clock; a second gear secured to said shaft adjacent said first gear; a normal waiting time clock shear journalled on said shaft and extending outwardly therefrom and having its free end formed to provide a cam engaging nose; a gear journalled on a side face of said clock shear and constantly meshing with said second gear on said shaft and adapted to be selectively meshed with a clock gear on the drive shaft assembly of the meter.

18. The combination defined in claim 17 wherein the second gear on said shaft is a compound gear having a gear portion at one end of small diameter and a gear portion at the other end of large diameter to respectively provide an initial drive gear for a double waiting time drive and normal waiting time drive and the space between said first gear and said second gear is adapted to receive a second clock shear for double waiting time together with a depending arm on said normal waiting time clock shear adapted to engage a portion of said second clock shear to assure either operation of the normal waiting time drive or the double waiting time drive.

19. A mileage drive gear and lever assembly comprising a side frame member providing spaced journal openings for a pair of spaced shafts; a stub shaft journalled in each of said spaced openings and projecting beyond the opposite side faces of said frame member; a gear mounted on the end of each of said stub shafts projecting from one of said side faces; a total mileage cam secured to one of said stub shafts adjacent the opposite said side face; a combined paid mileage gear and cam journalled on said one stub shaft adjacent said total mileage cam; a gear secured to said one stub shaft adjacent the gear of said combined gear and cam; a pair of counter operating levers pivoted between their ends to said frame member, each of said levers having one end formed to constantly engage one of said cams and its opposite end adapted for operative connection to a counter assembly; a mileage shear journalled on said other stub shaft adjacent said opposite face and normally retained in its non-registering position by the cam shear assembly provided on the cam shaft assembly of the meter; a shifter lever journalled on said frame member and having an abutment arm adapted to engage an edge of said mileage shear; spring means biasing said shifter lever abutment arm into engagement with said edge of said mileage shear; a gear journalled on a side face of said shifter lever and adapted to be meshed with said second gear on said one stub shaft and the gear of said combined gear and cam when said mileage shear moves to its registering position but normally disposed in non-meshing position when said mileage shear is in its non-registering position; locking means on one face of said mileage shear normally cooperating with the gear of said combined gear and cam to prevent rotation of said combined gear and cam when said mileage shear is in its non-registering position and adapted to be disengaged when said mileage shear moves to its registering position.

20. The combination defined in claim 19 together with a gear secured to said other stub shaft adjacent said mileage shear; and a gear journalled on said mileage shear and constantly meshing with said gear on said other stub shaft and adapted to be selectively meshed with a mileage gear on the drive shaft assembly of the meter.

21. In a time delay mechanism for delaying registering operation of a taximeter until the initial fare rate recorded upon actuation of the meter flag has been consumed and comprising an arm pivotally mounted at one end on a stationary frame member and providing a cam abutment surface adjacent its free end and spring means normally biasing said arm in one direction to urge said cam surface into engagement with a cam secured to and rotating with the registering drive shaft of said meter: a supporting finger adapted to support the fare drum and units counter operating lever of the meter in inoperative position until the pivoted arm is moved by said cam in the opposite direction to disengage said finger from said fare drum and units counter operating lever, comprising a body member pivotally supported on said arm and having an arcuate slot formed therein in radially spaced relation to and concentric with the axis of said pivot mounting; a set screw having its shank extending through said slot and into threaded engagement with said arm and having its head adapted to engage said body member to lock said body member in preselected adjusted position angularly of said pivotal axis; and an integral finger portion formed on said body member and protruding beyond said arm in position to normally support said fare drum and units counter operating lever.

22. A side frame and extras drum and counter operating lever mechanism assembly for a taximeter comprising a plate-like body portion having journal openings therein adapted to respectively receive a register drum shaft assembly, a fare drum transfer pinion frame and clock stop finger shaft assembly, a fare drum stop finger and tariff drum drive gear shaft assembly, a cam shaft assembly, a drive shaft assembly, and a fare drum and counter levers shaft assembly; a bell crank pivoted on one face of said body portion adjacent one end thereof and having a depending arm and an angularly disposed arm; a forwardly extending push button plunger rod pivotally connected to the lower end of said depending arm and extending beyond the other end of said body portion; a vertical link member pivotally connected to the free end of said angularly disposed arm and extending upwardly to the top edge of said body portion; a tension spring having one end secured to the said body portion and its other end connected to normally bias said bell crank to maintain said push button plunger rod in its extreme forward position and said vertical link in its extreme lower position; a forwardly and rearwardly extending extras drum and counter operating lever pivoted between its ends on the other face of said body portion with its rearmost end opposite the upper end of said link member and its forward end slightly inwardly of said other end of said body portion; a pin pivotally interconnecting said upper end of said vertical link member and the rear end of said operating lever; a depending extras drum operating pawl pivoted to said forward end of said operating lever and extending downwardly and having its lower end adapted to engage an extras drum operating and holding ratchet assembly; a tension spring connected at its opposite ends to said operating lever and said depending pawl and adapted to resiliently urge said pawl rearwardly; a pin protruding from one side of said operating lever and adapted to operate an extras counter; an extras drum bell crank pivoted on the other face of said body portion and having a depending arm terminating in a ratchet holding pawl adapted to engage said extras drum operating and holding ratchet assembly to prevent reverse rotation thereof and a rearwardly extending arm; a pin protruding from one face of said rearwardly extending arm of said bell crank and adapted to engage a release cam provided to disengage said extras drum bell crank from said extras drum operating and holding ratchet assembly; and a tension spring connected at one end to said extras drum bell crank and at its other end to said body portion and adapted normally to resiliently engage said pin with said release cam and resiliently engage said extras drum crank with said extras drum operating and holding ratchet assembly at other times.

23. In a taximeter having a side frame member and ratchet driven extras fare drum and an extra passenger counter assembly mounted on parallel axes in vertically spaced relation adjacent one face of and at right angles to said frame member, a plunger operated mechanism for operating said extras drum and counter comprising a bell crank pivoted on the other face of said frame member on an axis paralleling said drum and counter axes and having a depending arm and an angularly disposed arm extending generally toward one vertical edge of said frame member; a plunger member pivotally connected to said depending arm and extending parallel to said one face of said frame member toward and beyond said other vertical edge; a link pivotally connected to said other arm and extending upwardly at right angles to said plunger member; a tension spring normally resiliently retaining said link member in its lowermost position and said plunger member extending beyond said other vertical edge; a lever pivoted on said one face of said frame member on an axis parallel with said drum and counter axes with one end opposite the upper end of said link and its other end extending toward said other vertical edge of said frame member and terminating above said extras fare drum ratchet; a depending ratchet pawl pivoted at said other end of said lever and extending downwardly into engagement with said ratchet; a tension spring connected at one end to said lever and at its other end to said pawl and adapted to resiliently hold said pawl in engagement with said ratchet; and a counter operating pin protruding from one side of said lever into engagement with said extras counter, said plunger operated mechanism being adapted to operate said drum and said counter upon pressing the free end of said plunger member toward said one vertical edge of said frame member to overcome the tension of said first mentioned spring and thereby rock said bell crank and said lever about their pivots and cause said pawl to move said ratchet and said pin to move said counter.

24. The combination of claim 23 together with drum holding means comprising a holding lever pivoted on said one face of said frame member on an axis parallel to said drum axis and having a pawl at its free end adapted to engage said ratchet and prevent reverse rotation; and spring means for resiliently biasing said pawl into engagement with said ratchet.

25. The combination defined in claim 24 wherein said holding lever is provided with an angularly disposed arm having a pin protruding from one side and adapted to engage a release cam whereby said holding lever may be released to free said extras drum for reverse rotation for resetting it to its zero position.

26. In a flag shaft controlled taximeter comprising a common drum shaft adapted to be reversely rotated to reset certain of several fare drums journalled thereon, a meter drive shaft and lever assembly for driving said certain fare drums in fare registering direction including a heart cam secured to one end of said drive shaft with its dwell located to determine the normal "for hire" position of said drive shaft, and a cam shaft actuated by said flag shaft and having meter operation initiating cams secured thereto: a reset mechanism comprising a pair of reset control cams secured to the end of said cam shaft adjacent said one end of said drive shaft and provided with dwell areas located in predetermined angular relation; a reset pinion secured to the end of said drum shaft adjacent said respective ends of said drive shaft and cam shaft; a reset lever pivoted at one end to a stationary part of said meter and having a pair of spaced rollers, one adapted to engage one of said reset control cams and the other adapted to selectively engage said heart cam; a spring urging said reset lever in a direction to engage said one roller with said one reset control cam and adapted upon movement of said cam shaft toward its "for hire" position to urge said one roller into the dwell of said control cam and said other roller into engagement with said heart cam whereby said heart cam and said drive shaft are rotated to their "for hire" position determined by engagement of said other roller in the dwell of said heart cam; a second reset lever pivoted at one end to a stationary part of said meter and having its other end formed to provide a gear segment of predetermined length adapted to drivingly engage said drum shaft pinion and a roller disposed in the path of movement of the cam surface of said other reset control cam and adapted upon movement of said cam shaft toward its "for hire" position to be engaged by said cam surface and move said second reset lever about its pivotal axis in an arc of predetermined length and direction to reversely rotate said pinion gear and drum shaft to a predetermined angular position to reset said certain several drums; and spring means connected at its opposite ends to said second reset lever and a stationary part of said meter to oppose movement of said second reset lever in said predetermined direction and be tensioned whereby upon release of said roller on said second reset lever said second lever, said drum shaft, and said pinion will be rapidly and oppositely rotated to release said certain several drums for registering operation.

27. The combination defined in claim 26 wherein said common drum shaft is provided with a longitudinally extending spline groove and said certain fare drums are each provided with a fare drum reset mechanism comprising respective spring biased pivoted pawls secured to a face of said respective fare drums and arranged and adapted to engage in said spline groove so as to pick up and rotate said respective drums in a counter registering direction to their normal "for hire" positions upon counter rotation of said common shaft irrespective of the angular positions of said respective drums on said common shaft.

28. In a taximeter a meter front assembly adapted to obviate unauthorized access to the meter registering drums and counters comprising a light bulb socket plate adapted to be secured to the front of the meter and having vertically spaced, transverse rows of window openings through which the meter registering drums and counters are displayed, a planar wall portion surrounding each row of said window openings and a transversely extending recessed area between said planar wall portions; light bulb sockets disposed in said recessed area; a dial backing plate positioned in front of said bulb socket plate in spaced relation thereto and having vertically spaced rows of window openings aligned with said window openings of said light bulb socket plate and bulb receiving openings in the transversely extending space between said window openings in said dial plate; a pair of transversely extending transparent plastic strips secured to the back face of said dial plate, one above said bulb receiving openings and one below said bulb receiving openings in position to engage said planar wall portions of said light bulb socket plate throughout their length whereby access to said window openings in said bulb socket plate through said bulb receiving openings is obviated; a dial plate positioned in front of said backing plate in surface contact therewith and having transparent areas cooperating with said aforementioned aligned window openings and preventing access to said drums and counters through said window openings and bulb receiving openings aligned with said aforementioned bulb receiving openings; means for securing said backing plate and said dial plate to the front of the meter; cover means for said meter having marginal flanges overlapping the front marginal edges of said dial plate and said common securing means; and sealed securing means for attaching said cover means to said meter.

29. In a taximeter having a base plate, a base plate supported meter registering mechanism, and a meter illuminating light assembly adapted to indicate operative and non-operative conditions of said registering mechanism; a base plate supported electrical socket and plug assembly comprising a socket member opening through and accessible from the bottom of said base plate; an electrical contact plug extending into said socket member to form an assembled socket and plug; respectively aligned passages in said assembled socket and plug substantially tangentially arranged with respect to the peripheral surface of the received portion of said plug; and means comprising a rod sealed in place with respect to said meter passing through said passages and cooperating with passages in said base plate and meter registering mechanism to secure said plug against undetected and unauthorized removal.

30. The combination defined in claim 29 wherein said meter registering mechanism is connected to the transmission of said cab through an armored flexible drive cable having a coupler secured to said base and said rod also cooperates with said coupler to secure said coupler against undetected and unauthorized removal to disrupt the mileage drive of said registering mechanism.

31. A simplified, compact taximeter for registering and visibly indicating through a single face thereof the basic fare, the tariff rate, the charge for extra passengers, the total mileage, the total paid mileage, the total number of fare units, the total number of paid trips and the number of extra passengers comprising a rectangular, box-like, transversely elongated meter cabinet having a vertical dimension approximately one half of its width, a bottom wall, side walls, and an end face provided with separate windows for visibly displaying respective indicating drums and counters to give said information, openings at its opposite ends for freely receiving the protruding ends of a flag shaft, an extras passenger indicator operating plunger, and an opening adjacent the geometric center for freely receiving the protruding end of a clock winding shaft; a side panel carried by said bottom wall and spaced inwardly from one side of said cabinet and having right angularly disposed, spaced, vertical wall portions extending outwardly toward the side of said cabinet and provided with horizontally aligned journal openings in longitudinal alignment with respect to one of said end openings in said end face; a flag shaft journalled in said horizontally aligned journal openings with one end protruding through said one end opening in said end face; gear means secured to the opposite end of said flag shaft; meter registering mechanism disposed behind said end face and inside of said side panel and including a cam shaft journalled in said side panel with one of its ends protruding into the space between said side panel and said side wall of said cabinet and its axis in vertical alignment with said gear means on said flag shaft; indicator drums and counters journalled for rotation on axes parallel to said cam shaft and associated with each of said windows to visually display the desired information through the respective windows; a second side panel carried by said bottom wall inwardly of the other side of said cabinet, extras operating lever means arranged in parallelism to said other side panel for effecting operation of one of said drums provided for indicating the charge for extra passengers and one of said counters provided for indicating the number of extra passengers and having an operator actuated plunger one end of which protrudes through the other end opening of said end face; driving means for said meter registering mechanism comprising a shaft and gear means connectable to the transmission of the taxicab and clock works; a clock winding shaft extending longitudinally of said meter cabinet through said opening adjacent the geometric center of said end face; a clock winding key secured to the protruding end of said clock winding shaft; and an operator actuated flag secured to the protruding end of said flag shaft and adapted to be moved from its normal "for hire" position to a "hired" position thereby rotating said flag shaft and through the geared connection rotating said cam shaft to selectively control said registering mechanism and condition said meter for registering operation.

32. A taximeter comprising a base plate having spaced openings for respectively journalling a drive shaft element and receiving an electrical plug socket and concentric slots surrounding said journal opening and adapted to receive the securing elements of a drive shaft coupling; a drive shaft element journalled in said journal opening; a meter mechanism having a front face and cover secured to said base plate; a driving coupling adapted for driving connection with said drive shaft element and having axially projecting end lugs of substantially L-shaped configuration with the short leg of the L-extending in an annular direction from the free end of the long leg and adapted to pass through said concentric slots and overlap the base at an end of said slots upon turning movement in one direction to thereby secure said coupling to the bottom exposed face of said base plate; an electrical plug socket secured in said socket receiving opening with its plug receiving opening accessible from the bottom exposed face of said base plate and having a pair of angularly spaced aligned openings at one side thereof; an electrical plug, having leads connecting it with the electrical system of the cab and a slot in one side adjacent the end remote from said leads, disposed in said socket with said slot in alignment with said aligned socket openings; a locking pin insertable through the front face of said meter with one end protruding from said front face and passing through said socket openings and plug slot and terminating against a face of one of said L-shaped lugs to lock said plug against removal from said socket and said coupling against turning movement in the opposite direction to disengage said lugs from said base; and sealing means cooperating with said one end of said pin and a stationary portion of said meter front where it may be readily inspected to disclose any unauthorized tampering with said locking pin to disengage either said plug or said coupling.

33. A pawl disc assembly comprising a disc member having a centrally disposed axially bored hub extending from one face at right angles thereto and a pair of angularly spaced through openings spaced radially outwardly from the center of said disc; a pawl pivotally mounted on the other face of said disc adjacent each of said openings with their free ends facing in the same direction and overlying their adjacent openings; a spring stud of a diameter substantially smaller than the diameter of said openings secured to each of said pawls in position to extend through its respective opening and beyond said one face of said disc; and a tension spring connected at its opposite ends to said protruding portions of said studs and adapted to resiliently bias the free ends of said pawls toward the center of said disc.

34. A register drum shaft assembly for a flag-controlled taximeter comprising a shaft adapted to be journalled adjacent its ends and having a longitudinally extending, peripherally opening groove adjacent one end thereof; ten dollar, one dollar, and tens fare drum rotatably mounted on said shaft in side-by-side relation adjacent said one end and overlying said groove; reset pawls pivoted on the exposed faces of said respective gears with their free ends resiliently urged into engagement with said shaft and adapted upon reverse rotation of said shaft to engage in said groove and reversely rotate said ten dollar and one dollar drums to zero registering position; an operating ratchet wheel secured to the hub of said tens drum; a reset pawl pivoted on said hub of said tens drum with its free end resiliently biased into engagement with said shaft and adapted on reverse rotation of said shaft to engage in said groove and reversely rotate said tens drum to zero registering position; a pair of drums rotatably mounted on said shaft in predetermined spaced relation to said tens drum; a reset drive means on said shaft and adapted to effect reverse rotation of said shaft and resetting of said ten dollar, one dollar and tens drums when the control flag is moved to its "home" or non-registering position; and an actuating gear secured to one face of one said pair of drums adapting said drum for continuous uni-directional driving engagement with a flag operated drum drive gear.

BRIAN C. PALMER.

REFERENCES CITED

The following references are of record in the file of this patent:

UNITED STATES PATENTS

| Number | Name | Date |
|---|---|---|
| 1,023,050 | Sulsona | Apr. 9, 1912 |
| 1,182,408 | Ohmer et al. | May 9, 1916 |
| 1,438,853 | Phillips | Dec. 12, 1922 |
| 1,470,949 | Weisinger | Oct. 16, 1923 |
| 1,497,918 | Landsiedel | June 17, 1924 |
| 1,522,910 | Richert | Jan. 13, 1925 |
| 1,608,117 | Orth et al. | Nov. 23, 1926 |
| 1,615,399 | Orth | Jan. 25, 1927 |
| 1,643,551 | Friden | Sept. 27, 1927 |
| 1,671,553 | Sheldrick | May 29, 1928 |
| 1,695,663 | Rodanet | Dec. 18, 1928 |
| 1,744,307 | Gluck | Jan. 21, 1930 |
| 1,762,862 | Gluck | June 10, 1930 |
| 1,771,142 | Riegger | July 22, 1930 |
| 1,780,780 | Costuma et al. | Nov. 4, 1930 |
| 1,786,745 | Gehlen | Dec. 30, 1930 |
| 1,794,808 | Tingley | Mar. 3, 1931 |
| 1,827,139 | Brun | Oct. 13, 1931 |
| 1,846,417 | Gluck | Feb. 23, 1932 |
| 1,856,403 | Riegger | May 3, 1932 |
| 1,874,962 | Gluck et al. | Aug. 30, 1932 |
| 1,947,937 | Hennig | Feb. 20, 1934 |
| 1,961,869 | Swaim | June 5, 1934 |
| 2,127,295 | Hennessy | Aug. 16, 1938 |
| 2,238,920 | Studley | Apr. 22, 1941 |
| 2,279,556 | Bugg | Apr. 14, 1942 |
| 2,315,569 | White | Apr. 6, 1943 |
| 2,335,718 | Wheeler | Nov. 30, 1943 |
| 2,428,080 | Horn | Sept. 30, 1947 |